US010582127B2

United States Patent
Oryoji

(10) Patent No.: US 10,582,127 B2
(45) Date of Patent: Mar. 3, 2020

(54) IMAGE PROCESSING DEVICE, DISPLAY DEVICE, REPRODUCTION CONTROL METHOD, AND IMAGE PROCESSING SYSTEM

(71) Applicant: SONY CORPORATION, Tokyo (JP)

(72) Inventor: Hiroshi Oryoji, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/077,218

(22) PCT Filed: Feb. 24, 2017

(86) PCT No.: PCT/JP2017/007230
§ 371 (c)(1),
(2) Date: Aug. 10, 2018

(87) PCT Pub. No.: WO2017/150394
PCT Pub. Date: Sep. 8, 2017

(65) Prior Publication Data
US 2019/0028643 A1    Jan. 24, 2019

(30) Foreign Application Priority Data
Feb. 29, 2016  (JP) ................................ 2016-037836

(51) Int. Cl.
*H04N 5/232*  (2006.01)
*H04N 13/211* (2018.01)
(Continued)

(52) U.S. Cl.
CPC ......... *H04N 5/23238* (2013.01); *G03B 15/00* (2013.01); *G03B 37/04* (2013.01);
(Continued)

(58) Field of Classification Search
CPC .. H04N 5/23238; H04N 13/211; H04N 5/232; H04N 7/142; G03B 15/00; G03B 37/04
See application file for complete search history.

(56) References Cited

U.S. PATENT DOCUMENTS

| | | | |
|---|---|---|---|
| 8,749,547 B2 * | 6/2014 | Oto ..................... | H04N 13/373 345/419 |
| 2014/0098224 A1 * | 4/2014 | Zhang .................. | G01B 11/022 348/135 |
| 2014/0142486 A1 * | 5/2014 | Summit .............. | A61F 5/05841 602/20 |

FOREIGN PATENT DOCUMENTS

| JP | 9-062861 A | 3/1997 |
|---|---|---|
| JP | 09-062861 A | 3/1997 |

(Continued)

OTHER PUBLICATIONS

International Search Report and Written Opinion of PCT Application No. PCT/JP2017/007230, dated May 16, 2017, 07 pages. ISRWO.

*Primary Examiner* — Mishawn N. Hunter
(74) *Attorney, Agent, or Firm* — Chip Law Group

(57) ABSTRACT

[Object] To resolve or reduce inconvenience resulting from a shift in imaging timing that occurs during reproduction of omnidirectional video or integral processing based on a plurality of captured images captured at different timings. [Solution] Provided is an image processing device including: a reproduction control unit configured to control reproduction of omnidirectional video based on a plurality of captured images sequentially captured in a plurality of fields of view that revolve while partially overlapping one another. The omnidirectional video is covered by M fields of view from a first field of view to an M-th (M>1) field of view with a reference direction serving as a starting point. In a case where reproduction in a reproduction field of view that
(Continued)

straddles the reference direction is requested, the reproduction control unit causes a display unit to display a reproduction image based on a first captured image corresponding to the first field of view and a second captured image corresponding to the M-th field of view captured earlier than the first captured image.

13 Claims, 39 Drawing Sheets

(51) Int. Cl.
*G03B 15/00* (2006.01)
*G03B 37/04* (2006.01)
*H04N 7/14* (2006.01)
*H04N 13/00* (2018.01)

(52) U.S. Cl.
CPC ............. *H04N 5/232* (2013.01); *H04N 7/142* (2013.01); *H04N 13/211* (2018.05); *H04N 2013/0081* (2013.01)

(56) References Cited

FOREIGN PATENT DOCUMENTS

| | | | |
|---|---|---|---|
| JP | 2000-002927 | A | 1/2000 |
| JP | 2004-531113 | A | 10/2004 |
| JP | 2006-039564 | A | 2/2006 |
| JP | 2008-118602 | A | 5/2008 |
| JP | 2011-512735 | A | 4/2011 |
| JP | 2014-115863 | A | 6/2014 |
| JP | 2014-168147 | A | 9/2014 |
| JP | 2015-156523 | A | 8/2015 |
| WO | 2013/165006 | A1 | 11/2013 |
| WO | 2013/186806 | A1 | 12/2013 |

* cited by examiner

— — → : PHASE SHIFT

— — → : PHASE SHIFT

— — → : PHASE SHIFT

— — → : PHASE SHIFT

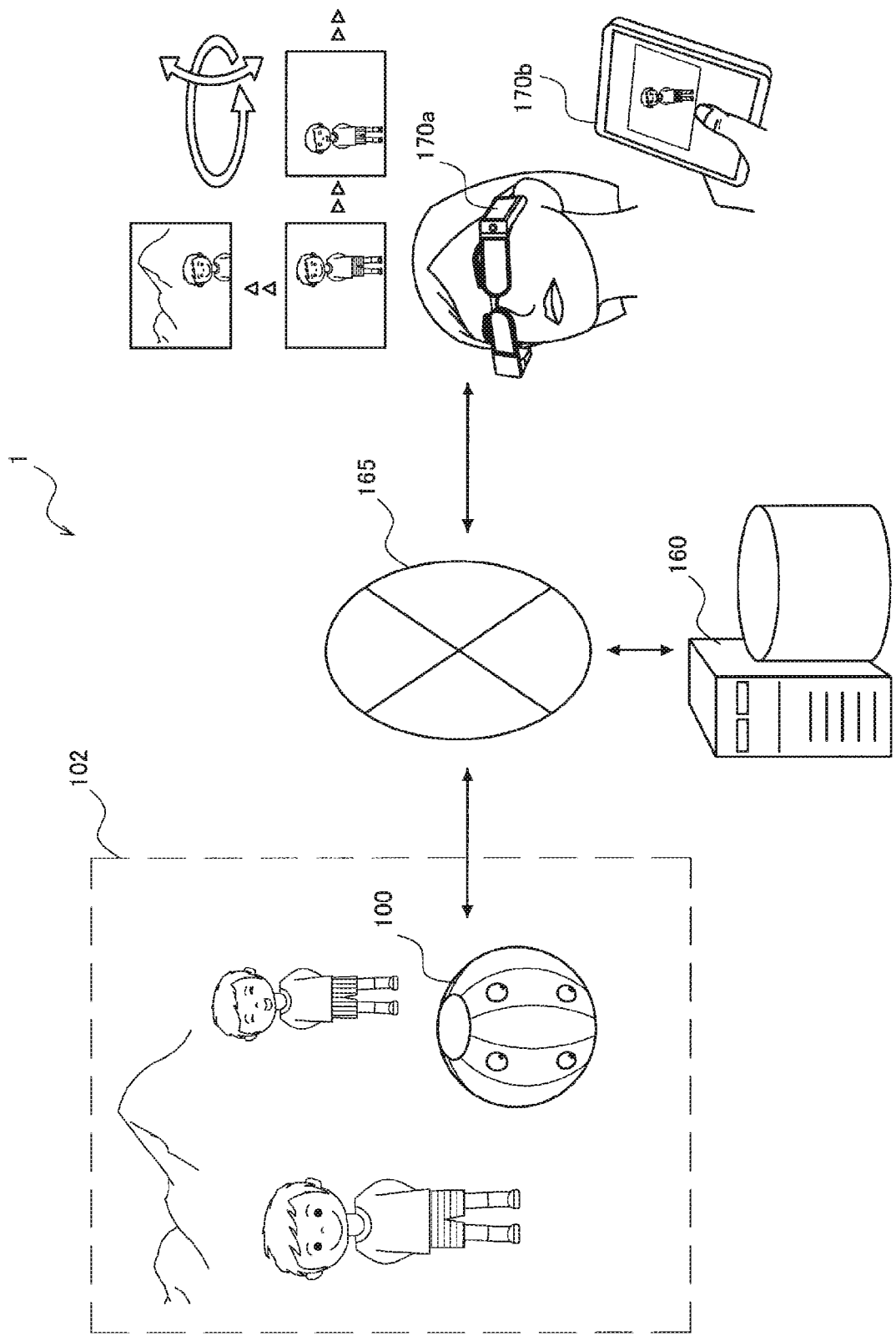

REFERENCE DIRECTION: $\theta_0$

REPRODUCTION VIEWING ANGLE (Rv): 120°

REPRODUCTION DIRECTION: $\theta_0 + 120°$

REPRODUCTION DIRECTION: $\theta_0 + 30°$

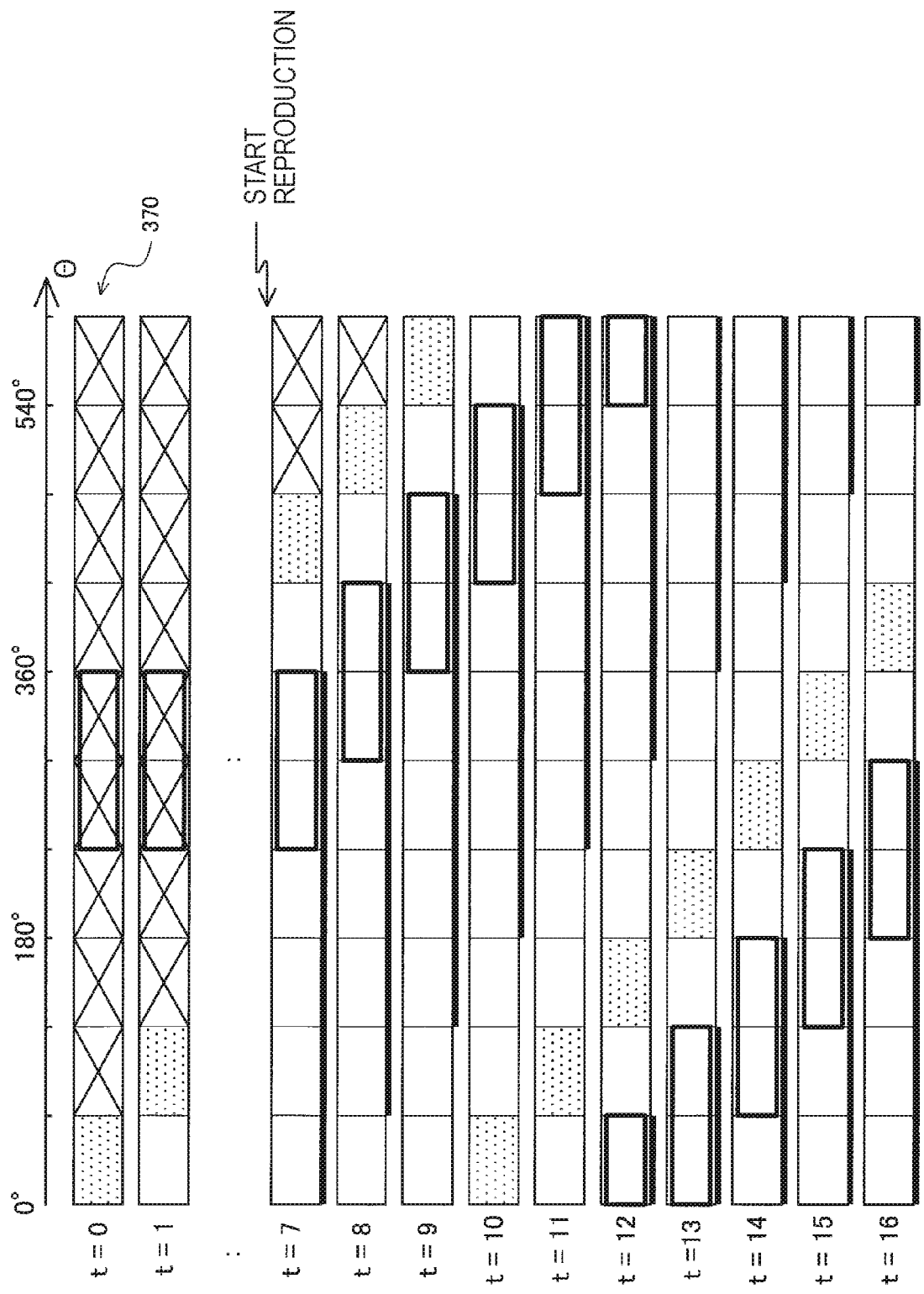

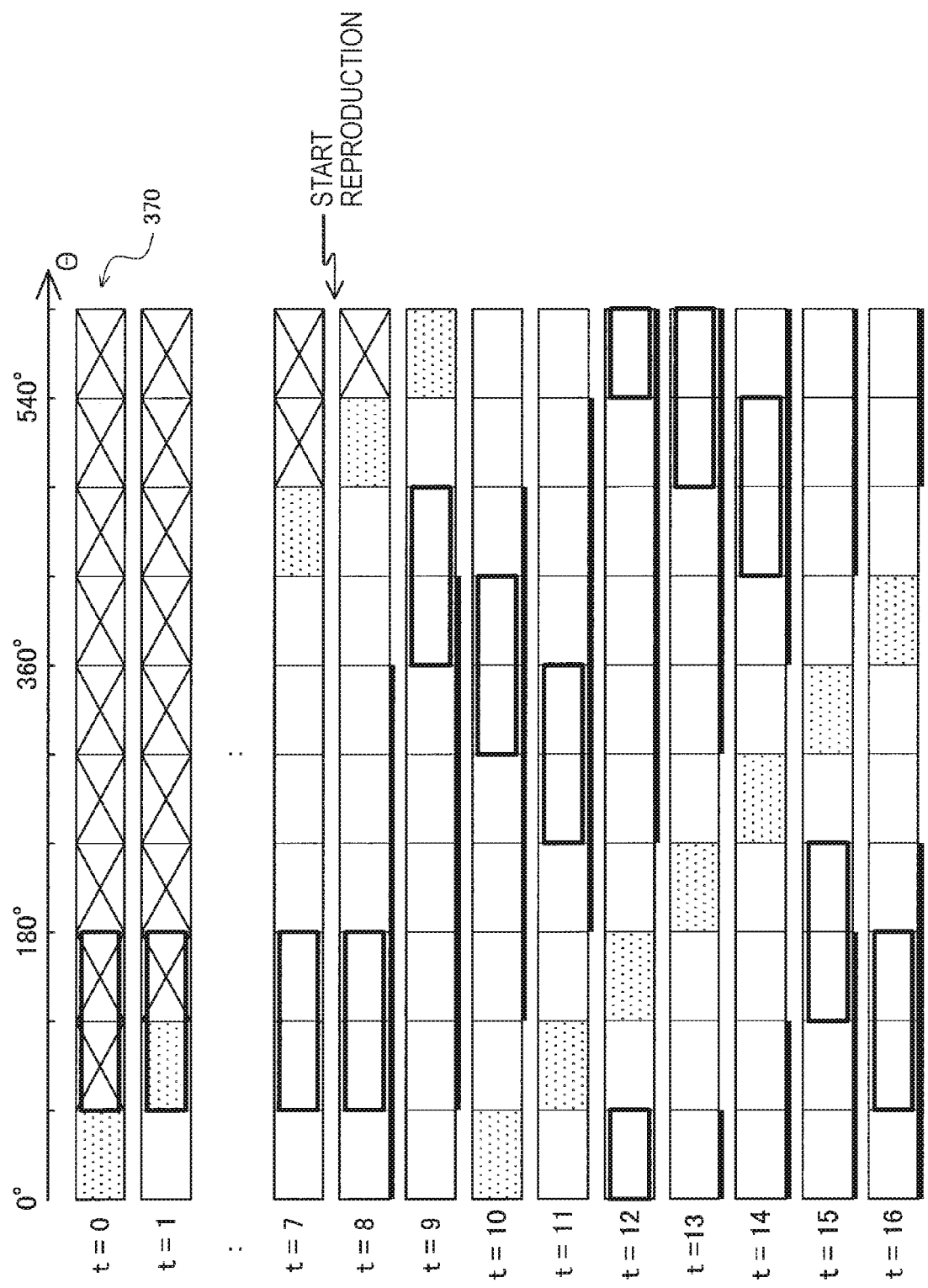

IMAGE PROCESSING DEVICE, DISPLAY DEVICE, REPRODUCTION CONTROL METHOD, AND IMAGE PROCESSING SYSTEM

CROSS REFERENCE TO RELATED APPLICATIONS

This application is a U.S. National Phase of International Patent Application No. PCT/JP2017/007230 filed on Feb. 24, 2017, which claims priority benefit of Japanese Patent Application No. JP 2016-037836 filed in the Japan Patent Office on Feb. 29, 2016. Each of the above-referenced applications is hereby incorporated herein by reference in its entirety.

TECHNICAL FIELD

The present disclosure relates to an image processing device, a display device, a reproduction control method, and an image processing system.

BACKGROUND ART

In recent years, omnidirectional cameras capable of imaging the entire field of view of 360° have become commercially practical. Many omnidirectional cameras integrally process captured images from a plurality of camera modules directed to directions different from one another to provide an omnidirectional image (or video). Patent Literature 1 discloses an example of a technique of stitching images from a plurality of cameras to generate an omnidirectional image.

An omnidirectional image may also be generated by sequentially performing imaging while revolving the field of view of a single camera module (that is, while rotating the camera module) and stitching a plurality of captured images captured in such a manner. Patent Literature 2 discloses an example of a digital still camera for generating such an omnidirectional image.

CITATION LIST

Patent Literature

Patent Literature 1: JP 2006-039564A
Patent Literature 2: JP 2015-156523A

DISCLOSURE OF INVENTION

Technical Problem

In the case of attempting to construct video using an omnidirectional image, a shift in imaging timing may cause a problem in reproduction of omnidirectional video or integral processing. A technology according to the present disclosure has an object to resolve or reduce such inconvenience.

Solution to Problem

According to the present disclosure, there is provided an image processing device including: a reproduction control unit configured to control reproduction of omnidirectional video based on a plurality of captured images sequentially captured in a plurality of fields of view that revolve while partially overlapping one another. The omnidirectional video is covered by M fields of view from a first field of view to an M-th (M>1) field of view with a reference direction serving as a starting point. In a case where reproduction in a reproduction field of view that straddles the reference direction is requested, the reproduction control unit causes a display unit to display a reproduction image based on a first captured image corresponding to the first field of view and a second captured image corresponding to the M-th field of view captured earlier than the first captured image.

In addition, according to the present disclosure, there is provided a display device including the above-described image processing device and display unit.

In addition, according to the present disclosure, there is provided a reproduction control method of controlling reproduction of omnidirectional video based on a plurality of captured images sequentially captured in a plurality of fields of view that revolve while partially overlapping one another. The omnidirectional video is covered by M fields of view from a first field of view to an M-th (M>1) field of view with a reference direction serving as a starting point. The reproduction control method includes: generating, by an image processing device, a reproduction image based on a first captured image corresponding to the first field of view and a second captured image corresponding to the M-th field of view captured earlier than the first captured image, in a case where reproduction in a reproduction field of view that straddles the reference direction is requested; and causing a display unit to display the generated reproduction image.

In addition, according to the present disclosure, there is provided an image processing system including: an imaging device configured to generate a plurality of captured images by sequentially performing imaging in a plurality of fields of view that revolve while partially overlapping one another; and an image processing device that includes a reproduction control unit configured to control reproduction of omnidirectional video based on the plurality of captured images. The omnidirectional video is covered by M fields of view from a first field of view to an M-th (M>1) field of view with a reference direction serving as a starting point. In a case where reproduction in a reproduction field of view that straddles the reference direction is requested, the reproduction control unit causes a display unit to display a reproduction image based on a first captured image corresponding to the first field of view and a second captured image corresponding to the M-th field of view captured earlier than the first captured image.

Advantageous Effects of Invention

The technology according to the present disclosure resolves or reduces inconvenience resulting from a shift in imaging timing that occurs during reproduction of omnidirectional video or integral processing based on a plurality of captured images captured at different timings. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 6 is a schematic diagram showing an example of a configuration of a camera system according to a first embodiment.

FIG. 35 is an explanatory diagram showing an example of transition of a buffer state of the frame buffer in a second scenario.

FIG. 36 is an explanatory diagram showing an example of transition of a buffer state of the frame buffer in a third scenario.

MODE(S) FOR CARRYING OUT THE INVENTION

Figure 1A:
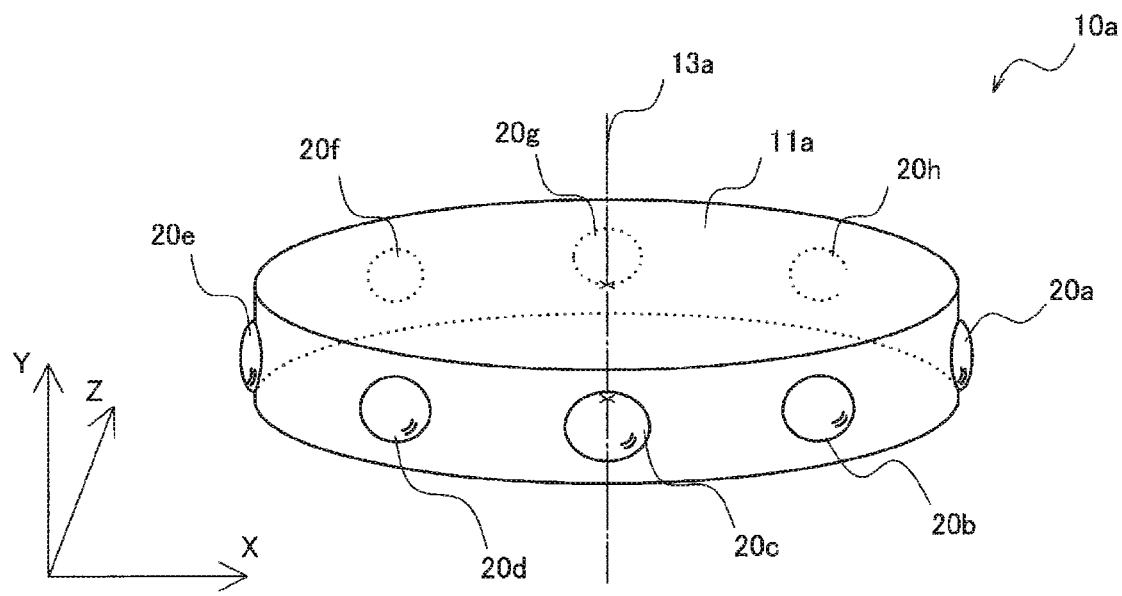
FIG. 1A is an explanatory diagram for describing an example of a schematic configuration of an omnidirectional camera.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In the present specification, an "omnidirectional image" refers to an image that covers the entire field of view of 360° in at least one direction (for example, one or more of an azimuth angle direction and an attack and depression angle direction). An omnidirectional image is typically generated by integrating a plurality of captured images. "Omnidirectional video" refers to video that covers the entire field of view of 360° in at least one direction. Reproduction of an omnidirectional image and reproduction of omnidirectional video are typically performed in a partial reproduction field of view. For example, in reproduction of omnidirectional video, a reproduction image (reproduction frame) of a (partial) reproduction field of view in any direction requested by a user in the entire field of view of 360° is generated and displayed on a screen. A reproduction frame of omnidirectional video may be cut out from an omnidirectional frame generated in advance, in agreement with the reproduction field of view, as an example. As another example, the reproduction frame of omnidirectional video may be constructed at the time of reproduction from captured images of corresponding one or more imaging fields of view. The expression of an "omnidirectional frame" has a meaning substantially equivalent to an omnidirectional image, but suggests that it is a kind of frame included in a moving image. A mere expression of a "frame" or an "individual frame" includes each of a series of captured images included in video that have been captured in individual imaging fields of view.

The present disclosure includes a technology related to imaging and reproduction of omnidirectional video based on images captured by a plurality of camera modules and a technology related to imaging and reproduction of omnidirectional video based on images captured by a single rotating camera module. In the following sections, "1. First embodiment" mainly describes the former, and "2. Second embodiment" mainly describes the latter. Note that characteristics described in these embodiments may be combined with each other in any way unless otherwise stated.
1. First Embodiment
1-1. Introduction
1-1-1. Overview of issues
1-1-2. Overview of omnidirectional camera
1-1-3. Image readout system
1-1-4. Phase shift between camera modules
1-2. Example of configuration of camera system
1-3. Example of configuration of device
1-3-1. Imaging device
1-3-2. Display terminal
1-4. Example of flow of processing
1-4-1. Imaging control processing
1-4-2. Control information acquisition processing
1-4-3. Reproduction control processing
1-5. Summary of first embodiment
2. Second Embodiment
2-1. Introduction
2-1-1. Overview of issues
2-1-2. Example of configuration of rotating camera
2-2. Example of configuration of camera system
2-3. First example
2-3-1. Imaging device
2-3-2. Display terminal
2-3-3. Example of flow of processing
2-4. Second example
2-4-1. Imaging device
2-4-2. Display terminal
2-4-3. Example of flow of processing
2-4-4. Example of transition of buffer state
2-5. Summary of second embodiment
3. Conclusion 1. First Embodiment 1-1. Introduction

[1-1-1. Overview of Issues]

Timing of reading out a pixel value performed by each camera module of an omnidirectional camera may vary depending on the pixel position. For example, the timing of reading out a pixel value may differ between the leading pixel and the trailing pixel of one image sensor. This difference causes, between camera modules that respectively image partially overlapping fields of view, a shift in imaging timing of an overlapping portion of the fields of view. This shift is referred to as a phase shift in the present specification. In the case where a quickly moving subject is imaged by the omnidirectional camera, how the subject is seen does not agree between neighboring camera modules due to such a phase shift, and it may be difficult to integrally process captured images from those camera modules. The same applies to the case where imaging is performed while moving the camera quickly.

The present embodiment proposes a technology for resolving or reducing inconvenience resulting from a phase shift in such an omnidirectional camera (or a device that integrally processes captured images from at least a plurality of camera modules).

[1-1-2. Overview of Omnidirectional Camera]

In the present section, an overview of an omnidirectional camera will be described. An omnidirectional camera refers to, in many cases, a camera capable of imaging the entire field of view of 360° around a certain reference axis. In one example, the reference axis is a vertical axis, and the field of view of 360° is formed in the azimuth angle direction. Some omnidirectional cameras also have a wide field of view in the attack and depression angle direction, and may be capable of imaging even the zenith, for example. The present embodiment may be applied to various omnidirectional cameras having various fields of view. For example, the present embodiment is also applicable to a camera only having a field of view of less than 360° in any direction.

FIG. 1A is an explanatory diagram for describing an example of a schematic configuration of an omnidirectional camera. An omnidirectional camera 10a shown in FIG. 1A has an enclosure 11a formed cylindrically around an axis 13a. On the outer peripheral surface of the enclosure 11a, a plurality of camera modules 20a, 20b, 20c, 20d, 20e, 20f, 20g, and 20h having lenses directed radially to directions different from one another are located. Note that, in the case where it is not necessary to distinguish the camera modules 20a, 20b, 20c, 20d, 20e, 20f, 20g, and 20h from one another in the following description, they will be collectively referred to as a camera module 20 by omitting the alphabets at the end of the reference numerals. The same also applies to a combination of other structural elements and reference numerals which will be described later.

For example, when the omnidirectional camera 10a is installed with the bottom of the enclosure 11a mounted on the horizontal plane (the x-z plane in the drawing), the axis 13a becomes the vertical axis. Then, each camera module 20 images the field of view of the camera module to generate a captured image. For example, the camera module 20a images a first field of view to generate a first image signal. The camera module 20b images a second field of view neighboring to the first field of view in the azimuth angle direction to generate a second image signal. In the example of FIG. 1A, the optical axes of eight camera modules 20 extend radially in the horizontal plane. Therefore, if the field of view of each camera module 20 in the azimuth angle direction has an angle of more than or equal to 45°, an integral image that covers the entire field of view of 360° in the azimuth angle direction can be obtained by integrating captured images from all the camera modules 20. Practically, for integral processing of captured images, such as stitching or stereo matching, it is desirable that an overlapping portion exists in some proportion between neighboring two fields of view, and in that case, the field of view of each camera module 20 in the azimuth angle direction has a viewing angle of more than 45°.

Figure 1B:
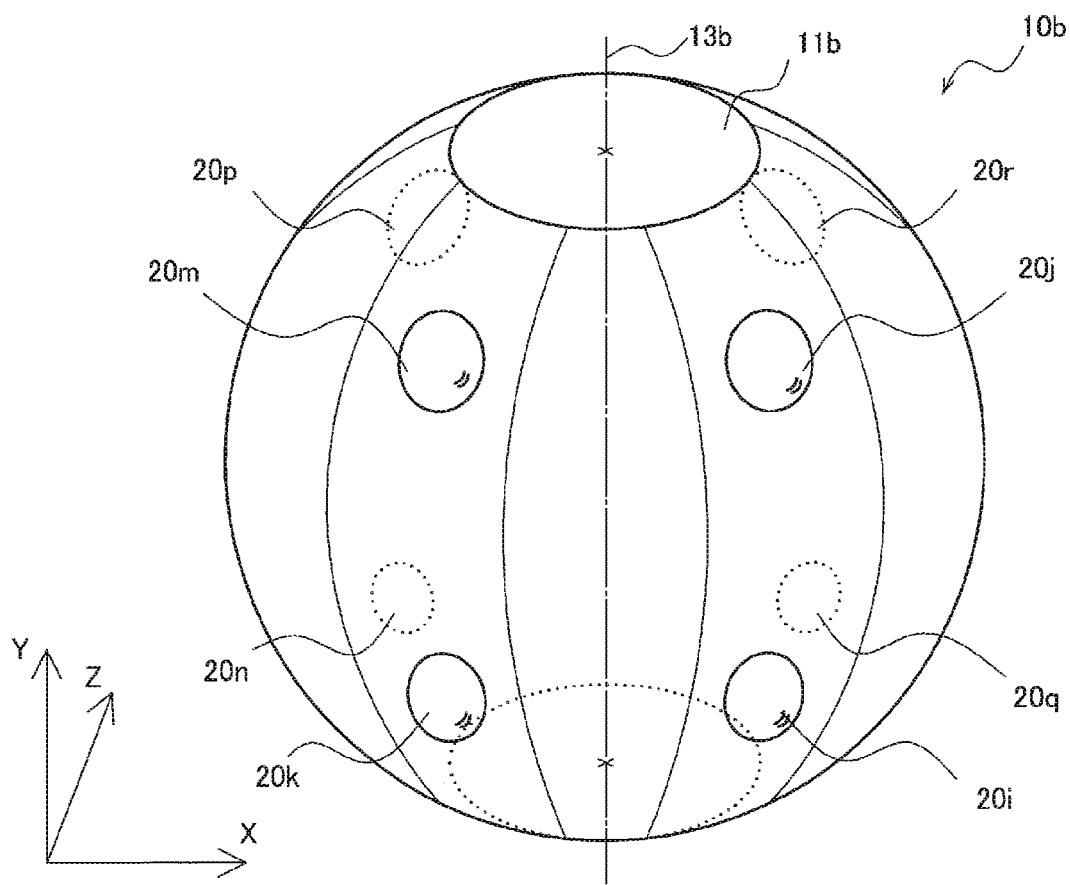
FIG. 1B is an explanatory diagram for describing another example of a schematic configuration of an omnidirectional camera.

FIG. 1B is an explanatory diagram for describing another example of a schematic configuration of an omnidirectional camera. An omnidirectional camera 10b shown in FIG. 1B has an enclosure 11b formed generally as a sphere having been cut at the top surface and the bottom surface that are orthogonal to an axis 13b. On the outer peripheral surface of the enclosure 11b, four pairs of camera modules having fields of view neighboring in the attack and depression angle direction are located. More specifically, the pair of camera modules 20i and 20j, the pair of camera modules 20k and 20m, the pair of the camera modules 20n and 20p, and the pair of the camera modules 20q and 20r are located at a spacing of 90° in the azimuth angle direction between neighboring pairs.

For example, when the omnidirectional camera 10b is installed with the bottom surface of the enclosure 11b mounted on the horizontal plane (the x-z plane in the drawing), the axis 13b becomes the vertical axis. Then, each camera module 20 images the field of view of the camera module to generate a captured image. For example, the camera module 20i images a first field of view to generate a first image signal. The camera module 20j images a second field of view neighboring to the first field of view in the attack and depression angle direction to generate a second image signal. In the example of FIG. 1B, the optical axes of the two camera modules 20 of each pair extend radially in the vertical plane. For example, assuming that the fields of view of both of the camera modules 20i and 20j in the attack and depression angle direction have a viewing angle of 60°, and the proportion of the overlapping portion between the fields of view is 25% (60°×0.25=15°), an integral image having a viewing angle of 105° (=60°×2-15°) can be obtained in the attack and depression angle direction by integrating captured images generated by the camera modules 20i and 20j. By further integrating captured images from the four pairs of the camera modules 20, an image that covers the entire field of view of 360° in the azimuth angle direction can also be obtained.

Note again that the configurations of the omnidirectional cameras shown in FIG. 1A and FIG. 1B are mere examples. The present embodiment may be applied to a camera of any shape including any number of two or more camera modules.

[1-1-3. Image Readout System]

Readout of a pixel value from an image sensor is usually performed in the rolling shutter system or the global shutter system. In the case where a charge coupled device (CCD) is employed as an image sensor, pixel value readout is performed in principle in the global shutter system. In the case where a complementary metal oxide semiconductor (CMOS) is employed as an image sensor, pixel value readout is usually performed in the rolling shutter system. Although it is possible to mount a global shutter on a CMOS device, mounting of the global shutter is disadvantageous in terms of cost and size reduction. Pixel value reading in the rolling shutter system is also called a sequential readout system. According to the sequential readout system, usually, charges accumulated in respective pixels are sequentially read out as pixel values from an upper line to a lower line in a two-dimensional focal plane and from a left pixel to a right pixel in each line. Considering the pixel readout direction in the sequential readout system, there may be two typical patterns of landscape arrangement and portrait arrangement for the arrangement of camera modules.

Figure 2A:
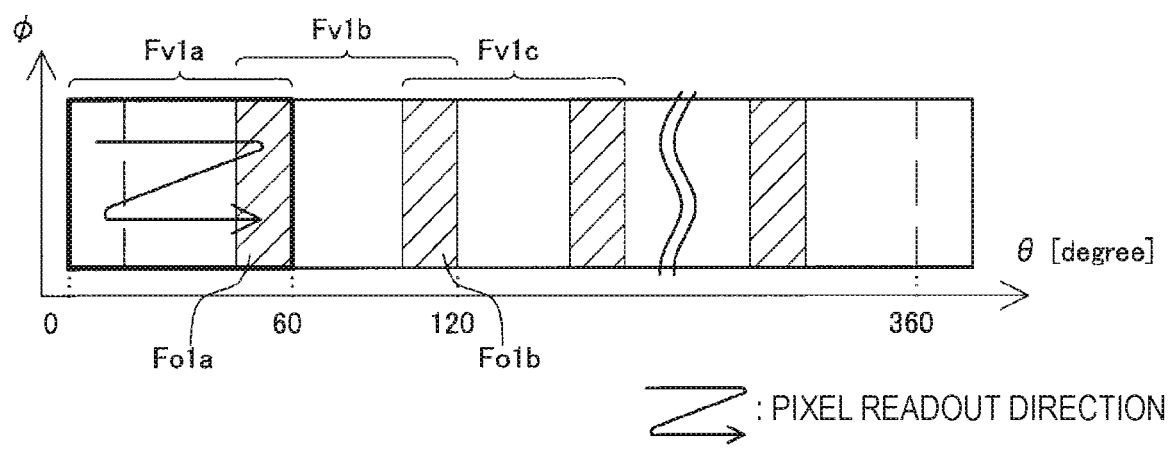
FIG. 2A is an explanatory diagram for describing a first example of an arrangement of a plurality of camera modules neighboring in an azimuth angle direction.

FIG. 2A is an explanatory diagram for describing a first example of the arrangement of a plurality of camera modules neighboring in the azimuth angle direction. In FIG. 2A, the fields of view of a plurality of camera modules are expressed two-dimensionally using the horizontal axis representing an azimuth angle $\theta$ and the vertical axis representing an attack and depression angle $\varphi$. For example, a field of view Fv1a is the field of view of the camera module 20a. A field of view Fv1b is the field of view of the camera module 20b. A field of view Fv1c is the field of view of the camera module 20c. The fields of view Fv1a and Fv1b neighbor to each other in the azimuth angle direction, and include an overlapping portion Fo1a in common. The fields of view Fv1b and Fv1c neighbor to each other in the azimuth angle direction, and include an overlapping portion Fo1b in common. In the case where the camera module 20 is arranged in the landscape arrangement, the camera module 20 reads out the pixel value of each pixel in the field of view of its own for each horizontal line and from the left to the right in each line, as indicated by the arrow in the drawing. Consequently, for example, the field of view Fv1a of the camera module 20a precedes the field of view Fv1b of the camera module 20b in the pixel readout direction. The field of view Fv1b of the camera module 20b precedes the field of view Fv1c of the camera module 20c in the pixel readout direction. For example, the time until the readout timing reaches the overlapping portion Fo1a after readout of the pixel value by the camera module 20a is started is shorter than the time required for reading out one line by the proportion of the overlapping portion.

Figure 2B:
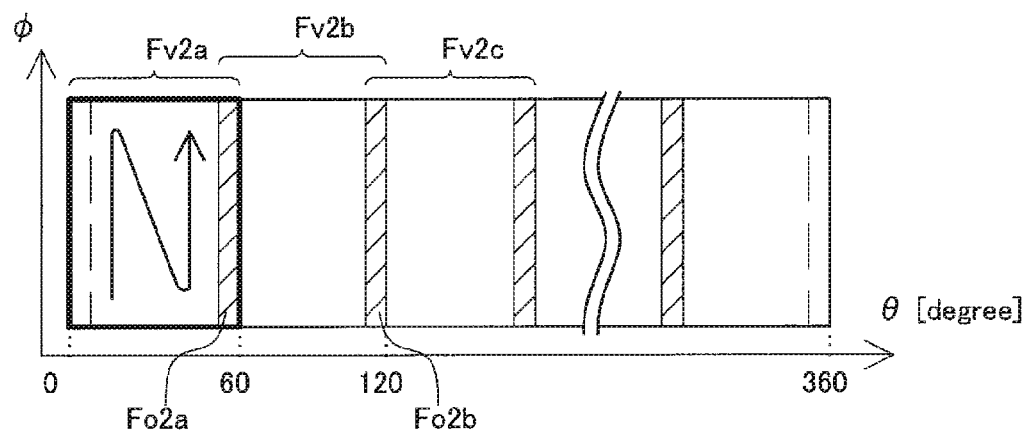
FIG. 2B is an explanatory diagram for describing a second example of an arrangement of a plurality of camera modules neighboring in an azimuth angle direction.

FIG. 2B is an explanatory diagram for describing a second example of the arrangement of a plurality of camera modules neighboring in the azimuth angle direction. In the example of FIG. 2B, a field of view Fv2a is the field of view of the camera module 20a. A field of view Fv2b is the field of view of the camera module 20b. A field of view Fv2c is the field of view of the camera module 20c. The fields of view Fv2a and Fv2b neighbor to each other in the azimuth angle direction, and include an overlapping portion Fo2a in common. The field of view Fv2b and Fv2c neighbor to each other in the azimuth angle direction, and include an overlapping portion Fo2b in common. In the case where the camera module 20 is arranged in the portrait arrangement, the camera module 20 reads out the pixel value of each pixel in the field of view of its own for each vertical line and from the bottom to the top in each line, as indicated by the arrow in the drawing. Consequently, for example, the field of view Fv2a of the camera module 20a precedes the field of view Fv2b of the camera module 20b in the pixel readout direction. The field of view Fv2b of the camera module 20b precedes the field of view Fv2c of the camera module 20c in the pixel readout direction. For example, the time until the readout timing reaches the overlapping portion Fo2a after readout of pixel values by the camera module 20a is started is shorter than the time required for reading out all the lines in the focal plane by the proportion of the overlapping portion.

Figure 3A:
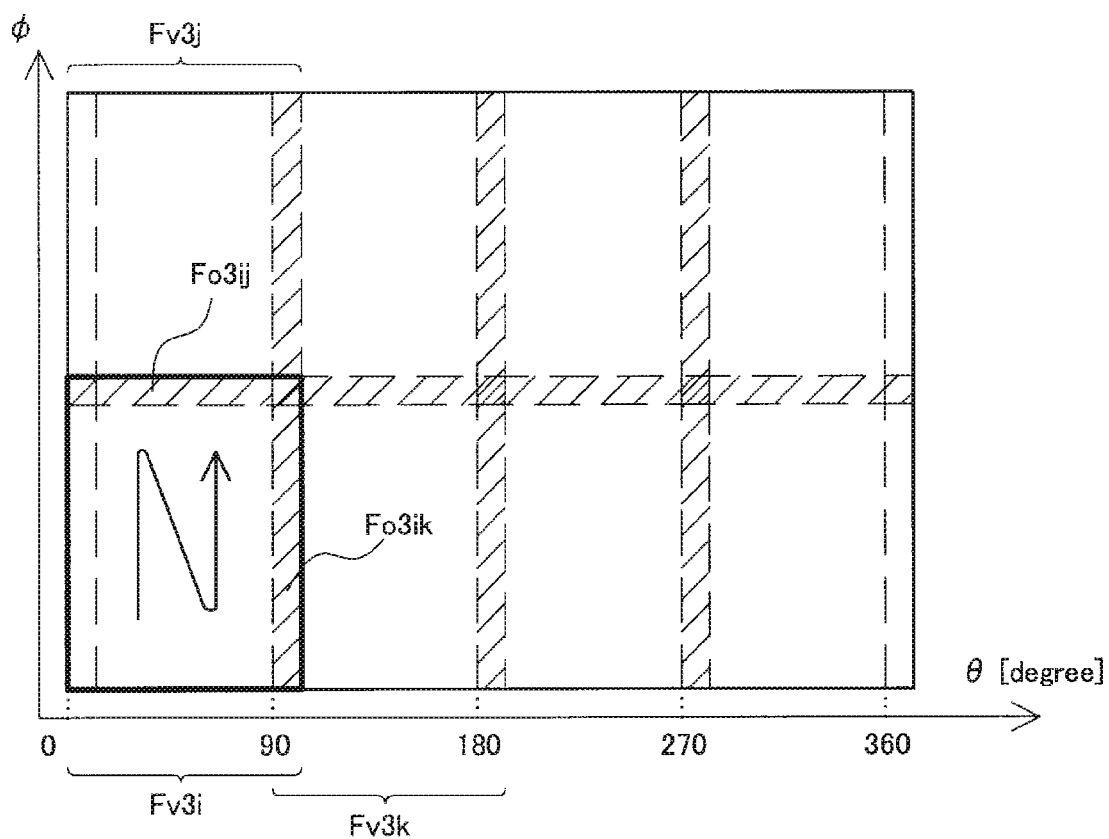
FIG. 3A is an explanatory diagram for describing a first example of an arrangement of a plurality of camera modules also neighboring in an attack and depression angle direction.

FIG. 3A is an explanatory diagram for describing a first example of the arrangement of a plurality of camera modules also neighboring in an attack and depression angle direction. In FIG. 3A, in a way similar to FIG. 2A, the fields of view of a plurality of camera modules are expressed two-dimensionally using the horizontal axis representing an azimuth angle θ and the vertical axis representing an attack and depression angle φ. For example, a field of view Fv3i is the field of view of the camera module 20i. A field of view Fv3j is the field of view of the camera module 20j. A field of view Fv3k is the field of view of the camera module 20k. The fields of view Fv1a and Fv1b neighbor to each other in the attack and depression angle direction, and include an overlapping portion Fo3ij in common. The fields of view Fv3i and Fv3k neighbor to each other in the azimuth angle direction, and include an overlapping portion Fo3ik in common. In the case where the camera module 20 is arranged in the portrait arrangement, the camera module 20 reads out the pixel value of each pixel in the field of view of its own for each vertical line and from the bottom to the top in each line, as indicated by the arrow in the drawing. Consequently, for example, the field of view Fv3i of the camera module 20i precedes the field of view Fv3j of the camera module 20j in the pixel readout direction. The field of view Fv3k precedes the field of view Fv3k of the camera module 20k. For example, the time until the readout timing reaches the overlapping portion Fo3ij after readout of the pixel value by the camera module 20i is started is shorter than the time required for reading out one line by the proportion of the overlapping portion.

Figure 3B:
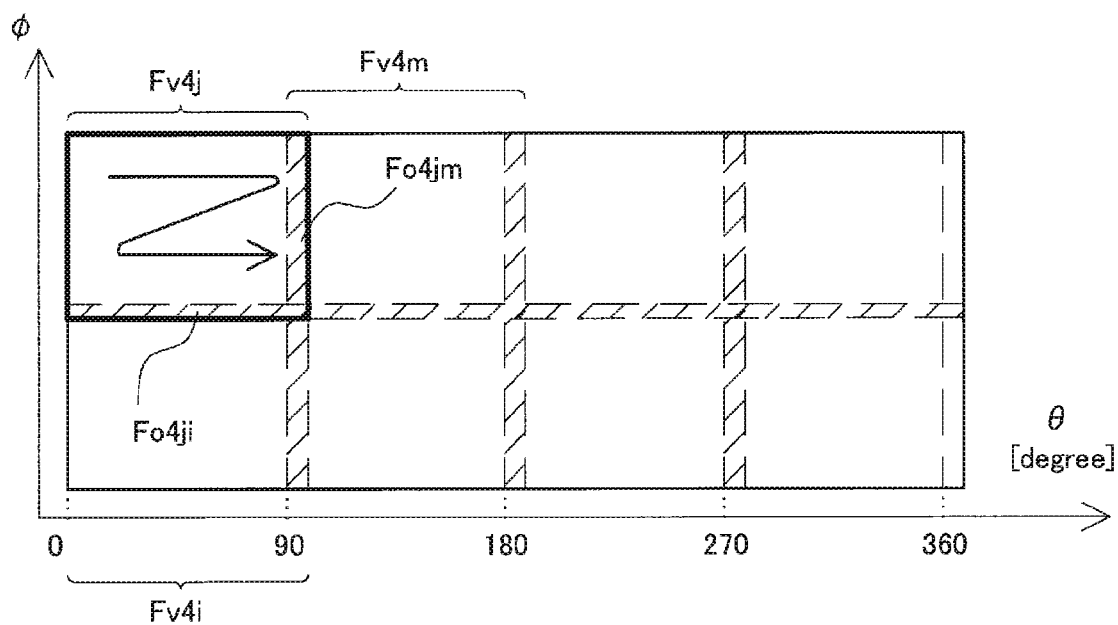
FIG. 3B is an explanatory diagram for describing a second example of an arrangement of a plurality of camera modules also neighboring in an attack and depression angle direction.

FIG. 3B is an explanatory diagram for describing a second example of the arrangement of a plurality of camera modules also neighboring in an attack and depression angle direction. For example, a field of view Fv4j is the field of view of the camera module 20j. A field of view Fv4m is the field of view of the camera module 20m. A field of view Fv4i is the field of view of the camera module 20i. The fields of view Fv4j and Fv4m neighbor to each other in the azimuth angle direction, and include an overlapping portion Fo4jm in common. The fields of view Fv4j and Fv4i neighbor to each other in the attack and depression angle direction, and include an overlapping portion Fo4ji in common. In the case where the camera module 20 is arranged in the landscape arrangement, the camera module 20 reads out the pixel value of each pixel in the field of view of its own for each horizontal line and from the left to the right in each line, as indicated by the arrow in the drawing. Consequently, for example, the field of view Fv4j of the camera module 20j precedes the field of view Fv4m of the camera module 20m in the pixel readout direction, and precedes the field of view Fv4i of the camera module 20i. For example, the time until the readout timing reaches the overlapping portion Fo4ji after readout of the pixel value by the camera module 20j is started is shorter than the time required for reading out all the lines in the focal plane by the proportion of the overlapping portion.

[1-1-4. Phase Shift Between Camera Modules]

As described above, in the sequential readout system, in the case where the first field of view imaged by a first imaging unit and the second field of view imaged by a second imaging unit partially overlap, for example, the phase of an image signal corresponding to the overlapping portion differs between the first image signal generated by the first imaging unit and the second image signal generated by the second imaging unit. It may be understood that the phase herein stands for the timing at which the pixel value at a certain pixel position is read out during one frame time.

Figure 4A:
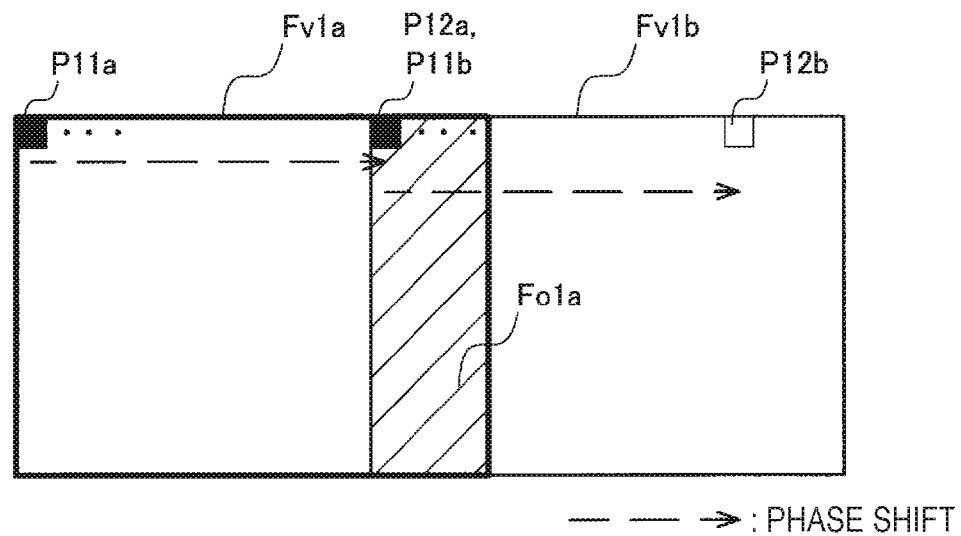
FIG. 4A is an explanatory diagram for describing a phase shift between two camera modules arranged in a landscape arrangement and neighboring in the azimuth angle direction.

FIG. 4A is an explanatory diagram for describing a phase shift between two camera modules arranged in the landscape arrangement and neighboring in the azimuth angle direction. In the example of FIG. 4A, the field of view Fv1a is the field of view of the camera module 20a. The field of view Fv1b is the field of view of the camera module 20b. A pixel P11a and a pixel P12a are pixels in the field of view Fv1a. A pixel P11b and a pixel P12b are pixels in the field of view Fv1b. The pixel P12a and the pixel P11b occupy substantially the same position in the integral field of view. It is assumed that imaging performed by these camera modules 20a and 20b is started simultaneously at a time T=0 (zero). Reading of the pixel value of the pixel P11a by the camera module 20a is performed at the time T=0 (practically, an exposure time exists between the start of imaging and reading of the pixel value; however, the exposure time is ignored here for ease of description). Although readout of the pixel value of the pixel P11b by the camera module 20b is performed simultaneously, the pixel value of the pixel P12a at substantially the same position is not read by the camera module 20a at this time point. Thereafter, when a certain time elapses, the camera module 20a reads out the pixel value of the pixel P12a. During this elapsed time (the broken arrow in the drawing), a subject or background reflected in the overlapping portion Fo1a may have moved. At the same timing, the camera module 20b reads the pixel value of the pixel P12b.

Figure 4B:
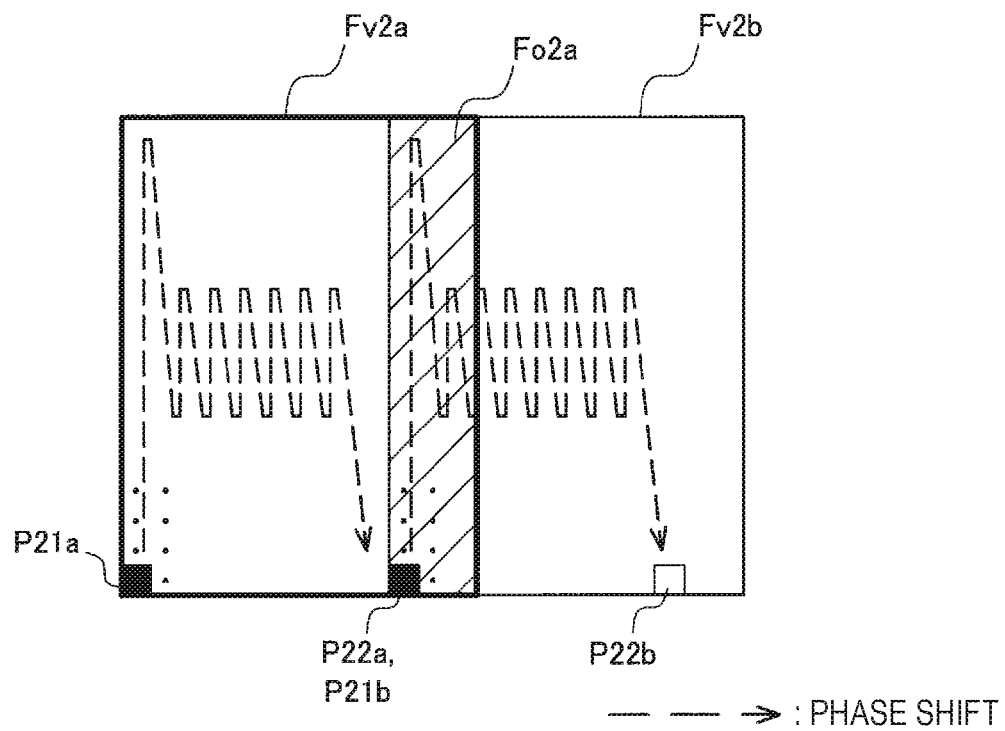
FIG. 4B is an explanatory diagram for describing a phase shift between two camera modules arranged in a portrait arrangement and neighboring in the azimuth angle direction.

FIG. 4B is an explanatory diagram for describing a phase shift between two camera modules arranged in the portrait arrangement and neighboring in the azimuth angle direction. In the example of FIG. 4B, the field of view Fv2a is the field of view of the camera module 20a. The field of view Fv2b is the field of view of the camera module 20b. A pixel P21a and a pixel P22a are pixels in the field of view Fv2a. A pixel P21b and a pixel P22b are pixels in the field of view Fv2b. The pixel P22a and the pixel P21b occupy substantially the same position in the integral field of view. It is assumed that imaging performed by these camera modules 20a and 20b is started simultaneously at a time T=0 (zero). Reading of the pixel value of the pixel P21a by the camera module 20a is performed at the time T=0. Although readout of the pixel value of the pixel P21b by the camera module 20b is performed simultaneously, the pixel value of the pixel P22a at substantially the same position is not read by the camera module 20a at this time point. Thereafter, when a certain time elapses, the camera module 20a reads out the pixel value of the pixel P22a. During this elapsed time, a subject or background reflected in the overlapping portion Fo2a may have moved. At the same timing, the camera module 20b reads the pixel value of the pixel P22b.

Figure 5A:
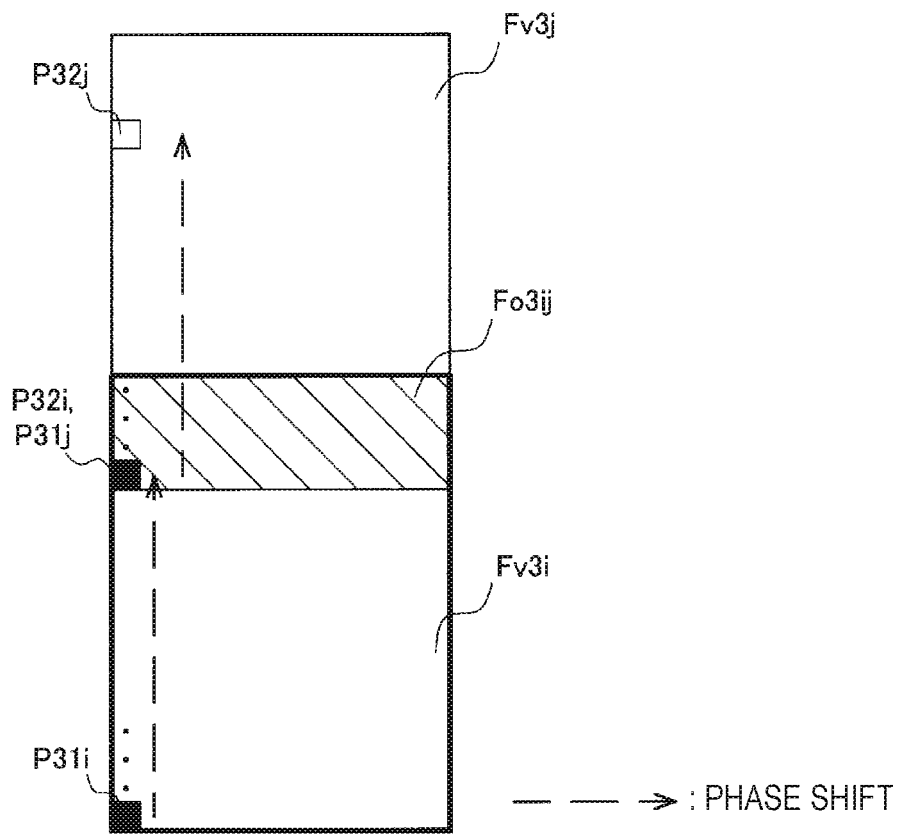
FIG. 5A is an explanatory diagram for describing a phase shift between two camera modules arranged in the portrait arrangement and neighboring in the attack and depression angle direction.

FIG. 5A is an explanatory diagram for describing a phase shift between two camera modules arranged in the portrait arrangement and neighboring in the attack and depression angle direction. In the example of FIG. 5A, the field of view Fv3$i$ is the field of view of the camera module 20$i$. The field of view Fv3$j$ is the field of view of the camera module 20$j$. A pixel P31$i$ and a pixel P32$i$ are pixels in the field of view Fv3$i$. A pixel P31$j$ and a pixel P32$j$ are pixels in the field of view Fv3$j$. The pixel P32$i$ and the pixel P31$j$ occupy substantially the same position in the integral field of view. It is assumed that imaging performed by these camera modules 20$i$ and 20$j$ is started simultaneously at a time T=0 (zero). Reading of the pixel value of the pixel P31$i$ by the camera module 20$i$ is performed at the time T=0. Although readout of the pixel value of the pixel P31$i$ by the camera module 20$i$ is performed simultaneously, the pixel value of the pixel P32$j$ at substantially the same position is not read by the camera module 20$j$ at this time point. Thereafter, when a certain time elapses, the camera module 20$i$ reads out the pixel value of the pixel P32$i$. During this elapsed time, a subject or background reflected in the overlapping portion Fo3$ij$ may have moved. At the same timing, the camera module 20$j$ reads the pixel value of the pixel P32$j$.

Figure 5B:
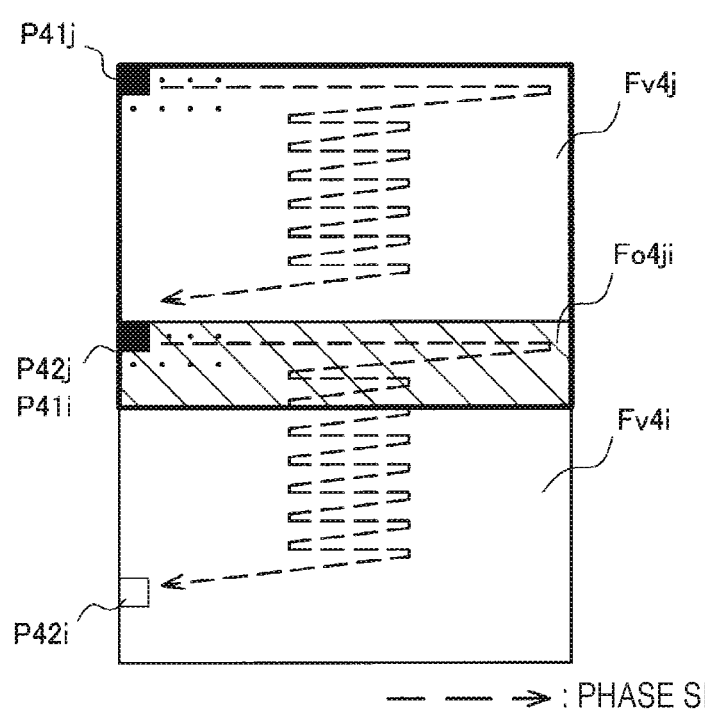
FIG. 5B is an explanatory diagram for describing a phase shift between two camera modules arranged in the landscape arrangement and neighboring in the attack and depression angle direction.

FIG. 5B is an explanatory diagram for describing a phase shift between two camera modules arranged in the landscape arrangement and neighboring in the attack and depression angle direction. In the example of FIG. 5B, the field of view Fv4$j$ is the field of view of the camera module 20$j$. The field of view Fv4$i$ is the field of view of the camera module 20$i$. A pixel P4$j$1$i$ and a pixel P42$j$ are pixels in the field of view Fv4$j$. A pixel P41$i$ and a pixel P42$j$ are pixels in the field of view Fv4$i$. The pixel P42$j$ and the pixel P41$i$ occupy substantially the same position in the integral field of view. It is assumed that imaging performed by these camera modules 20$j$ and 20$i$ is started simultaneously at a time T=0 (zero). Reading of the pixel value of the pixel P41$j$ by the camera module 20$j$ is performed at the time T=0. Although readout of the pixel value of the pixel P41$j$ by the camera module 20$j$ is performed simultaneously, the pixel value of the pixel P42$j$ at substantially the same position is not read by the camera module 20$j$ at this time point. Thereafter, when a certain time elapses, the camera module 20$j$ reads out the pixel value of the pixel P42$j$. During this elapsed time, a subject or background reflected in the overlapping portion Fo4$ji$ may have moved. At the same timing, the camera module 20$i$ reads the pixel value of the pixel P42$i$.

In the case where a quickly moving subject is imaged by the omnidirectional camera or in the case where imaging is performed while quickly moving the camera, the phase shift described using FIGS. 4A, 4B, 5A, and 5B causes inconsistency in how the subject or background is seen between captured images that reflect neighboring fields of view, and reduces the accuracy of integral processing such as stitching or stereo matching. Therefore, in a camera system which will be described in detail from the following section, control of imaging timing for resolving such a phase shift is introduced.

1-2. Example of Configuration of Camera System

FIG. 6 is a schematic diagram showing an example of a configuration of a camera system according to the first embodiment. With reference to FIG. 6, a camera system 1 may include an imaging device 100, a server 160, and display terminals 170$a$ and 170$b$.

The imaging device 100 includes, for example, a plurality of imaging units (camera modules) respectively having such a plurality of fields of view that integrally cover the entire field of view of 360° around a certain reference axis. The imaging device 100 may include any number of imaging units, and those imaging units may have any arrangement. In the example of FIG. 6, the imaging device 100 is an omnidirectional camera placed in an imaging environment 102. The imaging device 100 may be, for example, a standalone device that records captured images in a local memory. In addition, the imaging device 100 may be connected to the server 160, or the display terminal 170$a$ or 170$b$ via a network 165.

The server 160 is an information processing device that accumulates captured images generated by the imaging device 100 (or images for reproduction generated from those captured images through integral processing). The server 160 receives an image from the imaging device 100 via the network 165 or via a direct connection line (not shown), and causes a storage medium to store the received image. In addition, in accordance with a request received from a display terminal 170 (170$a$ or 170$b$), the server 160 distributes the image received from the imaging device 100 to the display terminal 170. Note that, in the case where the imaging device 100 and the display terminal 170 are directly connected, the camera system 1 may not include the server 160.

The network 165 may be a public network such as the Internet, or a private network such as a home network or a corporate network. The network 165 may include any combination of a wireless link and a wired link.

The display terminal 170$a$ is a terminal device having the function of displaying an image captured by the imaging device 100. In the example of FIG. 6, the display terminal 170$a$ is a wearable terminal worn on the head of a user. The user can reproduce an image captured by the imaging device 100 on the screen of the display terminal 170$a$. The image captured by the imaging device 100 is, for example, an omnidirectional image (each of frames included in a still image or a moving image) that integrally covers the entire field of view of 360°. In the case where the user is directed to a certain direction, a displayed image of a reproduction field of view corresponding to that direction in the omnidirectional image may be reproduced. Then, when the user directs his/her head to another direction (or inputs an instruction to move the reproduction field of view to the display terminal 170$a$), the reproduction field of view changes, and a displayed image of the reproduction field of view after the change may be reproduced.

The display terminal 170$b$ is also a terminal device having the function of displaying an image captured by the imaging device 100. In the example of FIG. 6, the display terminal 170$b$ is a mobile terminal held by the user. The user can reproduce an omnidirectional image captured by the imaging device 100 on the screen of the display terminal 170$b$. In the case where the display terminal 170$b$ is directed to a certain direction, a displayed image of a reproduction field of view corresponding to that direction in the omnidirectional image may be reproduced. Then, when the user directs the display terminal 170$b$ to another direction (or inputs an instruction to move the reproduction field of view to the display terminal 170$b$), the reproduction field of view changes, and a displayed image of the reproduction field of view after the change may be reproduced.

The display terminal 170 may acquire an omnidirectional image directly from the imaging device 100, or may acquire an omnidirectional image from the server 160. Processing of constructing an omnidirectional image or an individual displayed image from captured images generated by the plurality of imaging units of the imaging device 100 may be performed by any of the imaging device 100, the server 160, and the display terminal 170.

1-3. Example of Configuration of Device

[1-3-1. Imaging Device]

Figure 7:
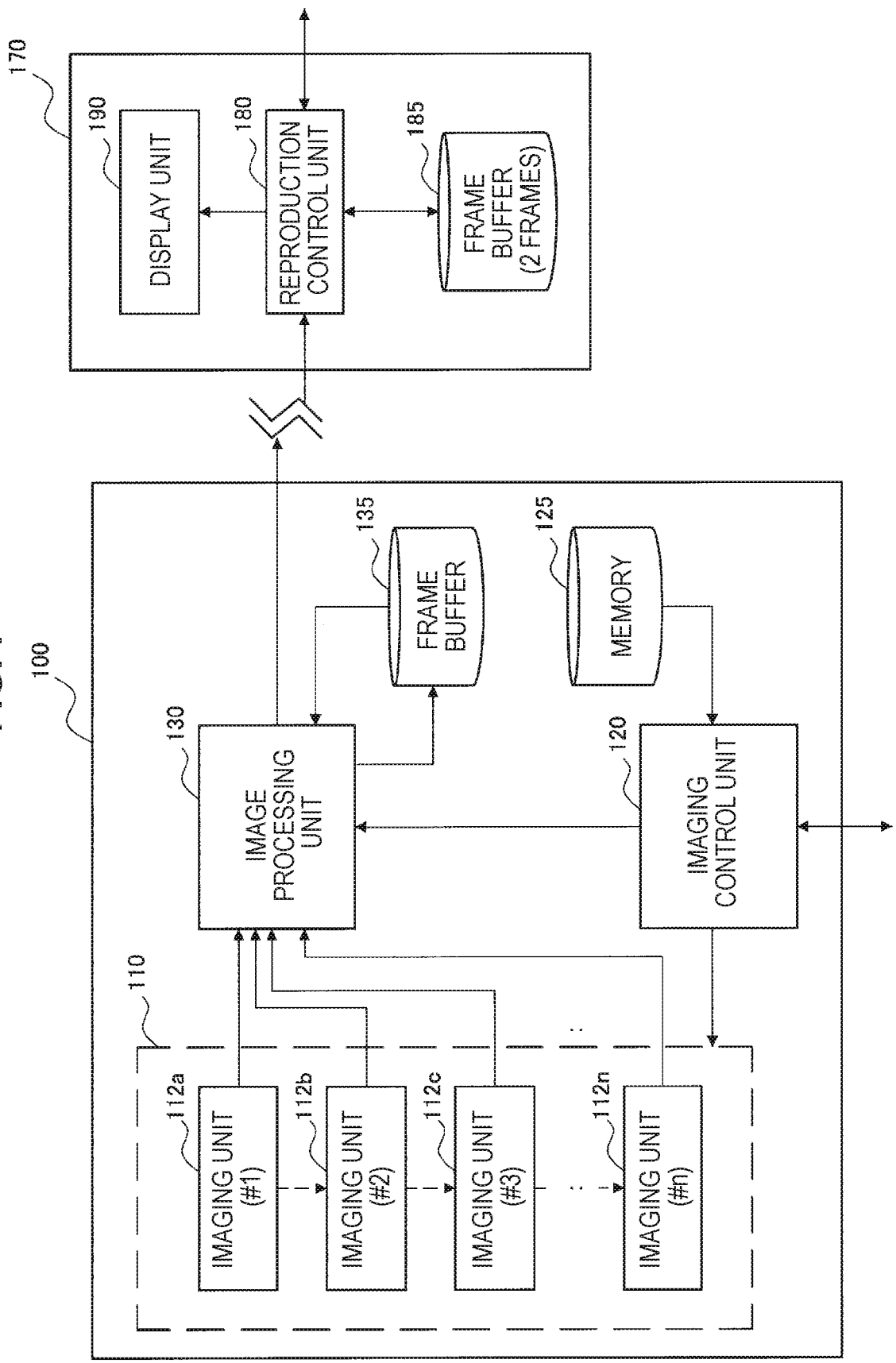
FIG. 7 is a block diagram showing an example of a configuration of an imaging device and a display terminal according to the first embodiment.

FIG. 7 shows an example of a configuration of the imaging device 100 according to the first embodiment. With reference to FIG. 7, the imaging device 100 includes a multi-camera unit 110, an imaging control unit 120, a memory 125, an image processing unit 130, and a frame buffer 135.

(1) Multi-Camera Unit

The multi-camera unit 110 includes a plurality of imaging units 112a, 112b, 112c, . . . , and 112n. The first imaging unit 112a images a first field of view to generate a first image signal, and outputs the generated first image signal to the image processing unit 130. The second imaging unit 112b images a second field of view to generate a second image signal, and outputs the generated second image signal to the image processing unit 130. The second field of view partially overlaps the first field of view. The third imaging unit 112c images a third field of view to generate a third image signal, and outputs the generated third image signal to the image processing unit 130. The third field of view partially overlaps at least one of the first field of view and the second field of view. The n-th imaging unit 112n images an n-th field of view to generate an n-th image signal, and outputs the generated n-th image signal to the image processing unit 130. The entire field of view of 360° around a certain reference axis may be integrally covered by all the fields of view of these plurality of imaging units 112a, 112b, 112c, . . . , and 112n or their subsets. In the following description, it is assumed that the reference axis is the vertical axis, and the entire field of view of 360° in the azimuth angle direction is covered by a plurality of fields of view. However, the present embodiment is also applicable to the case where the reference axis has any inclination.

As an example, the first imaging unit 112a includes a CMOS image sensor (not shown) that photoelectrically converts an image of light that enters from the first field of view via a lens into an electric signal, and reads out the pixel value from the image sensor in the sequential readout system to generate the first image signal. Similarly, the second imaging unit 112b includes a CMOS image sensor (not shown) that photoelectrically converts an image of light that enters from the second field of view via a lens into an electric signal, and reads out the pixel value from the image sensor in the sequential readout system to generate the second image signal. The other imaging units 112 may also generate respective image signals with a technique similar to the first imaging unit 112a and the second imaging unit 112b except having specific fields of view, respectively.

In a certain example, the first field of view of the first imaging unit 112a and the second field of view of the second imaging unit 112b neighbor in the azimuth angle direction. In addition, the first imaging unit 112a and the second imaging unit 112b are both arranged in the portrait arrangement, and read out pixel values per vertical line. The relation between the first and second fields of view in this case is equivalent to the relation between the field of view Fv2a and the field of view Fv2b illustrated in FIG. 2B.

In another example, the first field of view of the first imaging unit 112a and the second field of view of the second imaging unit 112b neighbor in the azimuth angle direction. In addition, the first imaging unit 112a and the second imaging unit 112b are both arranged in the landscape arrangement, and read out pixel values per horizontal line. The relation between the first and second fields of view in this case is equivalent to the relation between the field of view Fv1a and the field of view Fv1b illustrated in FIG. 2A.

In another example, the first field of view of the first imaging unit 112a and the second field of view of the second imaging unit 112b neighbor in the attack and depression angle direction. In addition, the first imaging unit 112a and the second imaging unit 112b are both arranged in the portrait arrangement, and read out pixel values per vertical line. The relation between the first and second fields of view in this case is equivalent to the relation between the field of view Fv3i and the field of view Fv3j illustrated in FIG. 3A.

In still another example, the first field of view of the first imaging unit 112a and the second field of view of the second imaging unit 112b neighbor in the attack and depression angle direction. In addition, the first imaging unit 112a and the second imaging unit 112b are both arranged in the landscape arrangement, and read out pixel values per horizontal line. The relation between the first and second fields of view in this case is equivalent to the relation between the field of view Fv4j and the field of view Fv4i illustrated in FIG. 3B.

(2) Imaging Control Unit—Control of Imaging Timing

The imaging control unit 120 is a controller module that controls an imaging operation in the multi-camera unit 110. The imaging control unit 120 causes capturing of an omnidirectional image in the multi-camera unit 110 to be started in accordance with a trigger for starting imaging detected via some user interface (not shown) or communication interface (not shown), for example. In the case where the omnidirectional image constitutes a moving image, capturing of the omnidirectional image may be repeated over a plurality of frames until a trigger for terminating imaging is detected.

In the present embodiment, the imaging control unit 120 controls imaging timing of each imaging unit 112 of the multi-camera unit 110 for the imaging operation in each frame. For example, the imaging control unit 120 controls imaging timing of at least one of the first image signal generated in the first imaging unit 112a and the second image signal generated in the second imaging unit 112b such that the phase of the above-described first image signal and the phase of the above-described second image signal corresponding to the overlapping portion of the first field of view and the second field of view agree. In addition, the imaging control unit 120 also similarly controls imaging timing of another pair of imaging units having fields of view that partially overlap each other such that the phases of image signals corresponding to the overlapping portion agree in the pair.

For example, the first field of view of the first imaging unit 112a shall precede the second field of view of the second imaging unit 112b in the pixel readout direction. In this case, the imaging control unit 120 may delay readout of the pixel value from the leading pixel in the second imaging unit 112b by the time during which the readout pixel position in the first imaging unit 112a reaches the overlapping portion of the first field of view and the second field of view from the leading pixel.

FIG. 8 to FIG. 11 show examples of control of imaging timing performed by the imaging control unit 120 for each combination of the two arrangement patterns (landscape arrangement/portrait arrangement) of imaging units and two neighboring directions (azimuth angle direction/attack and depression angle direction) of the imaging units. In each of the drawings, a timing chart of reading out pixel values in the case where control of imaging timing is not performed is shown on the left side for comparison, and a timing chart of reading out pixel values in the case where control of imaging timing is performed by the imaging control unit 120 is shown on the right side. The horizontal axis of each of the timing charts represents the phase of image signal, and the vertical axis represents the pixel position one-dimensionalized in accordance with the readout order in the sequential readout system.

Figure 8:
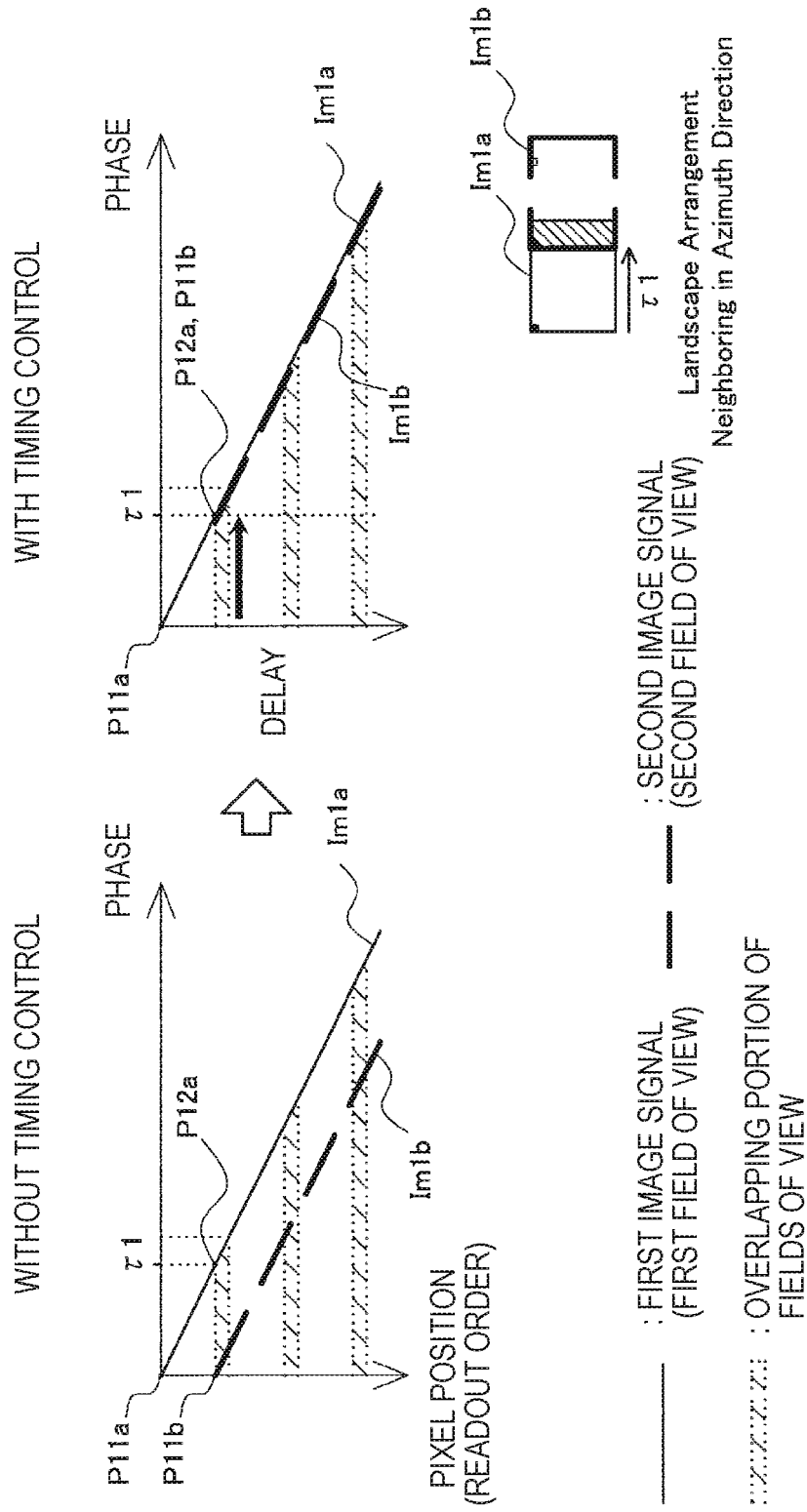
FIG. 8 is an explanatory diagram for describing an example of control of imaging timing between two camera modules arranged in the landscape arrangement and neighboring in the azimuth angle direction.

FIG. 8 corresponds to the case where the first imaging unit 112*a* and the second imaging unit 112*b* are arranged in the landscape arrangement, and the fields of view of those imaging units neighbor in the azimuth angle direction. In each of the timing charts, the solid line represents imaging timing (pixel value readout timing) of a first image signal Im1*a* generated by the first imaging unit 112*a* at each pixel position, and the broken line represents imaging timing of a second image signal Im1*b* generated by the second imaging unit 112*b* at each pixel position.

In the case where control of imaging timing by the imaging control unit 120 is not performed (see the left timing chart), imaging of the second image signal Im1*b* is started at the pixel P11*b* at the same time when imaging of the first image signal Im1*a* is started at the pixel P11*a*. Although the pixel P11*b* of the second image signal Im1*b* occupies substantially the same position as the pixel P12*a* of the first image signal Im1*a* in the integral field of view, the pixel value of the pixel P12*a* of the first image signal Im1*a* is not read out at this time point. Thereafter, at the time point when a time $\tau 1$ elapses, the pixel value of the pixel P12*a* is read out by the first imaging unit 112*a*.

In the case where control of imaging timing by the imaging control unit 120 is performed (see the right timing chart), the imaging control unit 120 delays readout of the pixel value of the leading pixel P11*b* in the second imaging unit 112*b* by the time $\tau 1$ until the readout pixel position in the first imaging unit 112*a* reaches the first pixel P12*a* in the overlapping portion from the leading pixel P11*a*. As a result, for pixels belonging to the overlapping portion of the fields of view, the phase of the first image signal Im1*a* and the phase of the second image signal Im1*b* agree.

Figure 9:
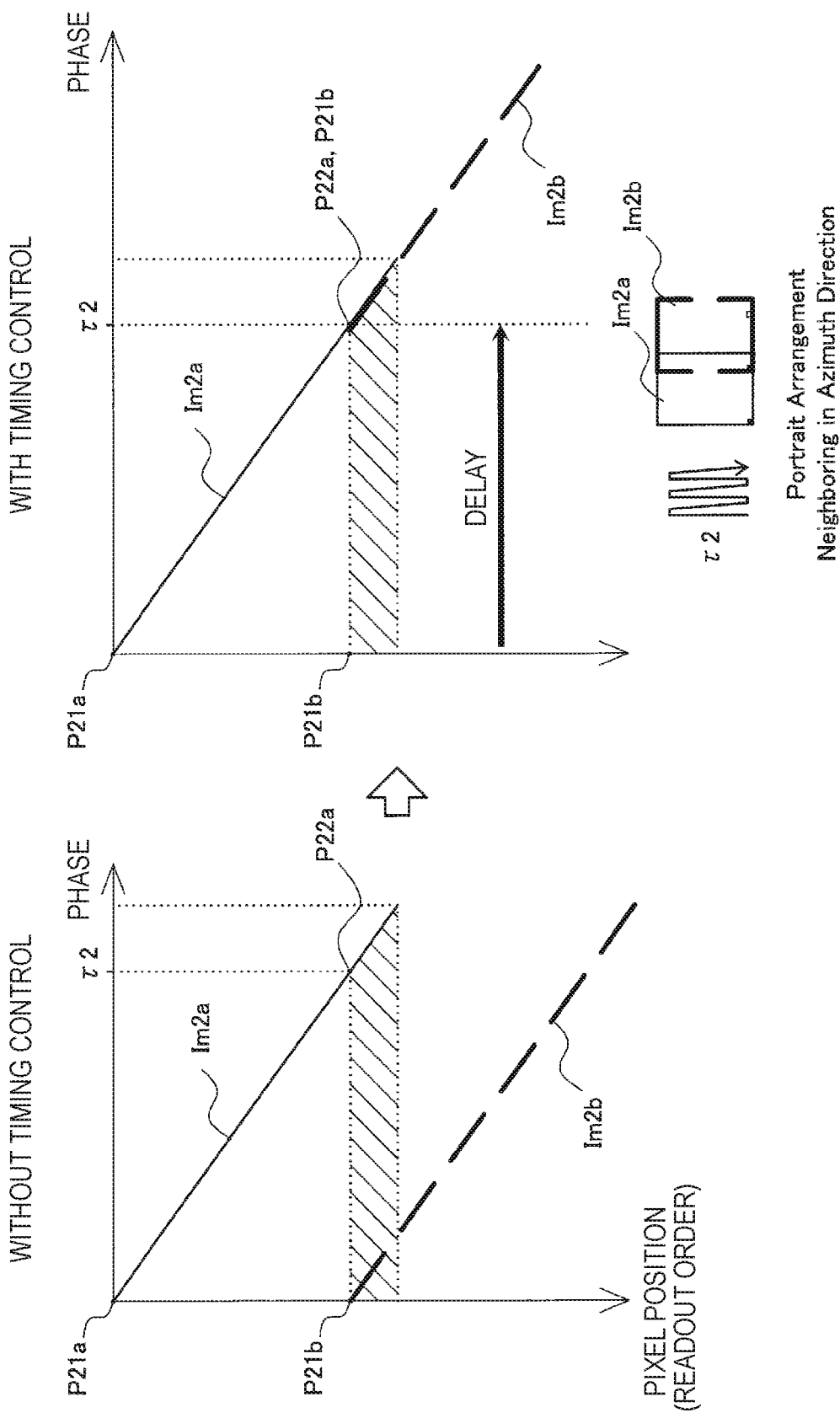
FIG. 9 is an explanatory diagram for describing an example of control of imaging timing between two camera modules arranged in the portrait arrangement and neighboring in the azimuth angle direction.

FIG. 9 corresponds to the case where the first imaging unit 112*a* and the second imaging unit 112*b* are arranged in the portrait arrangement, and the fields of view of those imaging units neighbor in the azimuth angle direction. In each of the timing charts, the solid line represents imaging timing (pixel value readout timing) of a first image signal Im2*a* generated by the first imaging unit 112*a* at each pixel position, and the broken line represents imaging timing of a second image signal Im2*b* generated by the second imaging unit 112*b* at each pixel position.

In the case where control of imaging timing by the imaging control unit 120 is not performed (see the left timing chart), imaging of the second image signal Im2*b* is started at the pixel P21*b* at the same time when imaging of the first image signal Im2*a* is started at the pixel P21*a*. Although the pixel P21*b* of the second image signal Im2*b* occupies substantially the same position as the pixel P22*a* of the first image signal Im2*a* in the integral field of view, the pixel value of the pixel P22*a* of the first image signal Im2*a* is not read out at this time point. Thereafter, at the time point when a time $\tau 2$ elapses, the pixel value of the pixel P22*a* is read out by the first imaging unit 112*a*.

In the case where control of imaging timing by the imaging control unit 120 is performed (see the right timing chart), the imaging control unit 120 delays readout of the pixel value of the leading pixel P21*b* in the second imaging unit 112*b* by the time $\tau 2$ until the readout pixel position in the first imaging unit 112*a* reaches the first pixel P22*a* in the overlapping portion from the leading pixel P21*a*. As a result, for pixels belonging to the overlapping portion of the fields of view, the phase of the first image signal Im2*a* and the phase of the second image signal Im2*b* agree.

Figure 10:
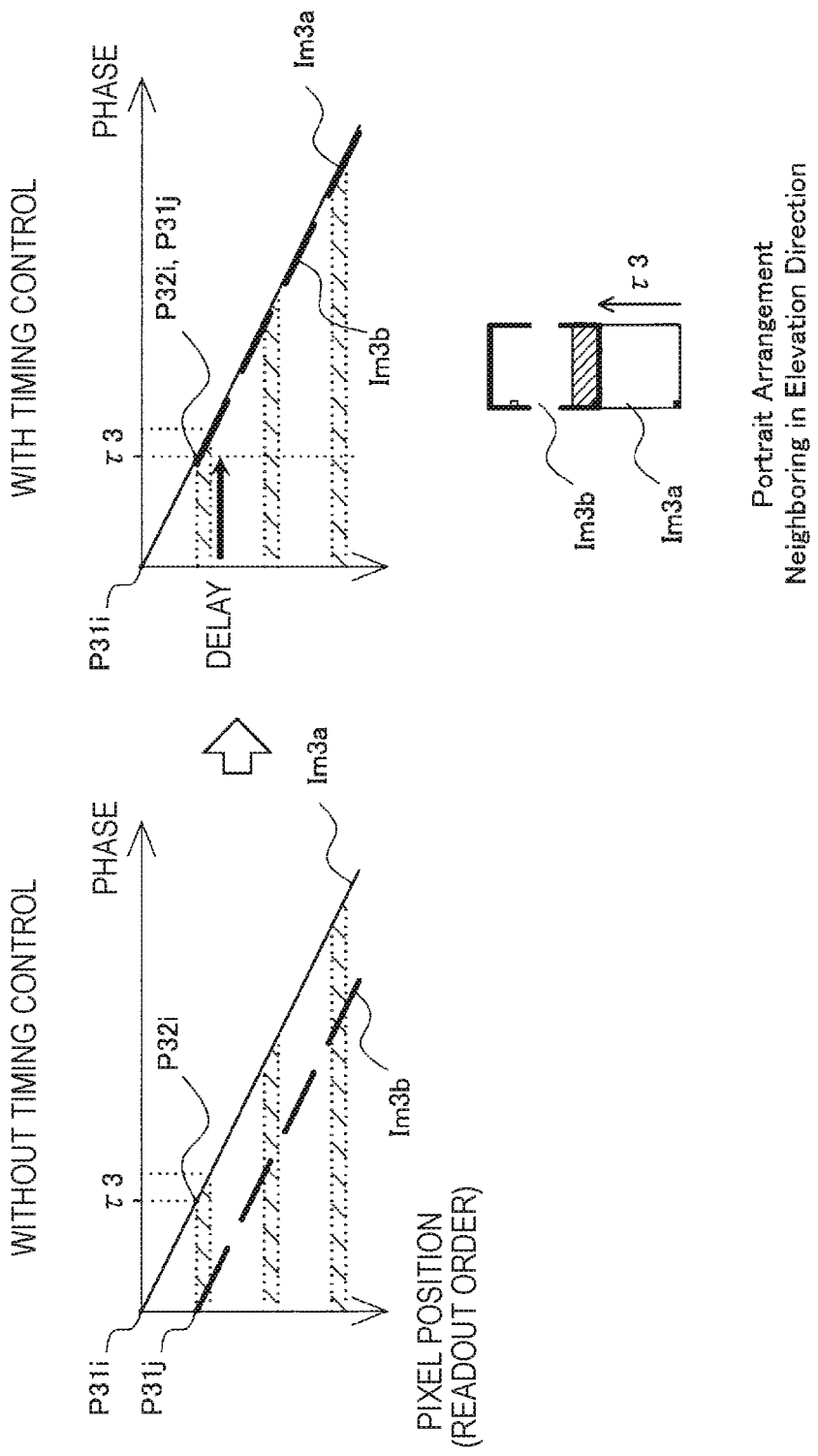
FIG. 10 is an explanatory diagram for describing an example of control of imaging timing between two camera modules arranged in the portrait arrangement and adjacent in the attack and depression angle direction.

FIG. 10 corresponds to the case where the first imaging unit 112*a* and the second imaging unit 112*b* are arranged in the portrait arrangement, and the fields of view of those imaging units neighbor in the attack and depression angle direction. In each of the timing charts, the solid line represents imaging timing (pixel value readout timing) of a first image signal Im3*a* generated by the first imaging unit 112*a* at each pixel position, and the broken line represents imaging timing of a second image signal Im3*b* generated by the second imaging unit 112*b* at each pixel position.

In the case where control of imaging timing by the imaging control unit 120 is not performed (see the left timing chart), imaging of the second image signal Im3*b* is started at the pixel P31*j* at the same time when imaging of the first image signal Im3*a* is started at the pixel P31*i*. Although the pixel P31*j* of the second image signal Im3*b* occupies substantially the same position as the pixel P32*i* of the first image signal Im3*a* in the integral field of view, the pixel value of the pixel P32*i* of the first image signal Im3*a* is not read out at this time point. Thereafter, at the time point when a time $\tau 3$ elapses, the pixel value of the pixel P32*i* is read out by the first imaging unit 112*a*.

In the case where control of imaging timing by the imaging control unit 120 is performed (see the right timing chart), the imaging control unit 120 delays readout of the pixel value of the leading pixel P31*i* in the second imaging unit 112*b* by the time $\tau 3$ until the readout pixel position in the first imaging unit 112*a* reaches the first pixel P32*i* in the overlapping portion from the leading pixel P31*i*. As a result, for pixels belonging to the overlapping portion of the fields of view, the phase of the first image signal Im3*a* and the phase of the second image signal Im3*b* agree.

Figure 11:
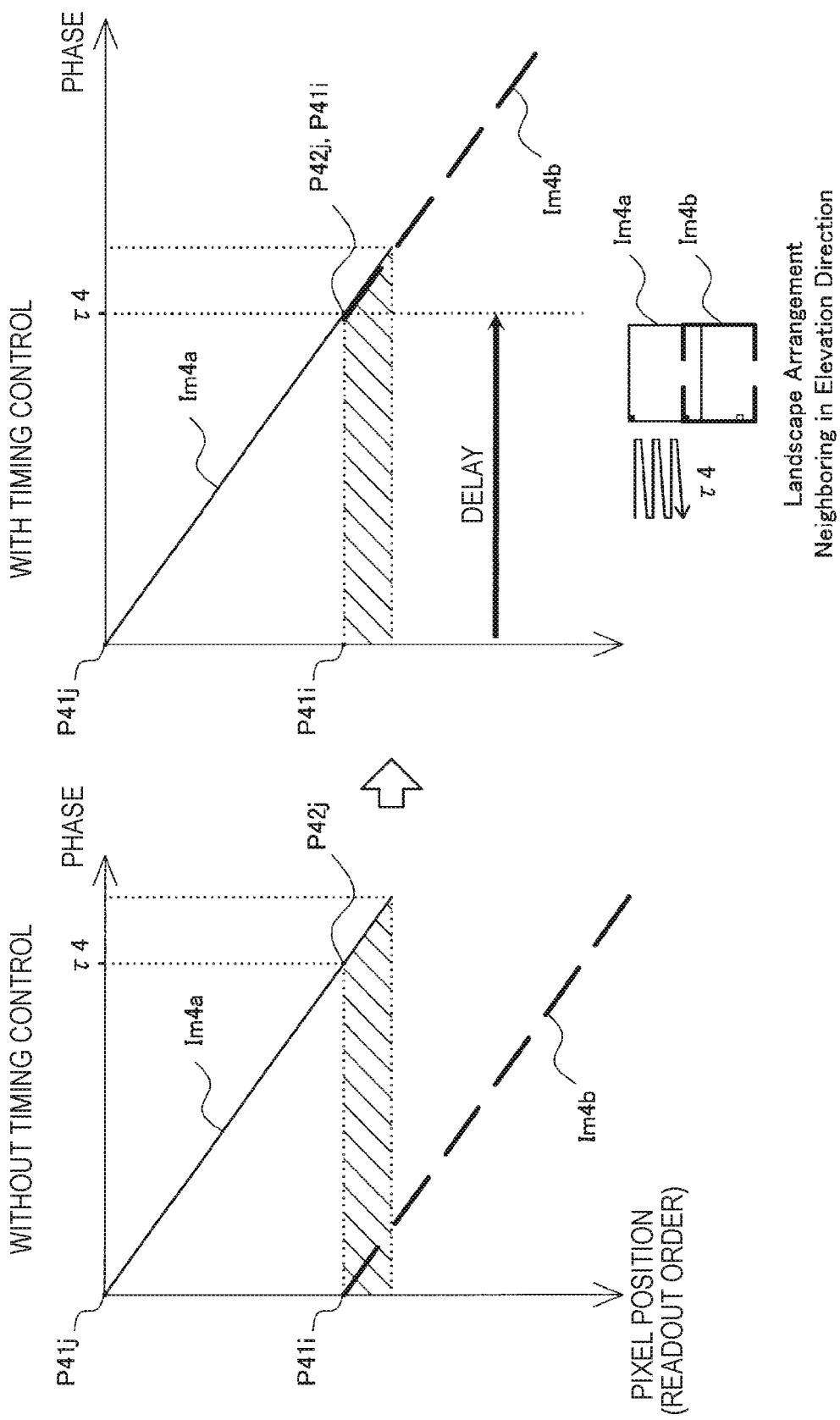
FIG. 11 is an explanatory diagram for describing an example of control of imaging timing between two camera modules arranged in the landscape arrangement and neighboring in the attack and depression angle direction.

FIG. 11 corresponds to the case where the first imaging unit 112*a* and the second imaging unit 112*b* are arranged in the landscape arrangement, and the fields of view of those imaging units neighbor in the attack and depression angle direction. In each of the timing charts, the solid line represents imaging timing (pixel value readout timing) of a first image signal Im4*a* generated by the first imaging unit 112*a* at each pixel position, and the broken line represents imaging timing of a second image signal Im4*b* generated by the second imaging unit 112*b* at each pixel position.

In the case where control of imaging timing by the imaging control unit 120 is not performed (see the left timing chart), imaging of the second image signal Im4*b* is started at the pixel P41*i* at the same time when imaging of the first image signal Im4*a* is started at the pixel P41*j*. Although the pixel P41*i* of the second image signal Im4*b* occupies substantially the same position as the pixel P42*j* of the first image signal Im4*a* in the integral field of view, the pixel value of the pixel P42*j* of the first image signal Im4*a* is not read out at this time point. Thereafter, at the time point when a time $\tau 4$ elapses, the pixel value of the pixel P42*j* is read out by the first imaging unit 112*a*.

In the case where control of imaging timing by the imaging control unit 120 is performed (see the right timing chart), the imaging control unit 120 delays readout of the pixel value of the leading pixel P41*i* in the second imaging unit 112*b* by the time $\tau 4$ until the readout pixel position in the first imaging unit 112*a* reaches the first pixel P42*j* in the overlapping portion from the leading pixel P41*j*. As a result, for pixels belonging to the overlapping portion of the fields of view, the phase of the first image signal Im4a and the phase of the second image signal Im4b agree.

Note that the delay times τ1 and τ3 in the case illustrated in FIG. 8 (the landscape arrangement, neighboring in the azimuth angle direction) and the case illustrated in FIG. 10 (the portrait arrangement, neighboring in the attack and depression angle direction) are shorter than the time required for reading out one line. Therefore, for a pair of imaging units 112 relevant to these cases, the imaging control unit 120 may not relatively delay the imaging timing ignoring a phase shift that less influences integral processing.

In one example, the memory 125 may store timing control information that defines the delay time τ1, τ2, τ3, or τ4 in advance as described using FIG. 8 to FIG. 11. For example, the timing control information not only defines the delay time of imaging timing of the second imaging unit 112b based on imaging timing of the first imaging unit 112a (that is, the delay time of imaging timing of the second image signal with respect to the first image signal), but also may define the delay time of imaging timing of each of the other imaging units 112c to 112n. The imaging control unit 120 may acquire timing control information that defines such a delay time in advance in association with each of the imaging units 112 from the memory 125, and may transmit an imaging start instruction signal to each of the imaging units 112 in accordance with the acquired timing control information. Instead, in accordance with the timing control information, the imaging start instruction signal may be successively forwarded between the imaging units 112 having neighboring fields of view using the imaging start instruction signal transmitted from the imaging control unit 120 to the first imaging unit 112a as a trigger, in such a manner from the imaging control unit 120 to the first imaging unit 112a, from the first imaging unit 112a to the second imaging unit 112b, from the second imaging unit 112b to the third imaging unit 112c (and so forth).

In another example, the imaging control unit 120 may dynamically determine the delay time of imaging timing of the other imaging units 112b to 112n based on the imaging timing of the first imaging unit 112a, and may transmit the imaging start instruction signal to each of the imaging units 112 in accordance with the determined delay time. Typically, the delay time of imaging timing between two imaging units 112 having neighboring fields of view may depend on a frame time as will be described later. Therefore, for example, the imaging control unit 120 may dynamically determine the delay time to be applied to each imaging unit depending on a required frame time (or a required frame rate) that may be set in a variable manner.

In any example, it is desirable that the imaging control unit 120 controls the pixel readout speed in the first imaging unit 112a the pixel readout speed in the first imaging unit 112a such that pixel values within the range from the leading pixel (for example, the pixel P11a in FIG. 8, a pixel P21a in FIG. 9, a pixel P31i in FIG. 10, or a pixel P41j in FIG. 11) to reach the overlapping portion (for example, the pixel P12a in FIG. 8, a pixel P22a in FIG. 9, a pixel P32i in FIG. 10, or a pixel P42j in FIG. 11) are read out during the delay time (for example, τ1, τ2, τ3, or τ4) for pixel value readout in the second imaging unit 112b.

(3) Imaging Control Unit—Determination of Delay Time

Here, it is assumed that the fields of view of $N_{CAM}$ imaging units 112 integrally cover the entire field of view of 360° around a certain reference axis. The $N_{CAM}$ imaging units 112 may be all the imaging units included in the multi-camera unit 110, or may be a subset of those imaging units (for example, four camera modules on the top surface side or four camera modules on the bottom surface side in the example of FIG. 1B). In addition, it is assumed that, in each frame time, the imaging timing of the first imaging unit 112a is the earliest among the $N_{CAM}$ imaging units 112, and the imaging timing of the n-th imaging unit 112n is the latest. The field of view of the n-th imaging unit 112n neighbors the field of view of the first imaging unit 112a (in the direction opposite to the pixel readout direction). In terms of imaging timing, imaging of the i-th frame by the first imaging unit 112a is performed subsequently to imaging of the i-1-th frame by the n-th imaging unit 112n. In such a configuration, by appropriately controlling the pixel readout speed and the delay time of imaging timing of the $N_{CAM}$ imaging units 112, a phase shift in the overlapping portion between a captured image of the i-1-th frame by the n-th imaging unit 112n and a captured image of the i-th frame by the first imaging unit 112a can be resolved for any integral number i, and integral processing of those captured images can be smoothed.

More specifically, assuming the case of FIG. 9 (the portrait arrangement/neighboring in the azimuth angle direction), pixel value readout in the $N_{CAM}$ imaging units 112 can be repeated cyclically without a phase shift over a plurality of frames in the case where the following relational expression holds between a frame time $T_{FRAME}$ which is a reciprocal of a required frame rate of an omnidirectional image and the number $N_{CAM}$ of imaging units 112 arranged around the reference axis which may be the vertical axis.

[Math. 1]

$$T_{FRAME} = (1 - r_{OL}) \cdot T_{FP} \cdot N_{CAM} \quad (1)$$

Note that $r_{OL}$ in Expression (1) represents the proportion of a portion in a captured image of one imaging unit 112 that overlaps a captured image of another imaging unit 112. $T_{FP}$ is a time required for one imaging unit 112 to read out a captured image in one focal plane. The delay time τ of imaging timing between two imaging units 112 having neighboring fields of view may be determined as follows on the basis of Expression (1).

[Math. 2]

$$\tau = (1 - r_{OL}) \cdot T_{FP} = \frac{T_{FRAME}}{N_{CAM}} \quad (2)$$

That is, the delay time τ of pixel value readout in the second imaging unit 112b with respect to the first imaging unit 112a in the $N_{CAM}$ imaging units 112, for example, is equal to a quotient obtained by dividing the required frame time $T_{FRAME}$ by the number $N_{CAM}$ of imaging units 112. As long as the fields of view and the proportion of the overlapping portion of the fields of view are uniform over a plurality of imaging units 112, the delay time between any two neighboring imaging units 112 may be the same value. In addition, the pixel readout speed $S_{FP}$ in each imaging unit 112 may be a quotient obtained by dividing the total number of pixels in one focal plane by the focal plane time $T_{FP}$, for example.

As an example, calculation of the delay time τ and the pixel readout speed $S_{FP}$ may be performed in advance (for example, during manufacturing of the camera or calibration after manufacturing) as described above. In that case, timing control information that defines the delay time of imaging timing of each imaging unit 112 and readout control information that defines the pixel readout speed $S_{FP}$ may be generated and stored by the memory 125. As another example, the imaging control unit 120 may dynamically calculate one or both of the delay time of imaging timing and the pixel readout speed of each imaging unit 112 using the above-described parameters.

Figure 12:
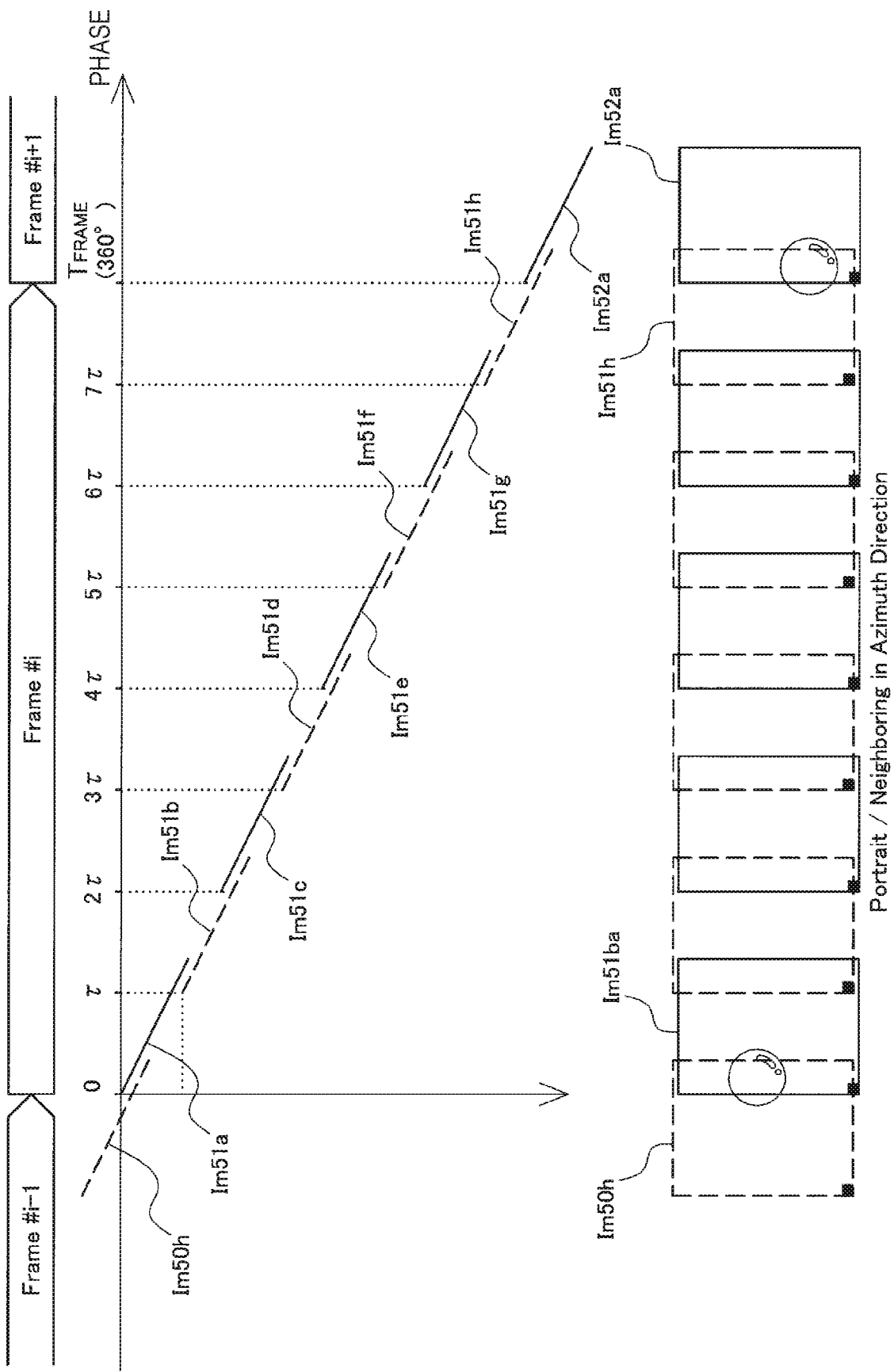
FIG. 12 is an explanatory diagram for describing an example of an omnidirectional image captured without a phase shift over a plurality of frames.

FIG. 12 is an explanatory diagram for describing an example of an omnidirectional image captured over a plurality of frames without a phase shift. Herein, it is assumed that the fields of view of eight imaging units 112 integrally cover the field of view of 360° (that is, $N_{CAM}$=8), and those imaging units 112 are arranged in the portrait arrangement, and their fields of view neighbor in the azimuth angle direction, as in the case of FIG. 9.

With reference to FIG. 12, the i-th frame of the omnidirectional image includes eight captured images Im51a, Im51b, Im51c, Im51d, Im51e, Im51f, Im51g, and Im51h. Then, imaging timings of these captured images are delayed by the delay time z sequentially from a captured image preceding in the pixel readout direction, and τ times 8 is equal to the frame time $T_{FRAME}$. That is, the product of the delay time τ and the number $N_{CAM}$ of imaging units 112 is equal to the frame time $T_{FRAME}$ of the omnidirectional image, and the total of phase delays is equivalent to 360°. As a consequence, the phase in the overlapping portion agrees between the captured image Im50h captured latest in the i−1-th frame and the captured image Im51a captured earliest in the i-th frame, and the phase in the overlapping portion also agrees between the captured image Im51h captured latest in the i-th frame and a captured image Im52a captured earliest in the i+1-th frame. With such a technique, even in the case where the field of view targeted for processing (or targeted for reproduction) straddles the phase origin (a point at which the phase is zero or 360° in FIG. 12), the image processing unit 130 or the display terminal 170 which will be described later can integrally process a captured image of the earliest field of view in the i−(or i+1-)th frame and a captured image of the latest field of view in the i−1-(or i-)th frame without being influenced by a phase shift.

Note that an omnidirectional image usually represents an image of a field of view around the camera two-dimensionally in accordance with the cylindrical projection (such as the equirectangular projection or the rectilinear projection, for example). In this case, the field of view circulates in one of the dimensions of an image, and the field of view does not circulate in the other dimension. In typical applications of the omnidirectional camera, a cyclical field of view is applied to the azimuth angle direction and a non-cyclical field of view is applied to the attack and depression angle direction in conformity to properties of the human visual system. In this case, it is advantageous to determine the delay time of imaging timing between the imaging units 112 having fields of view neighboring in the azimuth angle direction in accordance with Expression (2) above. The delay time of imaging timing between the imaging units 112 having fields of view neighboring in the non-cyclical direction may be determined with any technique as long as image signals of the overlapping portion of the fields of view agree in phase. In addition, in the case where the phase shift is so small that the influence exerted upon the image quality can be ignored, the delay time may not be set.

(4) Image Processing Unit

The image processing unit 130 integrally processes images represented by image signals input from the plurality of imaging units 112 of the multi-camera unit 110 to generate an output image. The image signals input from the plurality of imaging units 112 represent captured images that respectively reflect fields of view different from one another.

As an example, the image processing unit 130 may use a partial image in an overlapping portion of two captured images that reflect neighboring fields of view to stitch those captured images and generate a combined image. As another example, the image processing unit 130 may determine a parallax of a subject by executing stereo matching using two captured images overlapping each other. The image processing unit 130 may generate a depth map representing a result of parallax determination, or may generate an omnidirectional stereoscopic image. In order to determine a parallax over the entire field of view of 360°, it is desirable that the proportion of the overlapping portion between two captured images that reflect neighboring fields of view is more than or equal to 50%. As still another example, for accumulation or reproduction of an omnidirectional image including a plurality of captured images, the image processing unit 130 may simply forward those images to another device (for example, the server 160 or the display terminal 170 described using FIG. 6). The image processing unit 130 may subject the images to compression encoding in any video compression system before forwarding the images.

When executing stitching or stereo matching, for example, the image processing unit 130 may avoid the influence caused by a phase shift by integrally processing a captured image of the i−(or i+1-)th frame and a captured image of the i−1-(or i-)th frame in the case where the field of view targeted for processing straddles the phase origin. For such processing across the phase origin, the frame buffer 135 may buffer not only captured images of the newest frame imaged by the imaging units 112, respectively, but also captured images of the immediately preceding frame.

[1-3-2. Display Terminal]

FIG. 7 also shows an example of a configuration of the display terminal 170 according to the first embodiment. With reference to FIG. 7, the display terminal 170 includes a reproduction control unit 180, a frame buffer 185, and a display unit 190.

(1) Reproduction Control Unit

The reproduction control unit 180 acquires an omnidirectional image output from the imaging device 100 in accordance with a trigger for reproduction start detected via some user interface (not shown), for example, to reproduce the omnidirectional image on the screen of the display unit 190. The reproduction control unit 180 may receive the image directly from the imaging device 100, or may receive the image via an intermediate device such as the server 160, for example.

The omnidirectional image acquired by the reproduction control unit 180 typically includes a plurality of images that respectively reflect fields of view different from one another per frame. Each image may be a captured image itself generated by the imaging unit 112 of the imaging device 100, or an image (for example, a stereoscopic image including a right-eye image and a left-eye image) generated by processing a captured image. For example, the reproduction control unit 180 trims or links one or more images corresponding to a reproduction field of view instructed by a user (or autonomously determined in accordance with the attitude of the terminal, for example) to construct a displayed image of the reproduction field of view. Then, the reproduction control unit 180 outputs the constructed displayed image to the display unit 190.

Figure 13:
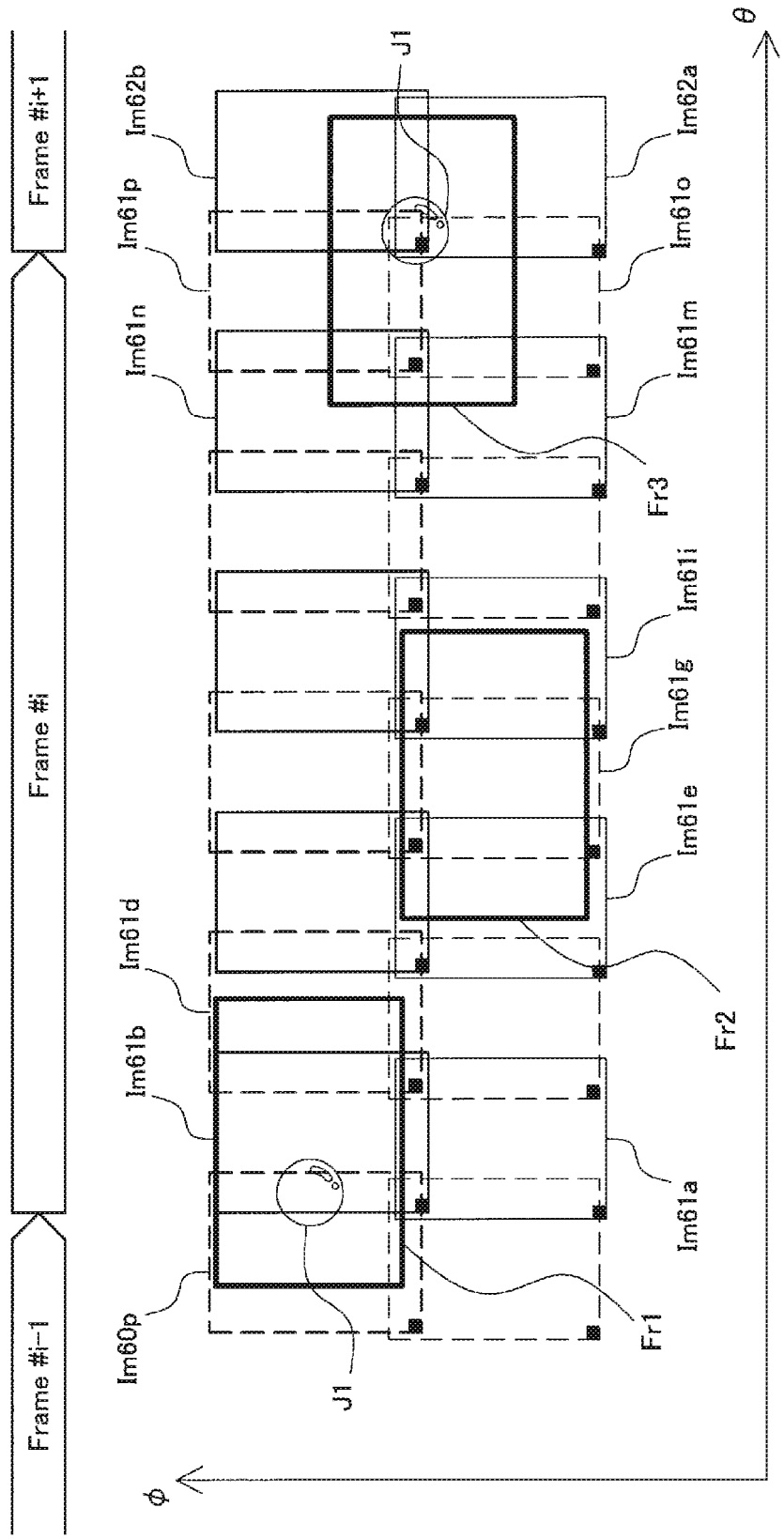
FIG. 13 is an explanatory diagram for describing some examples of displayed images that may be constructed in accordance with various reproduction fields of view.

FIG. 13 is an explanatory diagram for describing some examples of displayed images that may be constructed in accordance with various reproduction fields of view. Here, it is assumed that the fields of view of eight imaging units 112 cover the field of view of 360° in the azimuth angle direction, and two imaging units 112 cover the integral field of view in the attack and depression angle direction. Therefore, an omnidirectional image of one frame includes sixteen images in total. The reproduction field of view is smaller than the entire field of view of the omnidirectional image. In FIG. 13, three illustrative reproduction fields of view Fr1, Fr2, and Fr3 are shown by thick-frame rectangles. The reproduction control unit 180 may acquire an image Im60p in the i−1-th frame and images Im61b and Im61d in the i-th frame, for example, and trim required portions from those images Im60p, Im61b, and Im61d and link the required portions to construct a displayed image of the reproduction field of view Fr1. In addition, the reproduction control unit 180 may acquire images Im61e, Im61g, and Im61i in the i-th frame, and trim required portions from them and link the required portions to construct a displayed image of the reproduction field of view Fr2. In addition, the reproduction control unit 180 may acquire images Im61m, Im61n, Im61o, and Im61p in the i-th frame and images Im62a and Im62b in the i+1-th frame, and trim required portions from them and link the required portions to construct a displayed image of the reproduction field of view Fr3. For example, the reproduction field of view Fr1 reflects a subject J1, and the image of the subject J1 may be reproduced without distortion or failure since there is no phase shift between partial images included in the displayed image of the reproduction field of view Fr1 regardless of that those partial images have been captured by different camera modules. Similarly, the reproduction field of view Fr3 also reflects the subject J1, and the image of the subject J1 may be reproduced without distortion or failure since there is no phase shift between partial images included in the displayed image of the reproduction field of view Fr3. In contrast, if the displayed image of the reproduction field of view Fr3 is constructed from the images Im61a, Im61b, Im61m, Im61n, Im61o, and Im61p in the i-th frame, the image of the subject J1 should fail due to a phase shift between the images Im61a, Im61b and the remaining images. However, such a failure may be prevented by the technique described in the above-described embodiment.

The frame buffer 185 buffers individual images included in an omnidirectional image (still image or moving image) acquired by the reproduction control unit 180 for the past two frames. Accordingly, if the reproduction field of view is set in any direction in the entire field of view of 360°, it is possible to make access to all the partial images required for the reproduction control unit 180 to appropriately construct the displayed image of that reproduction field of view.

(2) Display Unit

The display unit 190 is typically a display device that may include a screen and a display driver. The display unit 190 reproduces a displayed image of a reproduction field of view input from the reproduction control unit 180 on the screen. The screen may be, for example, equivalent to a microdisplay in the eyeglass wearable terminal 170a shown in FIG. 6, and a touch panel in the mobile terminal 170b. However, the omnidirectional image is not limited to these examples, but may be displayed on a monitor of a fixed terminal such as a personal computer (PC) or a television device, for example. In addition, the omnidirectional image may be projected onto a screen by a projector.

1-4. Examples of Flow of Processing

In the present section, an example of a flow of processing that may be executed by each device in the above-described embodiment will be described using several flowcharts. Note that a plurality of processing steps are described in the flowcharts, and those processing steps are not necessarily executed in the order shown in the flowcharts. Several processing steps may be executed in parallel. In addition, additional processing steps may be employed, and some processing steps may be omitted.

[1-4-1. Imaging Control Processing]

Figure 14:
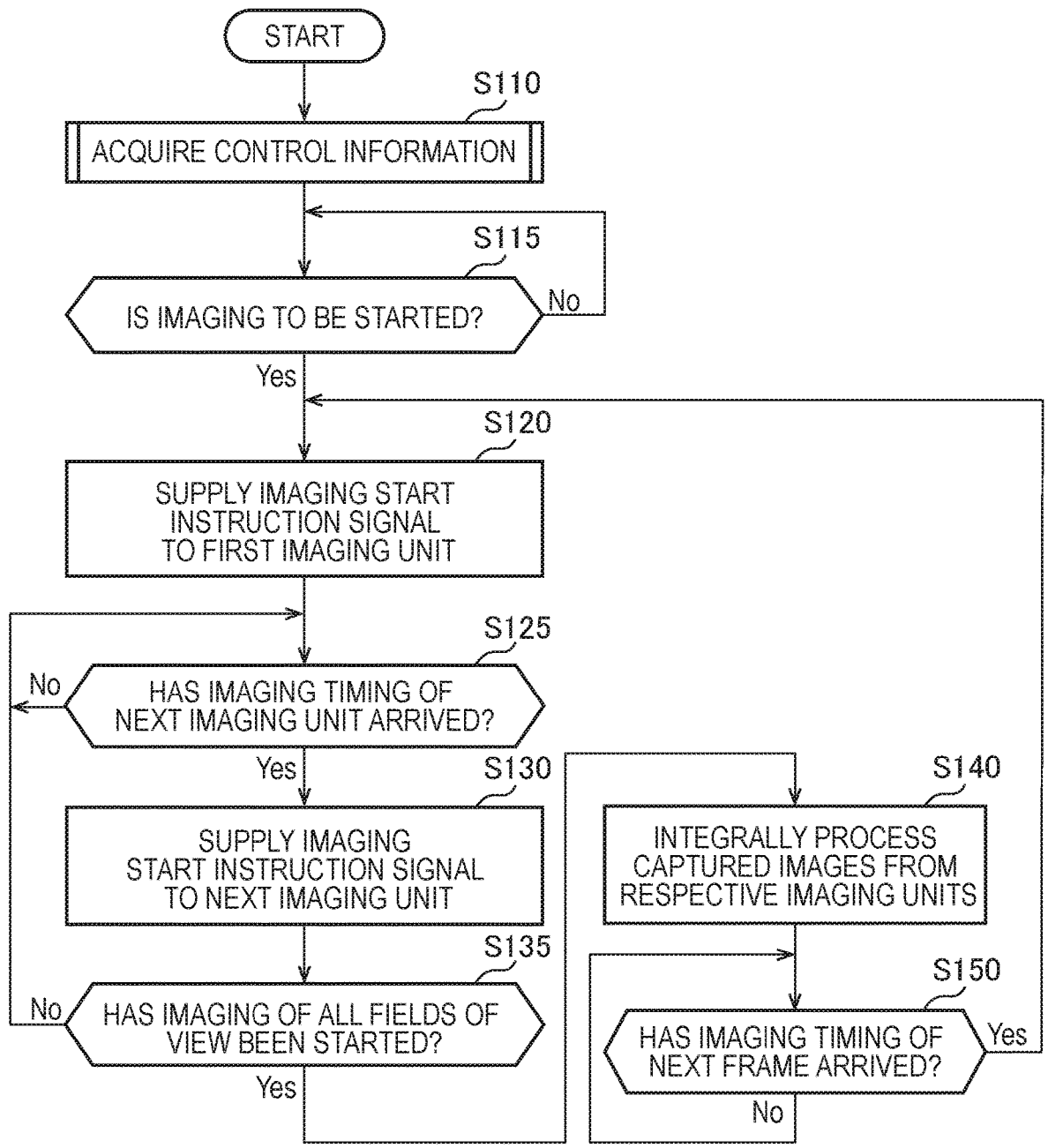
FIG. 14 is a flowchart showing an example of a flow of imaging control processing according to the first embodiment.

FIG. 14 is a flowchart showing an example of a flow of imaging control processing that may be executed by the imaging control unit 120 according to the first embodiment.

With reference to FIG. 14, the imaging control unit 120 first acquires control information for controlling an imaging operation in the multi-camera unit 110 (step S110). The control information acquired herein may include timing control information that defines the delay time of imaging timing of each of the plurality of imaging units 112, and readout control information that defines the pixel readout speed.

Next, the imaging control unit 120 awaits a trigger for starting imaging (step S115). For example, when a user input that instructs the start of imaging is detected via a user interface, or a control command that instructs the start of imaging is detected via a communication interface, the imaging control processing proceeds into step S120.

In step S120, the imaging control unit 120 supplies the imaging start instruction signal to the first imaging unit 112a that should operate at the earliest timing among the plurality of imaging units 112 (step S120). The first imaging unit 112a is triggered by the supplied imaging start instruction signal to start readout of the pixel value from the leading pixel in the focal plane by the sequential readout system. The pixel readout speed in each imaging unit 112 may be designated by the imaging start instruction signal, or may be set via a different control signal.

Thereafter, when the delay time defined by the timing control information elapses, and the imaging timing of the second imaging unit 112b that should operate next arrives (step S125), the imaging start instruction signal is supplied to the second imaging unit 112b (step S130). Waiting for such a delay time and supply of the imaging start signal is repeated until imaging of all the fields of view is started (step S135).

The image processing unit 130 integrally processes captured images that reflect different fields of view imaged respectively in this manner by the plurality of imaging units 112 at different timings (step S140). When the imaging timing of the next frame arrives (step S150), the imaging control unit 120 supplies the imaging start instruction signal to the first imaging unit 112a again (step S120). Such capturing of the omnidirectional image may be repeated until the termination of imaging is instructed.

[1-4-2. Control Information Acquisition Processing]

(1) First Example

Figure 15A:
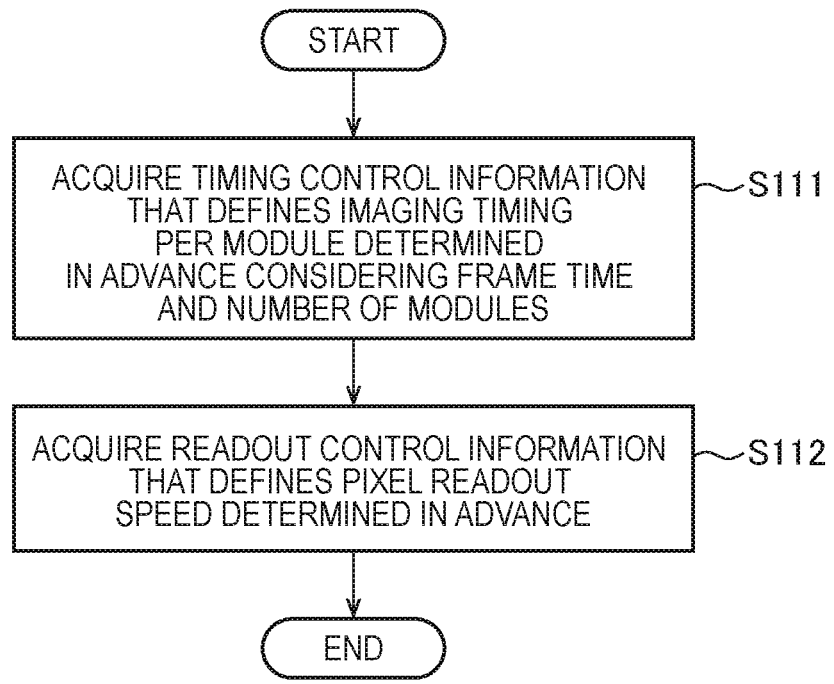
FIG. 15A is a flowchart showing an example of a detailed flow of control information acquisition processing.

FIG. 15A is a flowchart showing an example of a detailed flow of control information acquisition processing that may be executed in step S110 in FIG. 14.

With reference to FIG. 15A, the imaging control unit 120 first acquires timing control information that defines imaging timing per module determined in advance considering the frame time $T_{FRAME}$ of an omnidirectional image and the camera module number $N_{CAM}$ from the memory 125 (step S111).

In addition, the imaging control unit 120 acquires readout control information that defines the pixel readout speed determined in advance from the memory 125 (step S112).

(2) Second Example

Figure 15B:
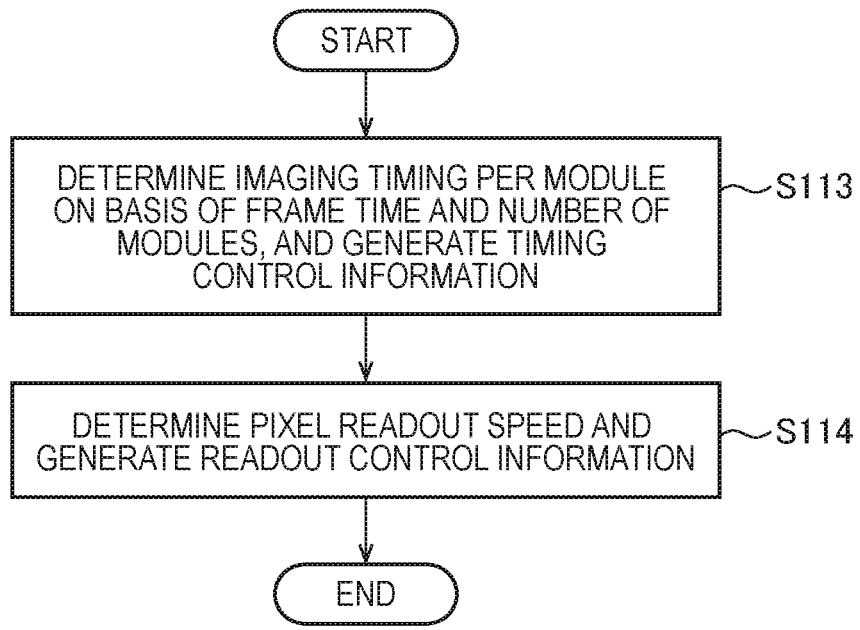
FIG. 15B is a flowchart showing another example of a detailed flow of control information acquisition processing.

FIG. 15B is a flowchart showing another example of a detailed flow of control information acquisition processing that may be executed in step S110 in FIG. 14.

With reference to FIG. 15B, on the basis of the frame time $T_{FRAME}$ of the omnidirectional image and the camera module number $N_{CAM}$, the imaging control unit 120 first determines the imaging timing per module (for example, the delay time of imaging timing of another imaging unit 112 based on the imaging timing of one imaging unit 112), and generates timing control information indicating the determined imaging timing (step S113).

In addition, the imaging control unit 120 determines the pixel readout speed on the basis of parameters such as the total number of pixels in one focal plane and the focal plane time, for example, and generates readout control information indicating the determined pixel readout speed (step S114).

[1-4-3. Reproduction Control Processing]

Figure 16:
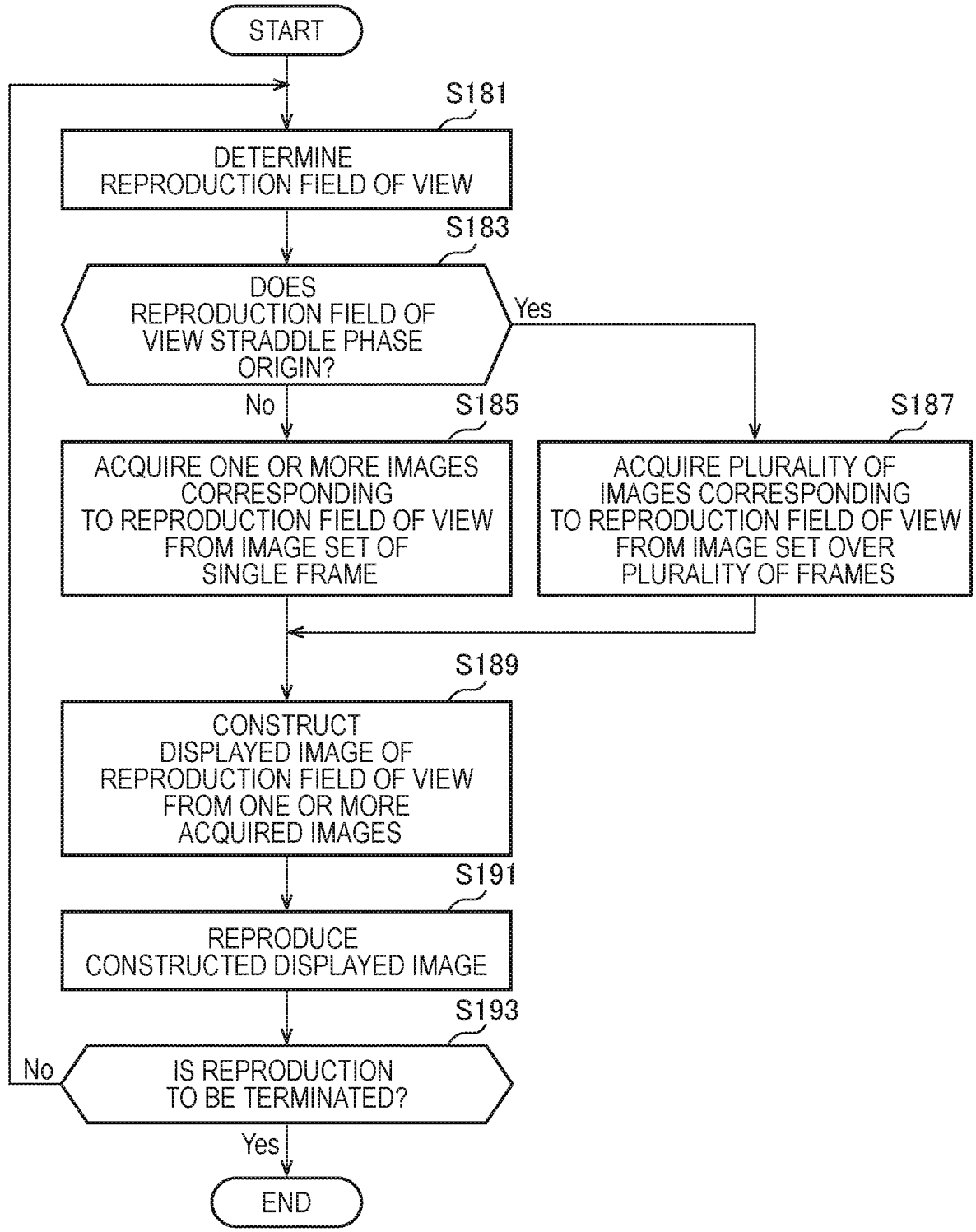
FIG. 16 is a flowchart showing an example of a flow of reproduction control processing according to the first embodiment.

FIG. 16 is a flowchart showing an example of a flow of reproduction control processing that may be executed by the display terminal 170 according to the first embodiment.

When reproduction of an omnidirectional image is started, for example, the reproduction control unit 180 of the display terminal 170 determines the reproduction field of view on the basis of an instruction from the user or a result of measuring the attitude of the terminal (step S181). Subsequent processing branches in accordance with whether or not the determined reproduction field of view straddles the phase origin (step S183).

In the case where the reproduction field of view do not straddle the phase origin, the reproduction control unit 180 acquires one or more images corresponding to the reproduction field of view from an image set included in an omnidirectional image of a single frame (step S185). On the other hand, in the case where the reproduction field of view straddles the phase origin, the reproduction control unit 180 acquires a plurality of images corresponding to the reproduction field of view from an image set included in an omnidirectional image over a plurality of frames (step S187).

Next, the reproduction control unit 180 trims or links one or more images acquired in step S185 or S187 in agreement with the reproduction field of view to construct the displayed image of the reproduction field of view (step S189).

Then, the display unit 190 reproduces the displayed image of the reproduction field of view constructed by the reproduction control unit 180 on the screen (step S191). Such reproduction of an omnidirectional image may be repeated until the termination of reproduction is instructed (step S193).

1-5. Summary of First Embodiment

The first embodiment of the technology according to the present disclosure has been described in detail so far using FIGS. 1A, 1B, 2A, 2B, 3A, 3B, 4A, 4B, 5A, 5B, 15A, 15B, and FIG. 16. According to the first embodiment, the imaging timing of at least one of two imaging units that image fields of view that partially overlap each other and generate image signals, respectively, is controlled such that the image signals corresponding to the overlapping portion of those fields of view agree in phase. That is, since a phase shift between two imaging units is suppressed, it is possible to prevent integral processing of captured images from the two imaging units from becoming difficult due to a phase shift. For example, even if a captured image reflects a quickly moving subject or background, the accuracy of integral processing is not reduced. In addition, even if two captured images are combined, the image of a subject or background existing in the overlapping portion of the fields of view does not fail.

Such an advantage may be enjoyed also in the case where an image signal is read out from the image sensor in the sequential readout system in each imaging unit. Therefore, CMOS can be employed as an image sensor, for example, and it is not necessary to mount a global shutter on the CMOS device. This means that the present embodiment facilitates low-cost manufacture or size reduction of an omnidirectional camera capable of imaging a quickly moving subject in high quality or an omnidirectional camera that may even support quick camera work.

In addition, according to the first embodiment, readout of the pixel value of the leading pixel in the second imaging unit may be delayed by the time until the readout pixel position in the first imaging unit having a field of view preceding the field of view of the second imaging unit in the pixel readout direction reaches the overlapping portion of the fields of view from the leading pixel. In this case, with simple control of delaying the timing of starting pixel value readout in each frame per imaging unit, it is possible to make image signals corresponding to the overlapping portion of the fields of view agree in phase. In the case where such a delay time per imaging unit is determined in advance, an additional calculation burden is not imposed on camera processing during imaging. In the case where the delay time is dynamically calculated, a phase shift can be suppressed while providing flexibility of causing the user to variably set parameters such as the required frame rate, for example.

In addition, according to the first embodiment, the above-described delay time may be determined on the basis of the number of imaging units that integrally cover the entire field of view of 360° around a certain reference axis and a required frame time. In this case, in an omnidirectional image that two-dimensionally expresses an image of the field of view around a camera by the cylindrical projection, for example, a phase shift can be suppressed smoothly at any position in the circulating direction (for example, the azimuth angle direction).

In addition, according to the first embodiment, the pixel readout speed in each imaging unit may be controlled such that pixel values in a range from the leading pixel to reach the overlapping portion of the fields of view are read out during the above-described delay time. In this case, whatever proportion to the whole image the overlapping portion of the fields of view has, the above-described delay time can be achieved by controlling the pixel readout speed, so that a phase shift can be suppressed reliably.

2. Second Embodiment 2-1. Introduction

[2-1-1. Overview of Issues]

In the foregoing sections, a shift in imaging timing between captured images respectively captured by a plurality of camera modules of an omnidirectional camera has been studied. Here, a shift in imaging timing between a plurality of captured images sequentially captured by a rotating camera module will be studied.

For example, it is assumed that a single camera module performs imaging M times while rotating 360° around a certain rotation axis. In the case where the field of view of one imaging has a viewing angle more than or equal to 360°/M, M captured images cover the entire field of view of 360°. By stitching these M captured images, one omnidirectional image can be generated. In the case where the camera module performs imaging while rotating X times, omnidirectional video for X omnidirectional frames can include X·M captured images. Similarly to the first embodiment, by reproducing a partial image of a reproduction field of view corresponding to the orientation of the terminal in the omnidirectional frame of the entire field of view of 360°, the display terminal can provide the user with an experience as if a scene as reflected in the omnidirectional frame spreads around the user.

However, for example, the imaging timing is greatly different between the first captured image positioned at the beginning in the forward direction in the omnidirectional frame and the M-th captured image positioned at the end in the forward direction. Denoting the time difference between imaging timings of neighboring captured images by Δt, the time difference between imaging timings of two captured images positioned on the both ends of the omnidirectional frame is (M−1)·Δt. If a reproduction image is going to be generated on the basis of the first captured image and the M-th captured image in the case where the reproduction field of view straddles a reference direction equivalent to the boundary of the omnidirectional frame, inconsistency in how a subject or background is seen occurring due to the time difference (M−1)·Δt between them interferes with generation of the reproduction image without failure.

The present embodiment proposes a technology for resolving or reducing inconvenience resulting from a shift in imaging timing in reproduction of omnidirectional video based on captured images from such a rotating camera module.

[2-1-2. Example of Configuration of Rotating Camera]

Figure 17:
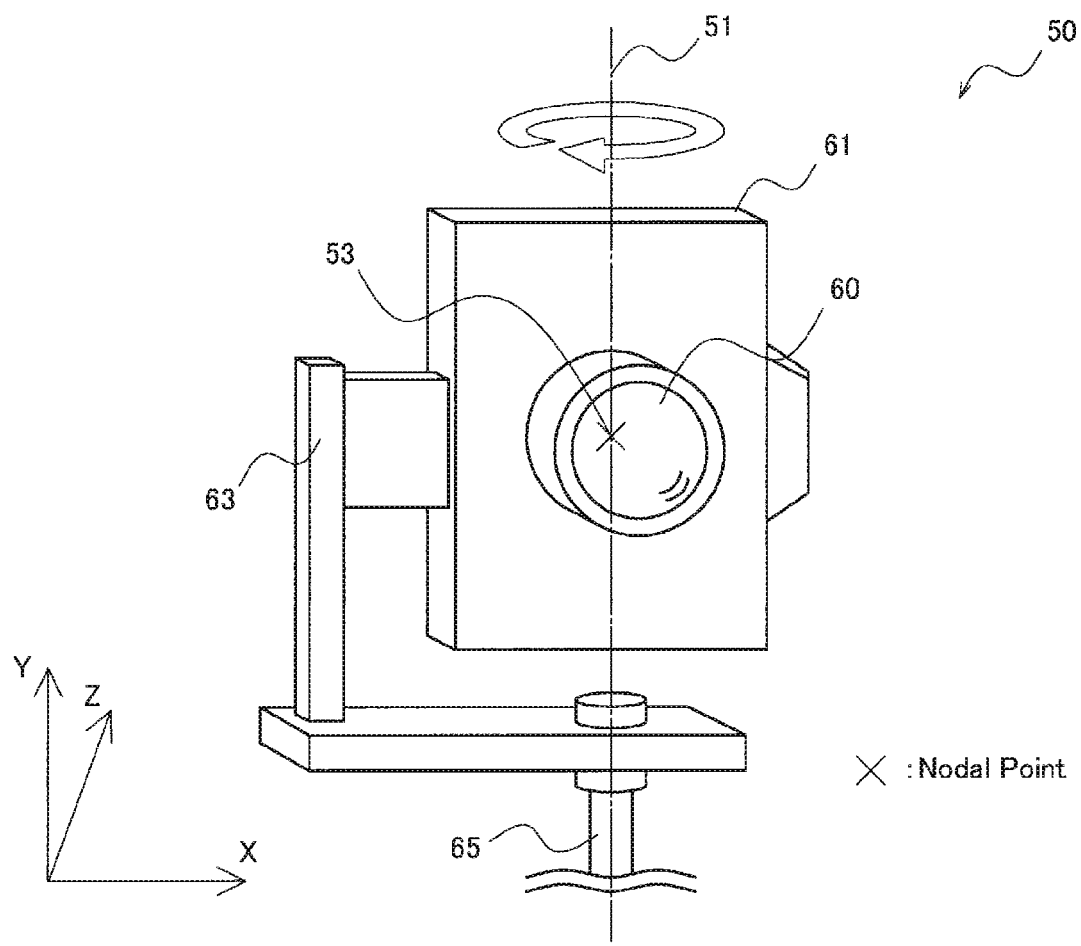
FIG. 17 is an explanatory diagram for describing an example of a schematic configuration of a rotating camera.

FIG. 17 is an explanatory diagram for describing an example of a schematic configuration of a rotating camera. A rotating camera 50 shown in FIG. 17 includes an enclosure 61 including a camera module 60, a rotating member 63, and a fixed member 65. The enclosure 61 has one side surface (or the bottom surface) coupled to the rotating member 63 in a fixed manner. The rotating member 63 is coupled to the fixed member 65 rotationally around a rotation axis 51. In the example of FIG. 17, the rotation axis 51 is the vertical axis. When the rotating member 63 is driven by a motor not shown, for example, and rotates with respect to the rotation axis 51 of the fixed member 65, the camera module 60 also rotates around the rotation axis 51. The camera module 60 performs imaging periodically while rotating in such a manner in detail to generate a captured image, as will be described later. The intersection between the rotation axis 51 and the optical axis of the camera module 60 is referred to as a nodal point. While the camera module 60 is rotating, a nodal point 53 does not move.

Figure 18:
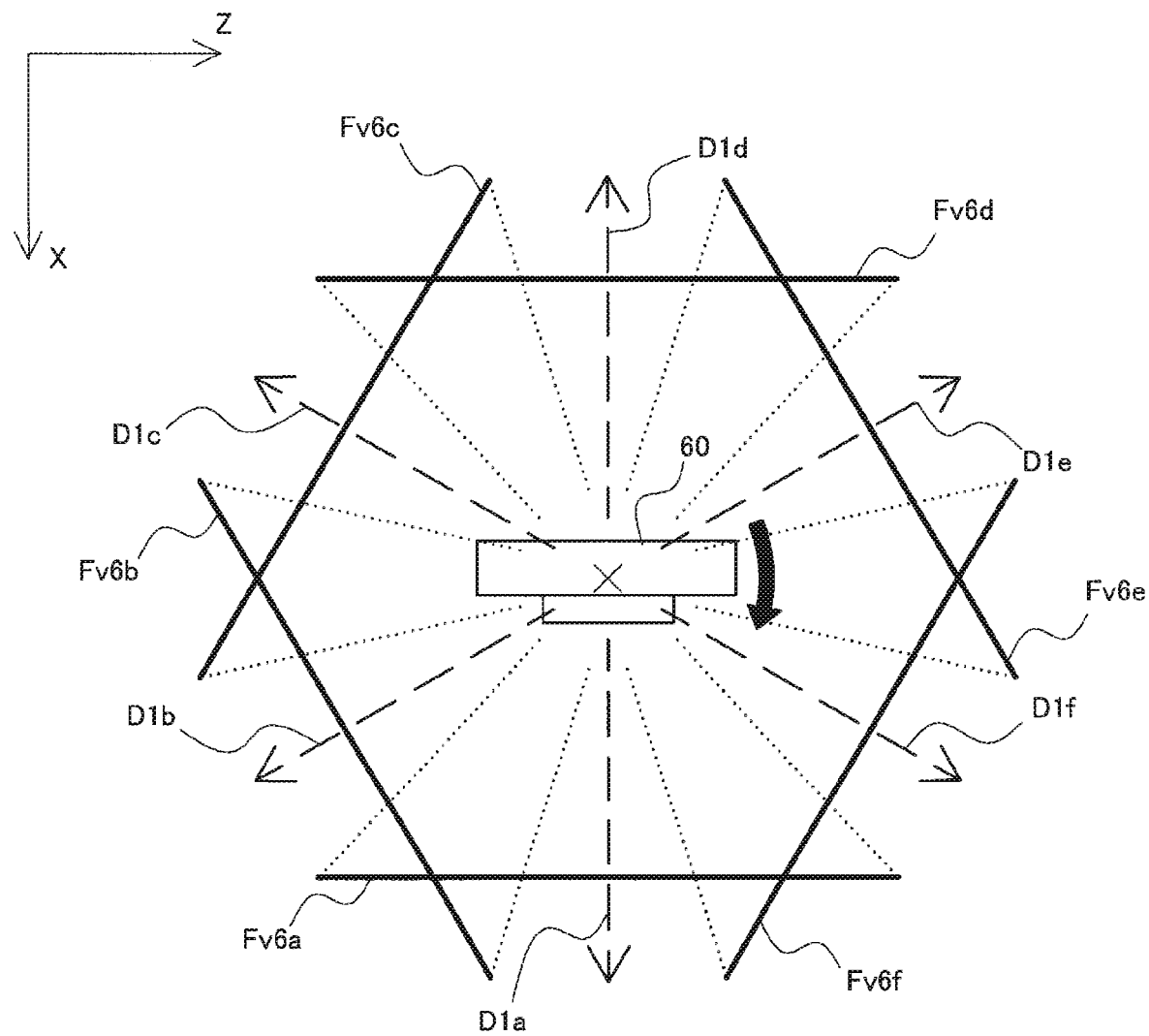
FIG. 18 is an explanatory diagram showing a camera module and an imaging field of view revolving in accordance with rotation of the camera module.

FIG. 18 shows the camera module 60 as seen from vertically above and an imaging field of view revolving around the nodal point 53 (or the rotation axis 51) in accordance with the rotation of the camera module 60. In the example of FIG. 18, the camera module 60 performs imaging six times during a rotation. For example, the camera module 60 is directed to a first imaging direction D1a and performs first imaging for a first imaging field of view Fv6a. Next, the camera module 60 is directed to a second imaging direction D1b and performs second imaging for a second imaging field of view Fv6b. Next, the camera module 60 is directed to a third imaging direction D1c and performs third imaging for a third imaging field of view Fv6c. Next, the camera module 60 is directed to a fourth imaging direction D1d and performs fourth imaging for a fourth imaging field of view Fv6d. Next, the camera module 60 is directed to a fifth imaging direction D1e and performs fifth imaging for a fifth imaging field of view Fv6e. Next, the camera module 60 is directed to a sixth imaging direction D1f and performs sixth imaging for a sixth imaging field of view Fv6f. In the case where the entire field of view of 360° is covered by six imaging fields of view in this manner, any two imaging fields of view imaged consecutively overlap each other if the viewing angle of each of the imaging fields of view is larger than 60° (=360°/6). By integrating six captured images obtained through such imaging, one omnidirectional image can be obtained. Further, omnidirectional video over a plurality of omnidirectional frames can be constructed by the camera module 60 continuing imaging while continuing rotating.

Note that the rotating camera shown in FIG. 17 and FIG. 18 is a mere example. For example, the present embodiment is also applicable to the case where the rotation axis 51 has any inclination. In addition, the rotating camera may have two or more camera modules. The rotating camera may perform imaging at any number of times during a rotation. Imaging may be performed L times (L>M) during a rotation, and omnidirectional video may be constructed only on the basis of M captured images among L captured images (for example, L=2M and omnidirectional video may be constructed only from alternate captured images). In addition, FIG. 17 shows an example where the rotating member 63 has an arm-like shape and the fixed member 65 has a rod-like shape, whilst these members may have other shapes.

2-2. Example of Configuration of Camera System

Figure 19:
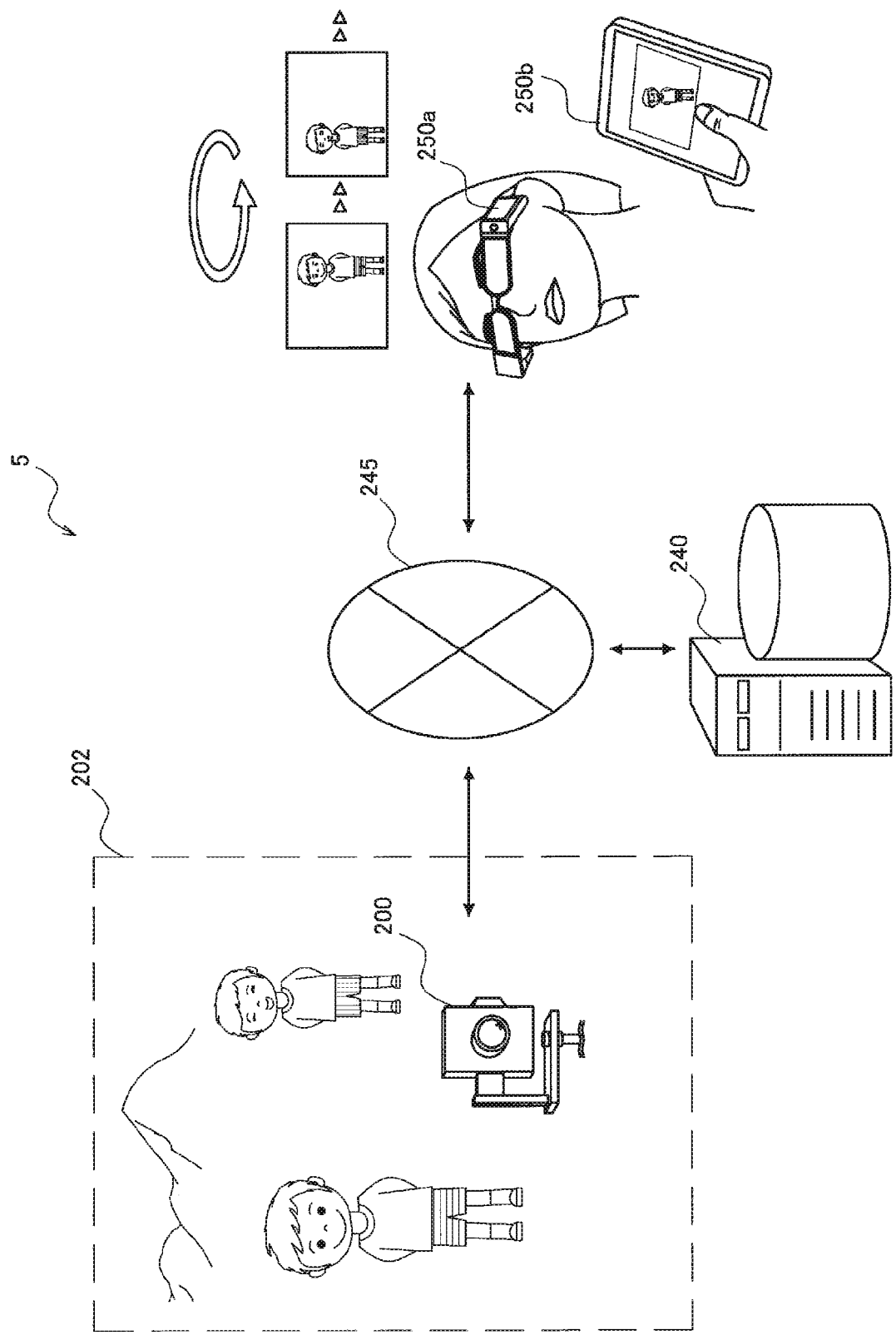
FIG. 19 is a schematic diagram showing an example of a configuration of a camera system according to a second embodiment.

FIG. 19 is a schematic diagram showing an example of a configuration of the camera system according to the second embodiment. With reference to FIG. 19, a camera system 5 may include an imaging device 200, a server 240, and display terminals 250a and 250b.

The imaging device 200 is a device similar to the rotating camera 50 illustrated in FIG. 17 that, for example, performs imaging periodically while rotating around a certain rotation axis. In the example of FIG. 19, the imaging device 200 is placed in an imaging environment 202. The imaging device 200 may be, for example, a standalone device that records captured images in a local memory. In addition, the imaging device 200 may be connected to the server 240 or the display terminal 250a or 250b via a network 245.

The server 240 is an information processing device that accumulates captured images generated by the imaging device 200 or an omnidirectional frame generated from those captured image. The server 240 receives an image from the imaging device 200 via the network 245 or via a direct connection line (not shown), and causes a storage medium to store the received image. In addition, in accordance with a request received from a display terminal 250 (250a or 250b), the server 240 distributes the image received from the imaging device 200 to the display terminal 250. Note that, in the case where the imaging device 200 and the display terminal 250 are directly connected, the camera system 5 may not include the server 240.

The network 245 may be a public network such as the Internet, or a private network such as a home network or a corporate network. The network 245 may include any combination of a wireless link and a wired link.

The display terminal 250a is a terminal device having the function of displaying an image captured by the imaging device 200. In the example of FIG. 19, the display terminal 250a is a wearable terminal worn on the head of a user. The user can reproduce an image captured by the imaging device 200 on the screen of the display terminal 250a. In the case where the user is directed to a certain direction, an image of a reproduction field of view corresponding to that direction in the entire field of view of 360° may be reproduced. Then, when the user directs his/her head to another direction (or inputs an instruction to move the reproduction field of view to the display terminal 250a), the reproduction field of view changes, and an image of the reproduction field of view after the change may be reproduced.

The display terminal 250b is also a terminal device having the function of displaying an image captured by the imaging device 200. In the example of FIG. 19, the display terminal 250b is a mobile terminal held by the user. The user can reproduce an omnidirectional image captured by the imaging device 200 on the screen of the display terminal 250b. In the case where the display terminal 250b is directed to a certain direction, a displayed image of a reproduction field of view corresponding to that direction in the entire field of view of 360° may be reproduced. Then, when the user directs the display terminal 250b to another direction (or inputs an instruction to move the reproduction field of view to the display terminal 250b), the reproduction field of view changes, and a displayed image of the reproduction field of view after the change may be reproduced. The display terminal 250 may acquire an omnidirectional image directly from the imaging device 200, or may acquire an image from the server 240.

Processing of constructing omnidirectional frames or individual reproduction images from a series of captured images may be performed by any of the imaging device, the server, and the display terminal. In the present section, first, as a first example, an example where the imaging device generates each of omnidirectional frames included in omnidirectional video will be described. Next, as a second example, an example where a display terminal generates a reproduction image for omnidirectional video from individual captured images generated by the imaging device will be described.

2-3. First Example

[2-3-1. Imaging Device]

Figure 20:
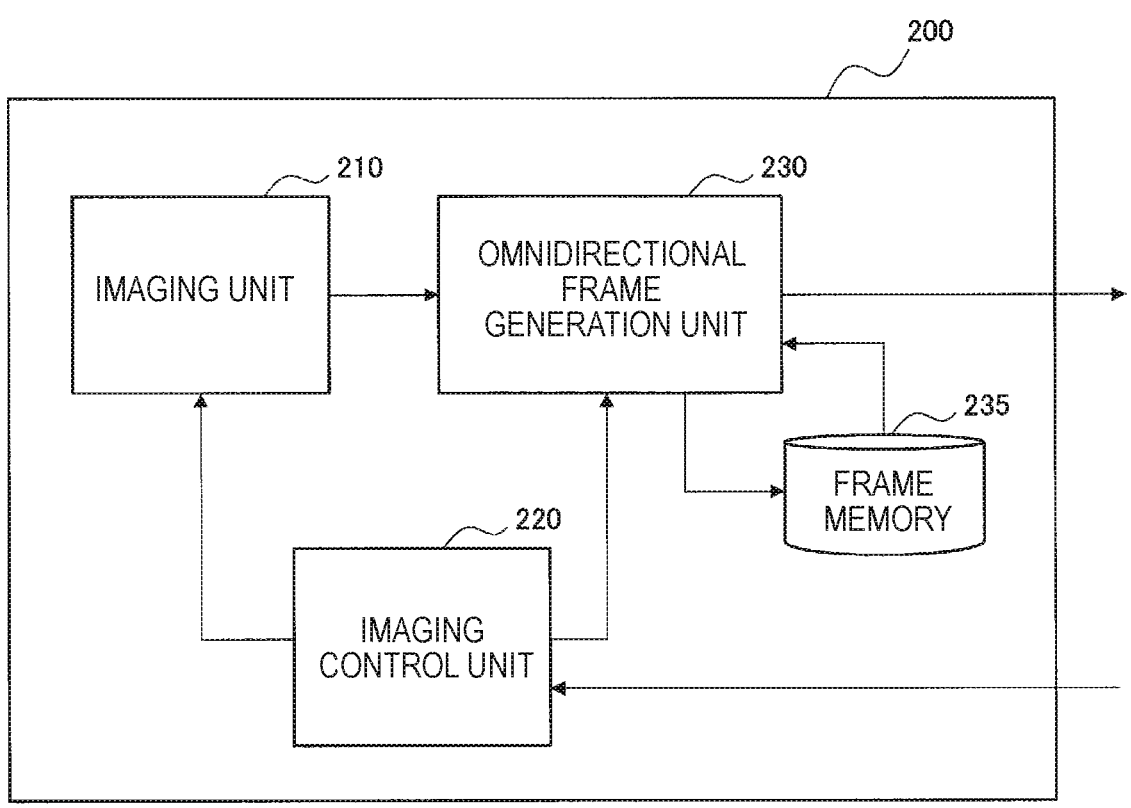
FIG. 20 is a block diagram showing an example of a configuration of an imaging device according to a first example of the second embodiment.

FIG. 20 shows an example of a configuration of the imaging device 200 according to a first example of the second embodiment. With reference to FIG. 20, the imaging device 200 includes an imaging unit 210, an imaging control unit 220, an omnidirectional frame generation unit 230, and a frame memory 235.

(1) Imaging Unit

The imaging unit 210 generates a captured image by imaging an imaging field of view to which the optical axis is directed at that time point under control exerted by the imaging control unit 220 which will be described later. More specifically, while the imaging control unit 220 causes the imaging direction of the imaging unit 210 to make one rotation around the rotation axis (causes the imaging field of view to make one revolution), the imaging unit 210 sequentially images at least M (M>1) imaging fields of view partially overlapping one another to generate M captured images. The entire field of view of 360° of the omnidirectional frame is integrally covered by the first to the M-th, M imaging fields of view. The imaging unit 210 sequentially outputs image signals representing these captured images to the omnidirectional frame generation unit 230.

(2) Imaging Control Unit

The imaging control unit 220 controls the rotation of an enclosure of the imaging device 200 and an imaging operation in the imaging unit 210. The imaging control unit 220 starts a rotation around the rotation axis of the enclosure of the imaging device 200 in accordance with an instruction for the start of imaging detected via some user interface (not shown) or communication interface (not shown), for example. In addition, the imaging control unit 220 causes the imaging unit 210 to perform imaging at respective timings when the imaging unit 210 is directed to M imaging fields of view (or more imaging fields of view) from the first imaging field of view to the M-th imaging field of view with the reference direction serving as the starting point. The imaging control unit 220 causes periodic imaging by the imaging unit 210 to terminate and stops the rotation of the enclosure of the imaging device 200 in accordance with an instruction for termination of imaging detected via some user interface or communication interface, for example.

(3) Omnidirectional Frame Generation Unit

The omnidirectional frame generation unit 230 integrally processes captured images input from the imaging unit 210 to generate an omnidirectional frame. As described above, M captured images sequentially input from the imaging unit 210 respectively reflect imaging fields of view different from one another, and cover the entire field of view of 360° as a whole. In a certain technique, the omnidirectional frame generation unit 230 may overlap overlapping portions of two captured images that reflect neighboring fields of view to couple those two captured images. In another technique, the omnidirectional frame generation unit 230 may trim one of the overlapping portions of two captured images that reflect neighboring fields of view, and then may couple the two captured images. The term stitching in the present specification shall include both of these two techniques.

Figure 21:
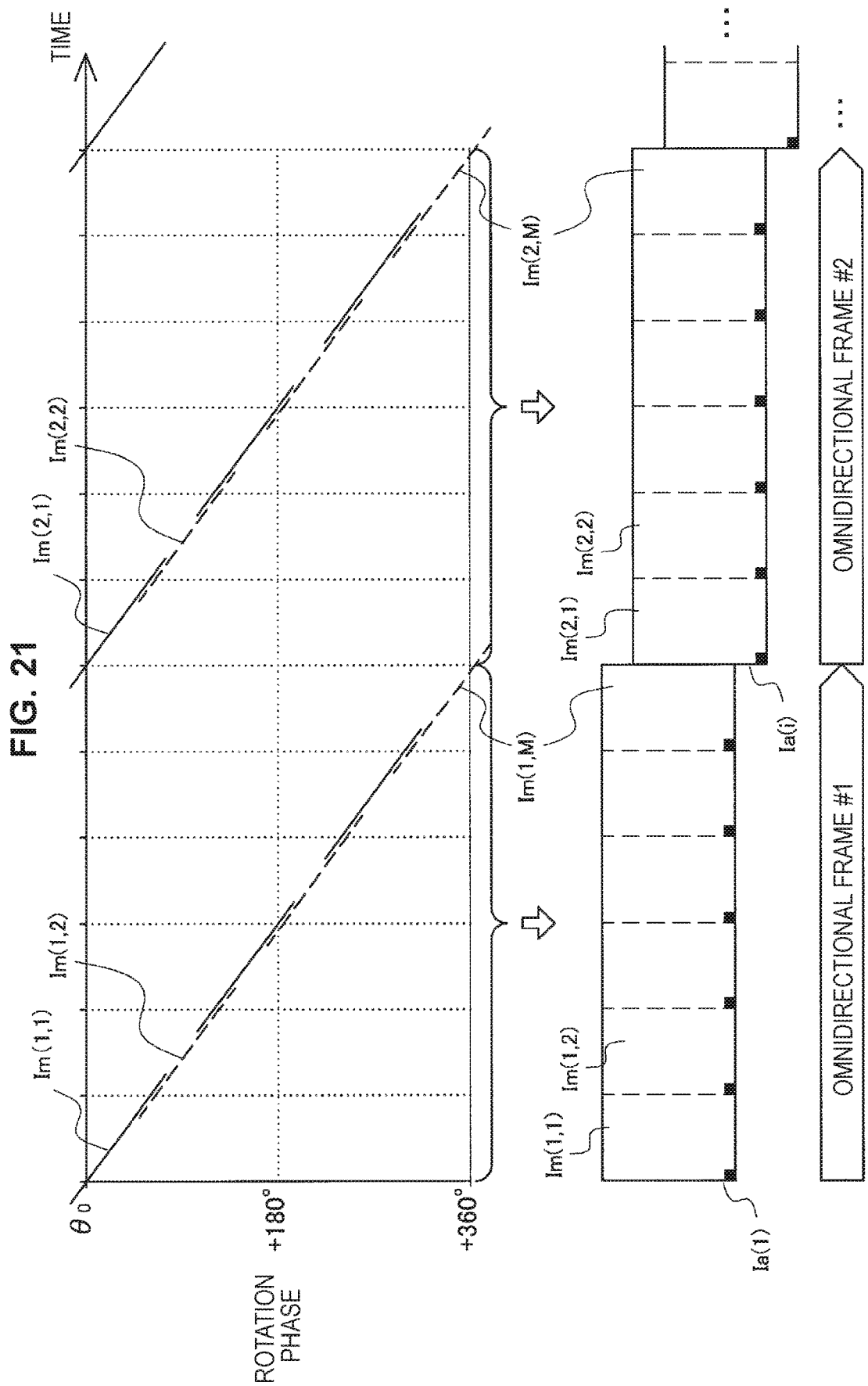
FIG. 21 is an explanatory diagram for describing an example of omnidirectional frames generated by an omnidirectional frame generation unit shown in FIG. 20.

FIG. 21 is an explanatory diagram for describing an example of omnidirectional frames generated by the omnidirectional frame generation unit 230. The vertical axis of the chart shown in the upper half of FIG. 21 represents phases of a rotation of a camera module with a phase $\theta_0$ of the reference direction serving as a reference. The horizontal axis of the chart represents the time. Herein, the number M of imaging fields of view imaged during one rotation is equal to 6. An image Im(i,j) is the j-th captured image generated during the period of the i-th rotation (1≤i, 1≤j≤M). An image Ia(i) is an omnidirectional frame generated from M captured images generated during the period of the i-th rotation. As illustrated, the omnidirectional frame generation unit 230 stitches captured images Im(1,1) to Im(1,M) generated during the period of the first rotation to generate a first omnidirectional frame Ia(1). In addition, the omnidirectional frame generation unit 230 stitches captured images Im(2,1) to Im(2,M) generated during the period of the second rotation to generate a second omnidirectional frame Ia(2).

The omnidirectional frame generation unit 230 repeats generation of omnidirectional frames in this manner at a predetermined omnidirectional frame rate while imaging by the imaging unit 210 is being continued, and causes the frame memory 235 to store generated omnidirectional frames. The omnidirectional frame generation unit 230 may forward the generated omnidirectional frames to a server (for example, the server 240 shown in FIG. 19) that assists in imaging or reproduction of omnidirectional video. In addition, the omnidirectional frame generation unit 230 (or the server 240) may distribute the omnidirectional frames to one or more display terminals in real time. The omnidirectional frame generation unit 230 may subject omnidirectional video to compression encoding in any video compression system before storing, forwarding, or distributing the omnidirectional frames.

[2-3-2. Display Terminal]

Figure 22:
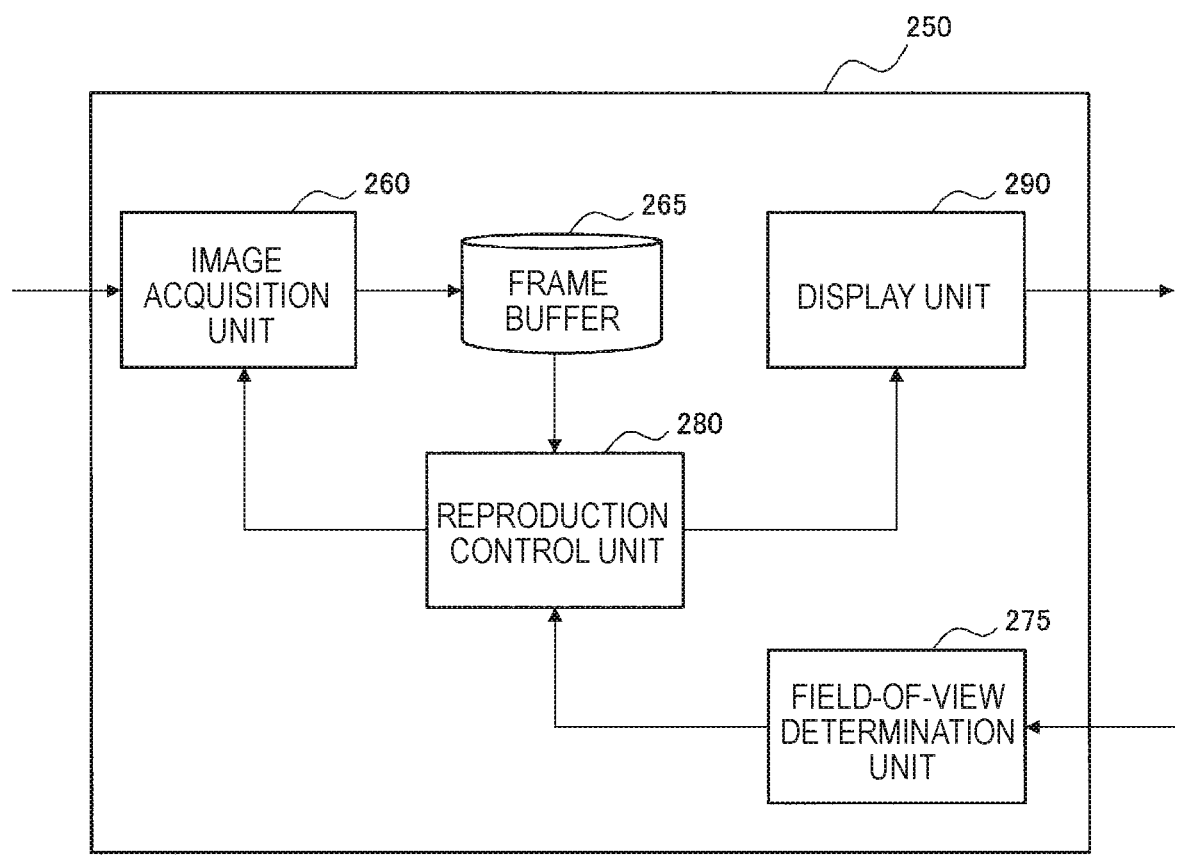
FIG. 22 is a block diagram showing an example of a configuration of a display terminal according to the first example of the second embodiment.

FIG. 22 shows an example of a configuration of a display terminal 250 according to the first example. With reference to FIG. 22, the display terminal 250 includes an image acquisition unit 260, a frame buffer 265, a field-of-view determination unit 275, a reproduction control unit 280, and a display unit 290.

(1) Image Acquisition Unit

The image acquisition unit 260 acquires omnidirectional video including a series of omnidirectional frames generated by the imaging device 200 from the imaging device 200 or the server 240. In the case where the omnidirectional video has been subjected to compression encoding, the image acquisition unit 260 may decode video information acquired from the imaging device 200 or the server 240 to restore the series of omnidirectional frames. Then, the image acquisition unit 260 causes the frame buffer 265 to store the respective omnidirectional frames included in the omnidirectional video. The respective omnidirectional frames are images generated by stitching M captured images corresponding to the above-described M imaging fields of view.

(2) Frame Buffer

The frame buffer 265 temporarily stores the omnidirectional frames acquired by the image acquisition unit 260. In the present example, the frame buffer 265 buffers not only the newest omnidirectional frame, but also at least an omnidirectional frame which is the previous frame.

(3) Field-of-View Determination Unit

The field-of-view determination unit 275 determines a reproduction field of view required by the user. For example, the field-of-view determination unit 275 may set an initial reproduction field of view at the start of reproduction on the basis of the reference direction defined in advance, and may revolve the reproduction field of view in the forward direction or the reverse direction in accordance with a change in attitude of the display terminal 250 after the start of reproduction. The field-of-view determination unit 275 may measure a change in attitude of the display terminal 250 using an acceleration sensor or a gyro sensor. In addition, the field-of-view determination unit 275 may determine the reproduction field of view in accordance with the orientation of the display terminal 250 measured by a geomagnetic sensor. In addition, the field-of-view determination unit 275 may determine the reproduction field of view in accordance with a user input (such as a tap or a drag, for example) detected via a user interface (not shown) or a voice command detected via a voice recognition module (not shown).

(4) Reproduction Control Unit

The reproduction control unit 280 causes the image acquisition unit 260 to start acquisition of omnidirectional frames in accordance with a trigger for reproduction start. The acquired omnidirectional frames are buffered by the frame buffer 265. Then, the reproduction control unit 280 causes a reproduction image corresponding to the reproduction field of view determined by the field-of-view determination unit 275 to be displayed on the screen of the display unit 290. In the case where reproduction in a reproduction field of view that does not straddle the reference direction is requested, the reproduction control unit 280 generates a reproduction image by cutting out a reproduction image in a portion corresponding to the reproduction field of view in one omnidirectional frame from the omnidirectional frame. When one omnidirectional frame time elapses, the reproduction control unit 280 cuts out, from the omnidirectional frame, a reproduction image in a portion corresponding to the reproduction field of view in the next omnidirectional frame to generate the next reproduction image. When these reproduction images are sequentially displayed on the display unit 290 which will be described later, video is displayed to the user.

In the case where reproduction in a reproduction field of view that straddles the reference direction is requested, the reproduction control unit 280 generates a reproduction image on the basis of a first partial image corresponding to the first imaging field of view in the omnidirectional frame at that time point and a second partial image corresponding to the M-th imaging field of view in a past omnidirectional frame captured earlier than (typically, immediately before) the omnidirectional frame.

Figure 23A:
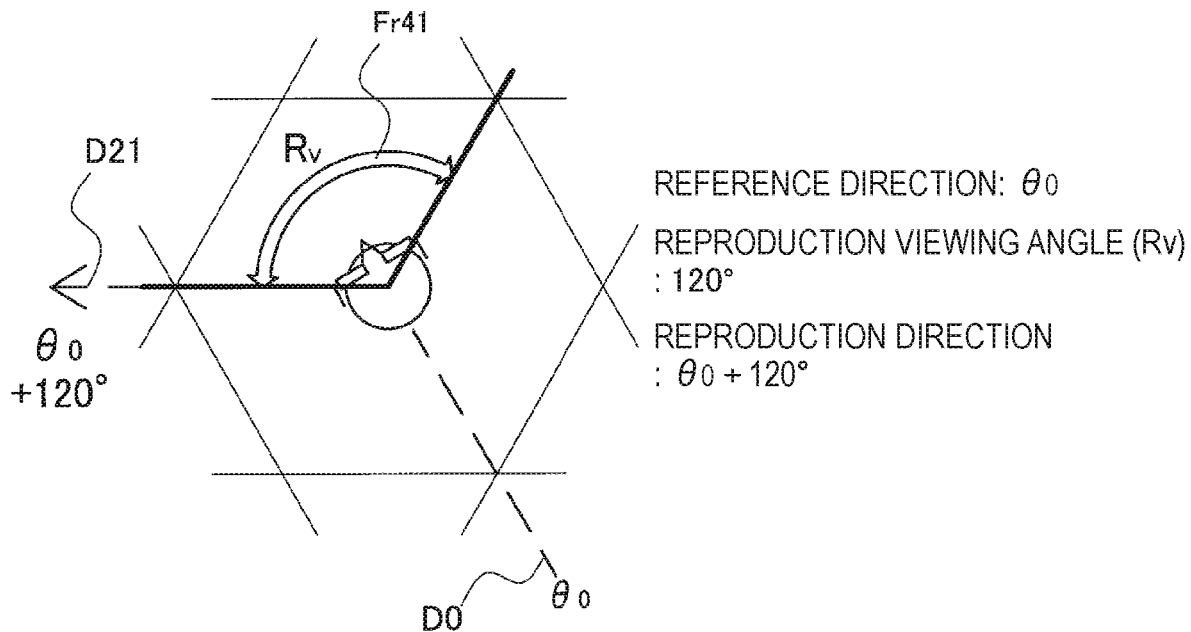
FIG. 23A is a first explanatory diagram showing a manner in which a user moves a reproduction field of view in a certain scenario.
Figure 23B:
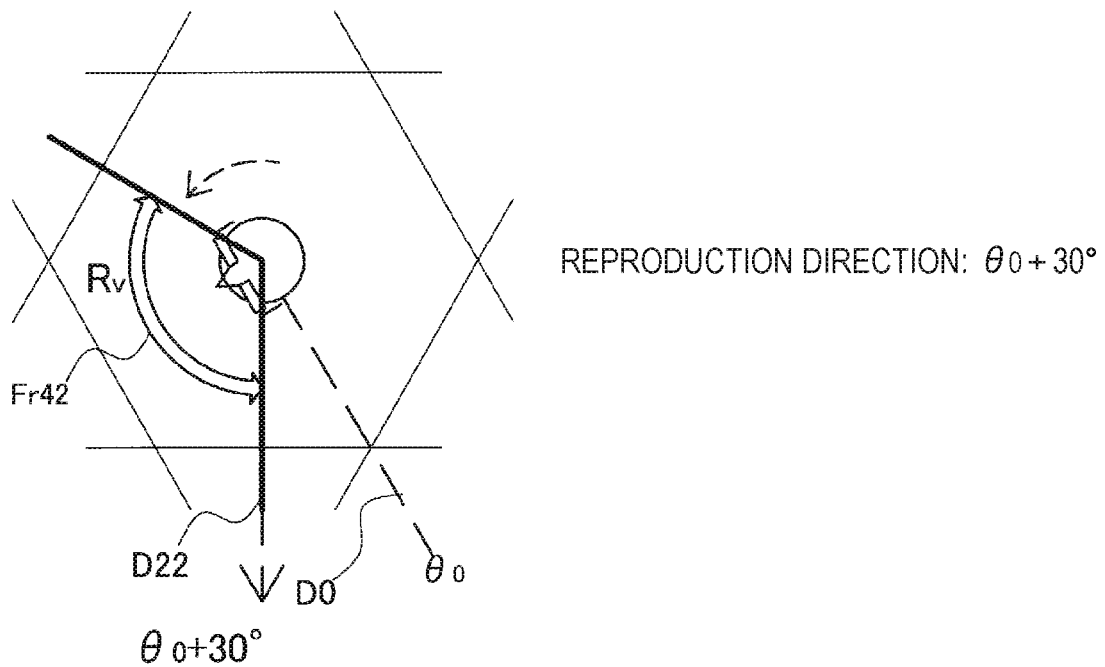
FIG. 23B is a second explanatory diagram showing a manner in which a user moves a reproduction field of view in a certain scenario.
Figure 23C:
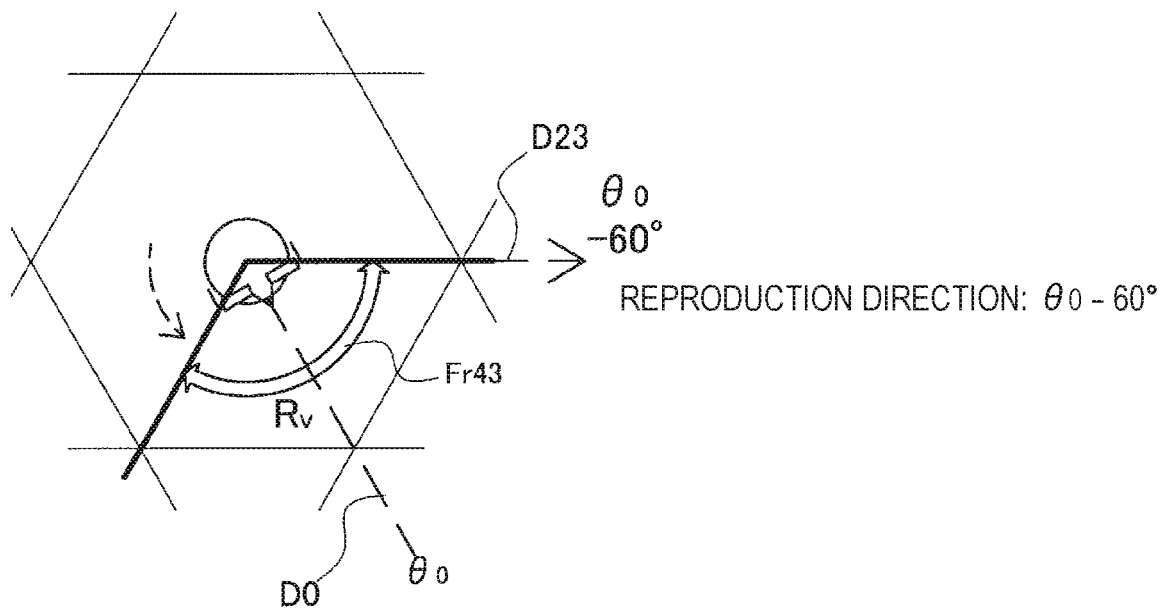
FIG. 23C is a third explanatory diagram showing a manner in which a user moves a reproduction field of view in a certain scenario.

FIGS. 23A, 23B, and 23C show a manner in which the user moves a reproduction field of view in a certain scenario. In the scenario through these drawings, a reference direction $D0=\theta 0$ and a viewing angle Rv of a reproduction field of view Fr41=120° shall hold. At the time point of FIG. 23A, a reproduction direction $D21=\theta 0+120°$. The reproduction field of view Fr41 covers an orientation from $\theta 0+120°$ to $\theta 0+240°$. Note that the reproduction direction herein shall correspond to the starting point of the reproduction field of view, rather than the center of the reproduction field of view (for example, in the case where the imaging field of view rotates to the right, the reproduction direction corresponds to the left end of the reproduction field of view). At the time point of FIG. 23B, a reproduction direction $D22=\theta 0+30°$. A reproduction field of view Fr42 covers an orientation from $\theta 0+30°$ to $\theta 0+150°$. That is, the reproduction field of view has moved 90° to the left with respect to the time point of FIG. 23A. At the time point of FIG. 23C, a reproduction direction $D23=\theta 0-60°$. A reproduction field of view Fr43 covers an orientation from $\theta 0-60°$ to $\theta 0+60°$. That is, the reproduction field of view has further moved 90° to the left with respect to the time point of FIG. 23B. At the time points of FIG. 23A and FIG. 23B, the reproduction fields of view Fr41 and Fr42 do not straddle the reference direction D0, while the reproduction field of view Fr43 straddles the reference direction D0 at the time point of FIG. 23B.

Figure 24A:
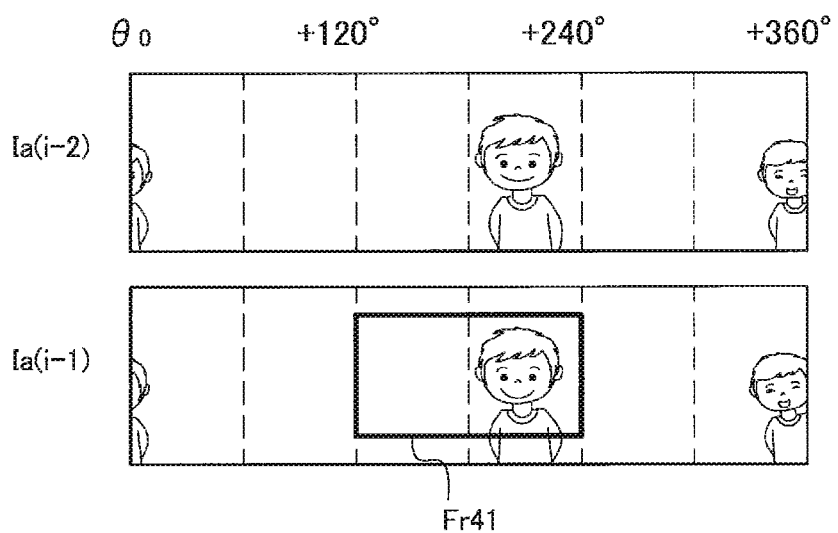
FIG. 24A is an explanatory diagram for describing generation of a reproduction image at the time point of FIG. 23A.
Figure 24B:
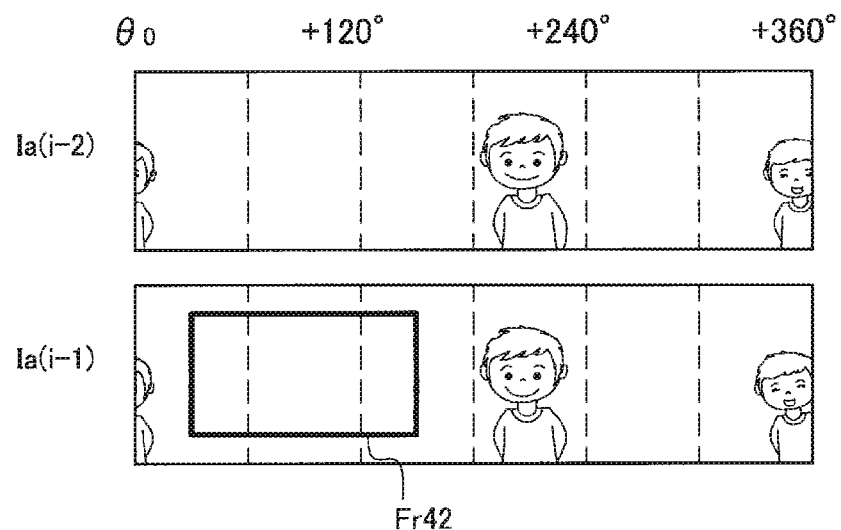
FIG. 24B is an explanatory diagram for describing generation of a reproduction image at the time point of FIG. 23B.

FIG. 24A and FIG. 24B are explanatory diagrams for respectively describing generation of a reproduction image at the time points of FIG. 23A and FIG. 23B, respectively. With reference to FIG. 24A, omnidirectional frames Ia(i−1) and Ia(i−2) buffered by the frame buffer 265 are shown. An omnidirectional frame Ia(i) that may be being written in the frame buffer 265 at this time point is not illustrated. Since the reproduction field of view Fr41 that should be reproduced occupies the range from $\theta_0+120°$ to $\theta_0+240°$, the reproduction control unit 280 may cut out a partial image of this range from the omnidirectional frame Ia(i−1) to generate a reproduction image. Next, with reference to FIG. 24B, since the reproduction field of view Fr42 that should be reproduced occupies the range from $\theta_0+30°$ to $\theta_0+150°$, the reproduction control unit 280 may cut out a partial image of this range from the omnidirectional frame Ia(i−1) to generate a reproduction image. Note that, practically, an omnidirectional frame should reflect contents of an earlier frame with the lapse of time. However, the ordinal numbers of frames herein remain i−1 and i−2 for ease of description.

Figure 24C:
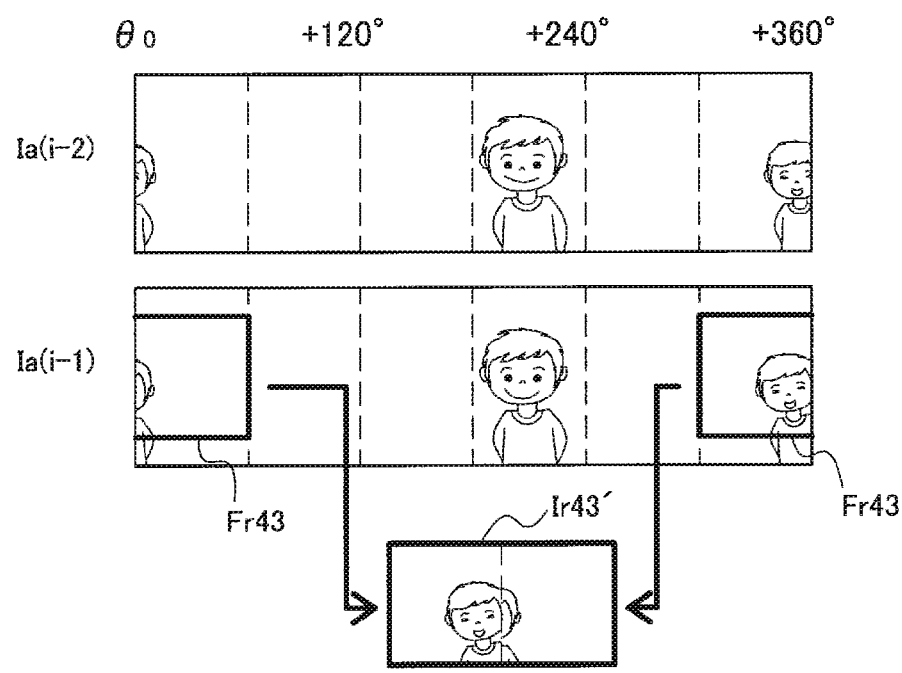
FIG. 24C is an explanatory diagram showing a manner in which a failure occurs in a reproduction image generated at the time point of FIG. 23C.
Figure 24D:
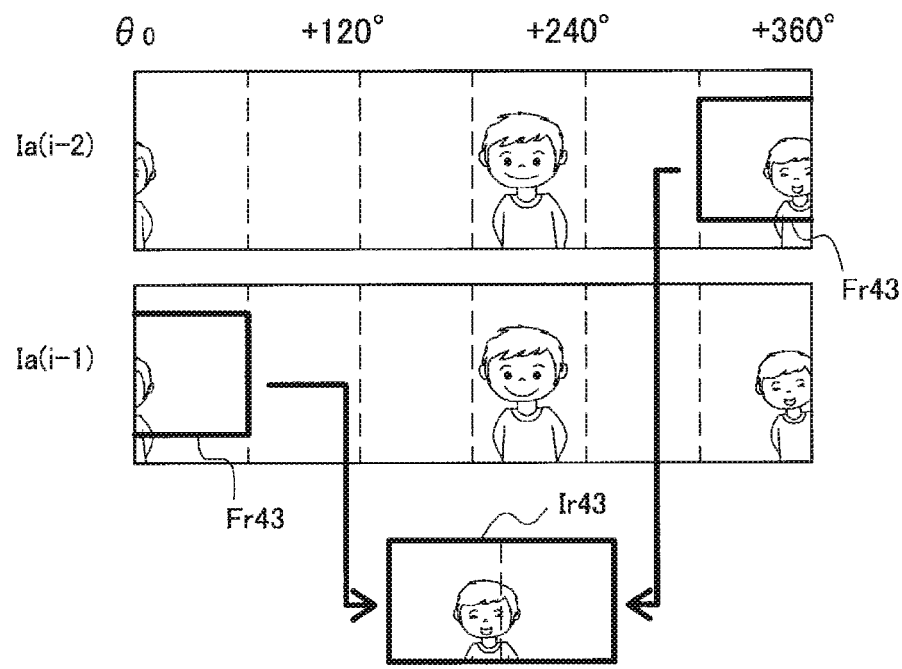
FIG. 24D is an explanatory diagram showing a manner in which a reproduction image having no failure is generated at the time point of FIG. 23C.

FIG. 24C shows a manner in which a failure occurs in a reproduction image in the case where the reproduction image is generated from a single omnidirectional frame at the time point of FIG. 23C. In contrast, FIG. 24D shows a manner in which a reproduction image without a failure is generated in accordance with the present example at the same time point. With reference to FIG. 24C, the reproduction field of view Fr43 straddles the reference direction, and occupies the range from $\theta_0-60°$ ($\theta_0+300°$) to $\theta_0$ ($\theta_0+360°$) and the range from $\theta_0$ to $\theta_0+60°$. In this case, when cutting out partial images of these ranges from the single omnidirectional frame Ia(i−1) and coupling the partial images, a failure may occur in a generated reproduction image Ir43'. In the present scenario, since a subject is moving, the subject is distorted at the coupled portion of the partial images in the reproduction image Ir43'. In contrast to this, the reproduction control unit 280 according to the present example generates a reproduction image Ir43 by coupling the second partial image corresponding to the M-th imaging field of view that occupies the range from $\theta_0+300°$ to $\theta_0+360°$ in the omnidirectional frame Ia(i−2) and the first partial image corresponding to the first imaging field of view that occupies the range from $\theta_0$ to $\theta_0+60°$ in the omnidirectional frame Ia(i−1), as shown in FIG. 24D. Since these two partial images have been captured with an imaging timing difference which is significantly shorter than the imaging timing difference between the both ends of the single omnidirectional frame, the subject fits at the coupled portion of the two partial images, and a great failure does not occur in the reproduction image.

(5) Display Unit

The display unit 290 is typically a display device that may include a screen and a display driver. The display unit 290 causes a reproduction image corresponding to the reproduction field of view generated by the reproduction control unit 280 to be displayed on the screen. For example, the screen may be equivalent to a microdisplay in the eyeglass wearable terminal 250a shown in FIG. 19, and a touch panel in the mobile terminal 250b. However, these examples are not limitations, but the reproduction image may be displayed on a monitor of a fixed terminal such as a PC or a television device, for example. In addition, the reproduction image may be projected onto a screen by a projector. As a result that the display unit 290 displays reproduction images sequentially generated by the reproduction control unit 280, it is possible for the user to view video of any partial reproduction field of view in the entire field of view of 360° of the omnidirectional video.

[2-3-3. Examples of Flow of Processing]

In the present section, an example of a flow of processing that may be executed by each device in the first example will be described using several flowcharts. Note that a plurality of processing steps are described in the flowcharts, and those processing steps are not necessarily executed in the order shown in the flowcharts. Several processing steps may be executed in parallel. In addition, additional processing steps may be employed, and some processing steps may be omitted.

(1) Imaging Control Processing

Figure 25:
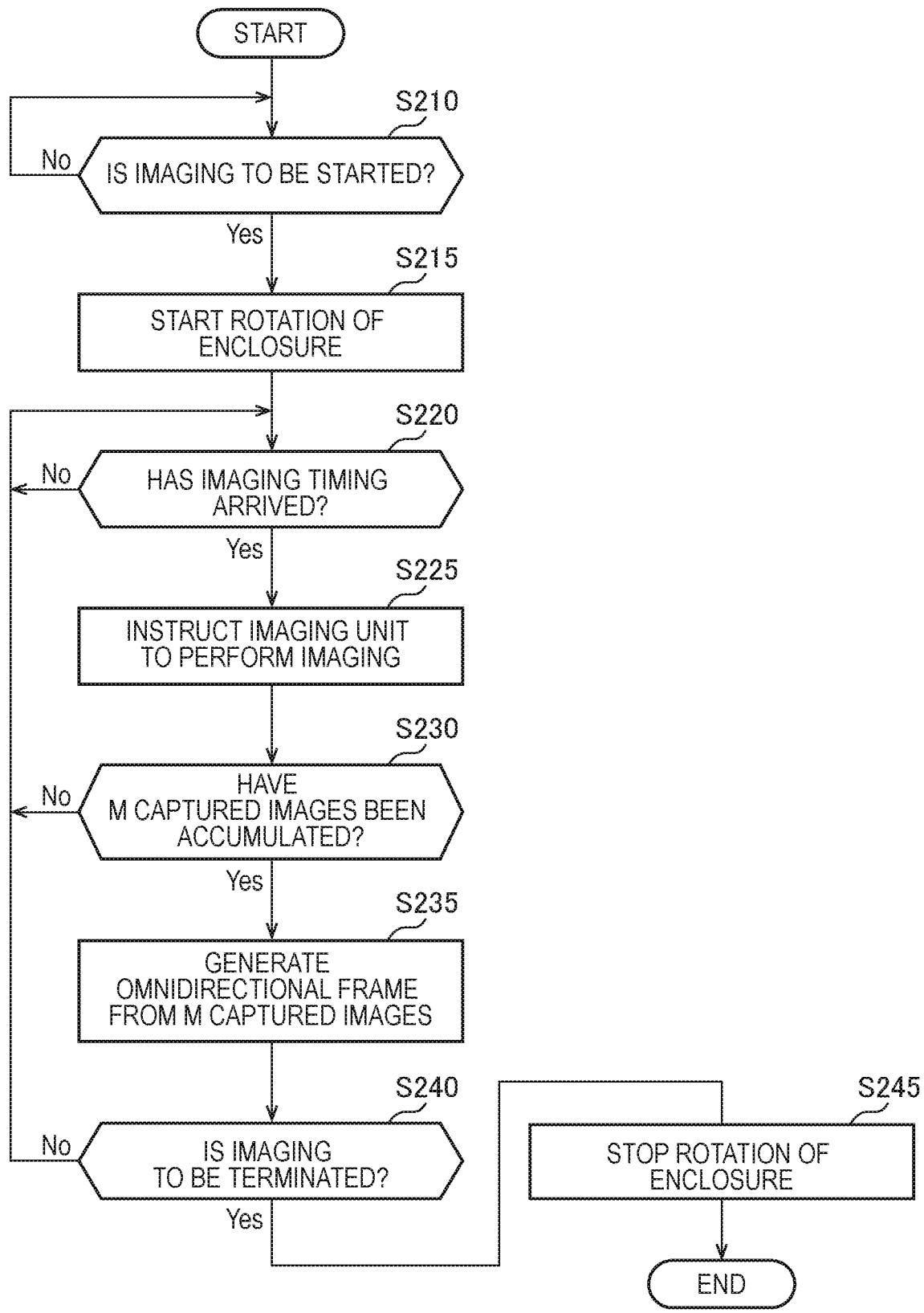
FIG. 25 is a flowchart showing an example of a flow of imaging control processing according to the first example of the second embodiment.

FIG. 25 is a flowchart showing an example of a flow of imaging control processing that may be executed by the imaging control unit 220 according to the first example.

First, with reference to FIG. 25, the imaging control unit 220 awaits a trigger for starting imaging (step S210). For example, when a user input that instructs the start of imaging is detected via a user interface, or a control command that instructs the start of imaging is detected via a communication interface, the imaging control processing proceeds into step S215.

In step S215, the imaging control unit 220 causes the rotation of the enclosure of the imaging device 200 to be started. Thereafter, when imaging timing arrives (step S220), the imaging control unit 220 instructs imaging by supplying the imaging start instruction signal to the imaging unit 210 (step S225). The imaging control unit 220 repeats the imaging instruction M times while the enclosure makes a rotation, and when M captured images are accumulated (step S230), causes the omnidirectional frame generation unit 230 to generate an omnidirectional frame from the M captured images (step S235).

The imaging control unit 220 causes the omnidirectional frame generation unit 230 to generate an omnidirectional frame in this manner at a predetermined omnidirectional frame rate. In the meantime, the enclosure of the imaging device 200 continues rotating. When a user input or a control command instructing the termination of imaging is detected (step S240), the imaging control unit 220 stops rotation of the enclosure (step S245), and terminates the imaging control processing.

(2) Reproduction Control Processing

Figure 26:
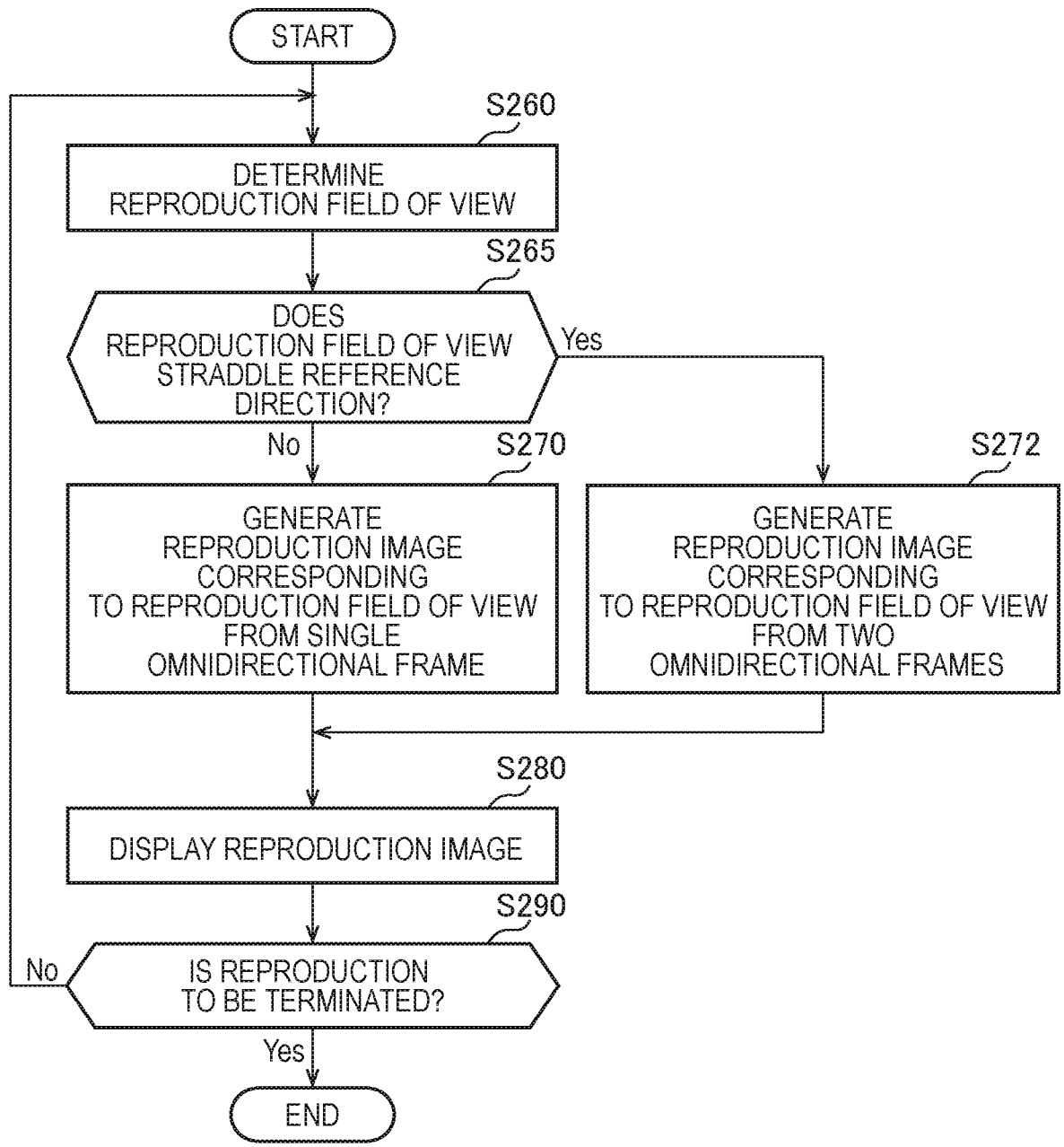
FIG. 26 is a flowchart showing an example of a flow of reproduction control processing according to the first example of the second embodiment.

FIG. 26 is a flowchart showing an example of a flow of reproduction control processing that may be executed by the display terminal 250 according to the first example.

When reproduction of omnidirectional video is started, the reproduction control unit 280 of the display terminal 250 causes the field-of-view determination unit 275 to determine the reproduction field of view on the basis of an instruction from the user or a result of measuring the attitude of the terminal (step S260). Subsequent processing branches in accordance with whether or not the determined reproduction field of view straddles the reference direction (step S265).

In the case where the reproduction field of view does not straddle the reference direction, the reproduction control unit 280 generates a reproduction image corresponding to the reproduction field of view from a single omnidirectional frame having been buffered (step S270). On the other hand, in the case where the reproduction field of view straddles the reference direction, the reproduction control unit 280 generates a reproduction image by coupling two partial images corresponding to reproduction fields of view respectively cut out from a certain omnidirectional frame and an omnidirectional frame captured immediately previously (step S272).

Then, the reproduction control unit 280 causes the display unit 290 to display the generated reproduction image (step S280). Generation and display of such a reproduction image is repeated until the termination of reproduction is instructed (step S290).

2-4. Second Example

In a second example which will be described below, the camera system may be configured similarly to the camera system 5 described using FIG. 19. The camera system according to the present example at least includes an imaging device 300 illustrated in FIG. 27 and a display terminal 350 illustrated in FIG. 29. The camera system may further include a server that assists in imaging or reproduction of omnidirectional video.

[2-4-1. Imaging Device]

Figure 27:
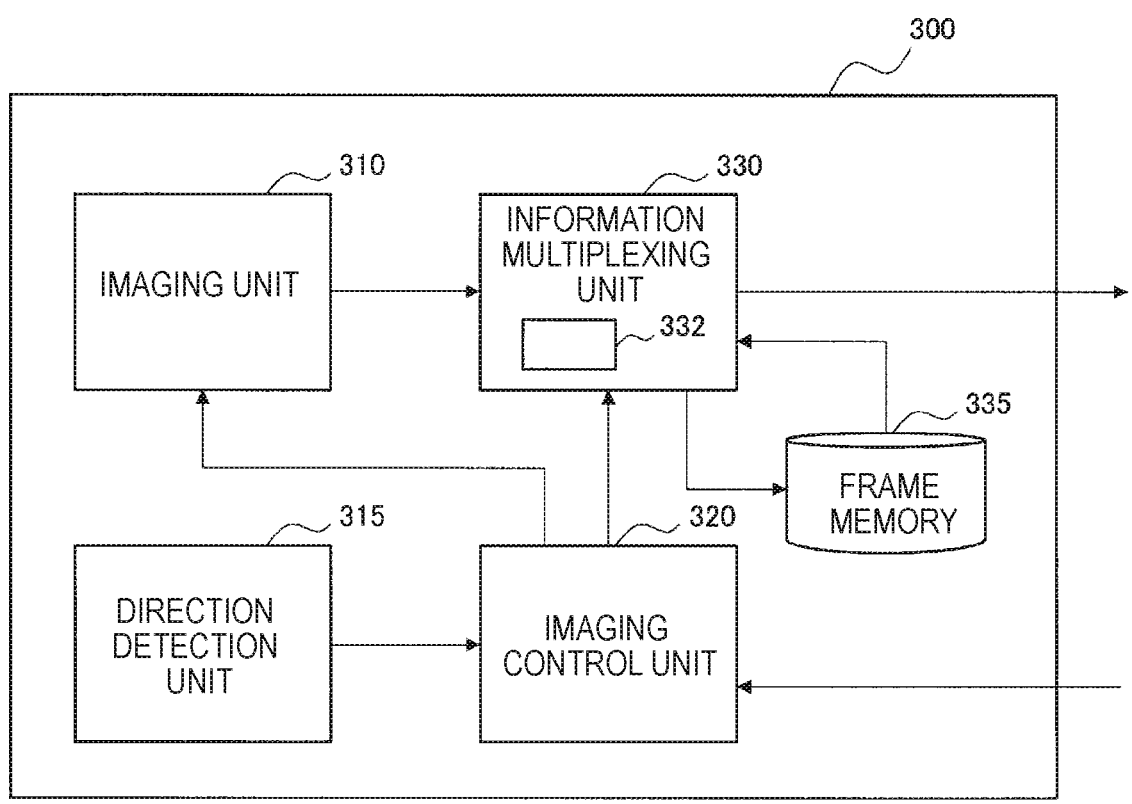
FIG. 27 is a block diagram showing an example of a configuration of an imaging device according to a second example of the second embodiment.

FIG. 27 shows an example of a configuration of the imaging device 300 according to the second example of the second embodiment. With reference to FIG. 27, the imaging device 300 includes an imaging unit 310, a direction detection unit 315, an imaging control unit 320, an information multiplexing unit 330, and a frame memory 335.

(1) Imaging Unit

The imaging unit 310 generates a captured image by imaging an imaging field of view to which the optical axis is directed at that time point under control exerted by the imaging control unit 320 which will be described later. More specifically, while the imaging control unit 320 causes the imaging direction of the imaging unit 310 to make one rotation around the rotation axis (causes the imaging field of view to make one revolution), the imaging unit 310 sequentially images at least M (M>1) imaging fields of view partially overlapping one another to generate M captured images. The entire field of view of 360° of the omnidirectional frame is integrally covered by the first to the M-th, M imaging fields of view. The imaging unit 310 sequentially outputs image signals representing these captured images to the information multiplexing unit 330.

(2) Direction Detection Unit

The direction detection unit 315 detects the direction (imaging direction) to which the optical axis of the imaging unit 310 is directed. The direction detection unit 315 may detect the imaging direction using a sensor device such as a rotational angle sensor, an acceleration sensor, a gyro sensor, or a geomagnetic sensor, for example. The direction detection unit 315 outputs sensor data indicating the detected imaging direction to the imaging control unit 320.

(3) Imaging Control Unit

The imaging control unit 320 controls rotation of the enclosure of the imaging device 300 and the imaging operation in the imaging unit 310. The imaging control unit 320 causes rotation of the enclosure of the imaging device 300 around the rotation axis to be started in accordance with an instruction for the start of imaging. Then, the imaging control unit 320 causes the imaging unit 310 to perform imaging at respective timings when the imaging unit 310 is directed to M (or more) imaging fields of view from the first imaging field of view to the M-th imaging field of view with the reference direction serving as the starting point during a period in which the enclosure is rotating. In accordance with an instruction for the termination of imaging, the imaging control unit 320 terminates periodic imaging performed by the imaging unit 310, and stops rotation of the enclosure of the imaging device 300.

Further, in the present example, the imaging control unit 320 outputs imaging control information to the information multiplexing unit 330. For example, the imaging control information includes imaging direction information that specifies the imaging direction of each captured image. The imaging direction information may include one or more of the following parameters, for example:

An absolute angle (an angular difference from the reference direction) associated with each captured image A relative angle (an angular difference from the immediately preceding imaging direction) associated with each captured image A constant angular difference between two neighboring imaging directions common to a series of captured images The number of times of imaging per rotation cycle (a constant angular difference is derived by dividing 360° by this value)

The imaging control information may further include viewing angle information that specifies the viewing angles of individual imaging fields of view, frame rate information that specifies one or both of the omnidirectional frame rate and the individual frame rate, and the like.

(3) Information Multiplexing Unit

While imaging by the imaging unit 310 is being continued, the information multiplexing unit 330 causes the frame memory 335 to store a series of captured images, or transmits the captured images to the server or the display terminal. The information multiplexing unit 330 multiplexes the above-described imaging control information on the series of captured images. The information multiplexing unit 330 may insert imaging control information in a header region of video information including a series of captured images, for example. In addition, the information multiplexing unit 330 may transmit the imaging control information in a blanking period on a transmission path on which the series of captured images are transmitted.

The information multiplexing unit 330 may include an encoding unit 332 that executes compression encoding in any video compression system before storing or transmitting the series of captured images. When subjecting omnidirectional video including a series of captured images to compression encoding using inter-frame prediction, the encoding unit 332 uses every M+1-th reference frame with an encoding target frame (captured image) serving as a reference to encode the encoding target frame.

Figure 28:
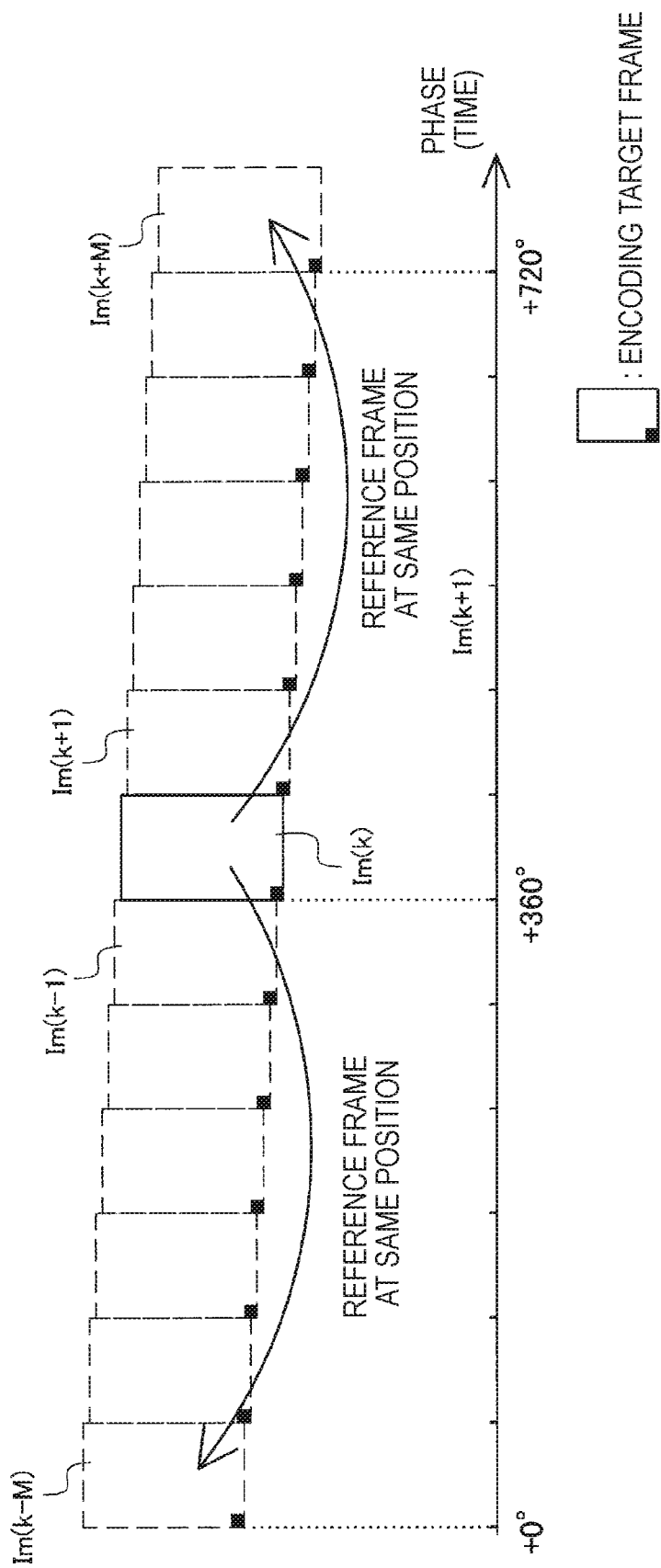
FIG. 28 is an explanatory diagram for describing reference frames for inter-frame prediction in the second example.

FIG. 28 is an explanatory diagram for describing a reference frame for inter-frame prediction in the second example. In the example of FIG. 28, a k-th captured image Im(k) is the encoding target frame. A reference frame positioned immediately before the captured image Im(k) on the time axis is a captured image Im(k−1), and a reference frame positioned immediately after the captured image Im(k) on the time axis is a captured image Im(k+1). However, the captured images Im(k−1) and Im(k+1) are images that reflect imaging fields of view different from the encoding target frame, and are not effective in most cases as the reference frame for inter-frame prediction. On the other hand, in the case where M times one individual frame time agrees with the rotation cycle of the camera module, a captured image Im(k−M) and a captured image Im(k+M) distant from the encoding target frame by an M individual frame time on the time axis has the same rotational phase as the encoding target frame, that is, reflects the same imaging field of view. Consequently, by performing inter-frame prediction using every M+1-th reference frame with the encoding target frame serving as a reference, effective predictive encoding can be performed, and encoding efficiency can be increased.

Note that the information multiplexing unit 330 may not necessarily include the encoding unit 332. In addition, a device (for example, the server 240) external to the imaging device 200 may encode omnidirectional video.

[2-4-2. Display Terminal]

Figure 29:
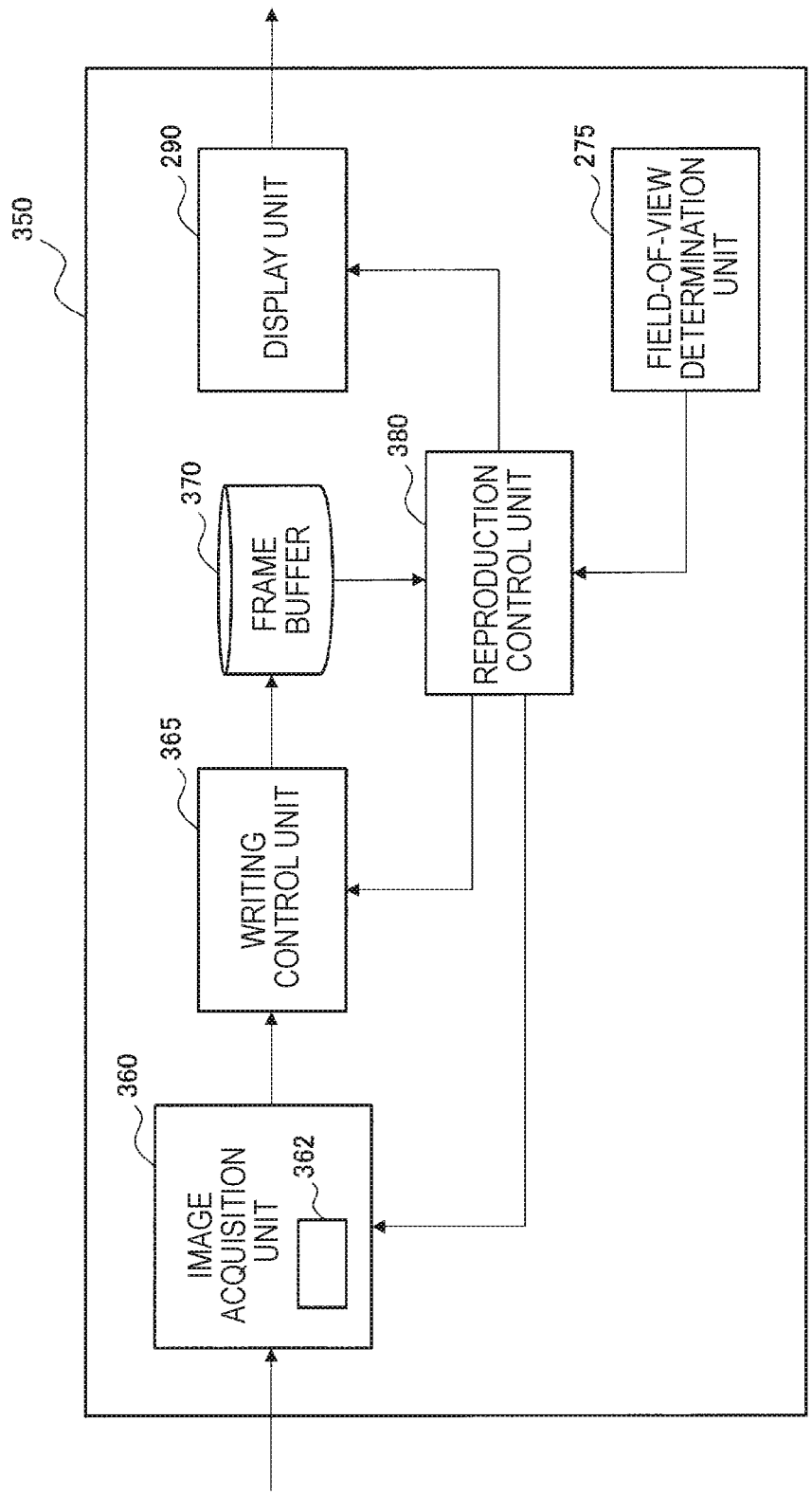
FIG. 29 is a block diagram showing an example of a configuration of a display terminal according to the second example of the second embodiment.

FIG. 29 shows an example of a configuration of the display terminal 350 according to the second example. With reference to FIG. 29, the display terminal 350 includes an image acquisition unit 360, a writing control unit 365, a frame buffer 370, the field-of-view determination unit 275, a reproduction control unit 380, and the display unit 290.

(1) Image Acquisition Unit

The image acquisition unit 360 acquires a series of captured images to be used for constructing omnidirectional video that are generated by the imaging device 300, from the imaging device 300 or the server 240. The image acquisition unit 360 may include a decoding unit 362 that decodes an encoded stream in the case where the captured images have been subjected to compression encoding to restore the series of captured images. In that case, the decoding unit 362 may decode each of M captured images encoded using inter-frame prediction, using every M+1-th reference frame with the captured image serving as a reference. The image acquisition unit 360 may not necessarily include the decoding unit 362. The image acquisition unit 360 sequentially outputs the acquired captured images to the writing control unit 365.

In addition, the image acquisition unit 360 acquires imaging control information associated with (for example, multiplexed on) a series of captured images from the imaging device 300 or the server 240. The imaging control information may include, for example, the above-described imaging direction information, viewing angle information, and frame rate information. Then, the image acquisition unit 360 outputs the acquired imaging control information to the reproduction control unit 380.

(2) Writing Control Unit/Frame Buffer

The writing control unit 365 controls writing of captured images into the frame buffer 370. In the present example, in addition to M captured images corresponding to M imaging fields of view imaged in a first period (one omnidirectional frame period), the frame buffer 370 stores at least one captured image corresponding to at least one imaging field of view imaged in a second period subsequent to the first period. Typically, after trimming an overlapping portion on a succeeding (or preceding) captured image, the writing control unit 365 writes each of captured images input from the image acquisition unit 360 into the frame buffer 370 as an individual frame. As an example, the frame buffer 370 may be a ring buffer that cyclically stores (at least M+1 individual frames corresponding to) M captured images and at least one captured image.

Figure 30:
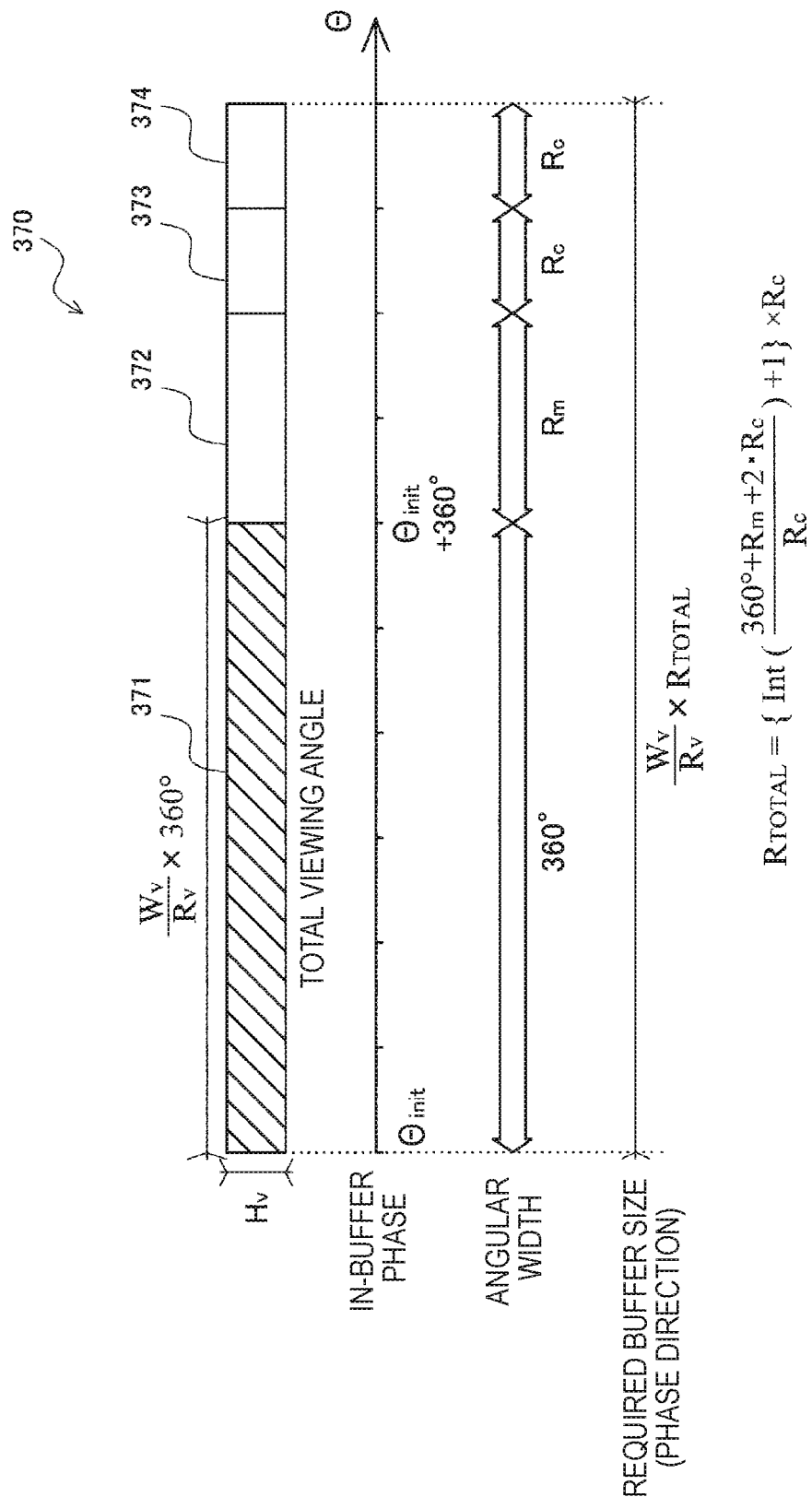
FIG. 30 is an explanatory diagram for describing an example of a required buffer size of a frame buffer shown in FIG. 29.

FIG. 30 is an explanatory diagram for describing an example of a required buffer size of the frame buffer 370 shown in FIG. 29. As shown in FIG. 30, assuming the resolution of the reproduction image in the phase direction is $W_v$, the resolution in the direction orthogonal to the phase direction is $H_v$, and the reproduction viewing angle is $R_v$, a required buffer size BS of the frame buffer 370 is expressed by the following expression.

[Math. 3]

$$BS = H_v \times \frac{W_v}{R_v} \times R_{TOTAL} \tag{3}$$

Here, $R_{TOTAL}$ represents the total angular width in the phase direction that the frame buffer 370 should hold. As understood from FIG. 30, $R_{TOTAL}$ is equivalent to the sum of a total viewing angle 371 of 360°, a reproduction viewing angle 372, a movement margin 373, and a writing frame 374. First, in the case where the reproduction direction (the starting point of the reproduction field of view) is positioned at the terminal end (the right end in the drawing) of the total viewing angle 371 (hatched in the drawing), the reproduction field of view occupies from the beginning $\Theta_{init}$+360° of the in-buffer phase to $\Theta_{init}$+360°+$R_v$. Consequently, also in the case where a movement of the reproduction field of view is not considered, a buffer size equivalent to the sum of at least the total viewing angle 371 and the reproduction viewing angle 372 is required.

Further, in order to make it possible to appropriately generate a reproduction image even if the user moves the reproduction field of view until the next frame is decoded or acquired, it is necessary to hold image data of the movement margin 373 in addition to the above-described angular width. This is the reason why the movement margin 373 is incorporated in the total angular width $R_{TOTAL}$. Here, given that the user cannot move the reproduction field of view faster than the rotation speed of the camera module, an angular width $R_m$ of the movement margin 373 can be assumed as the following expression:

[Math. 4]

$$R_m = \max(R_v, R_c) \tag{4}$$

Here, $R_c$ represents an angular width obtained by excluding one of the overlapping portions on the both ends from the imaging viewing angle, and is typically equal to 360°/M. In the following description, $R_c$ is referred to as an individual frame angle. Note that the movement margin 373 may have a definition different from Expression (4) depending on a condition or restriction concerning a movement of the reproduction field of view.

Further, the writing frame 374 is incorporated as a capacitance for the writing control unit 365 to write a new frame into the frame buffer 370. The angular width of the writing frame 374 is equal to the individual frame angle $R_c$. Consequently, the total angular width $R_{TOTAL}$ in the phase direction that the frame buffer 370 should hold may be given by the following expression.

[Math. 5]

$$R_{TOTAL} = \left\{ \mathrm{Int}\left(\frac{360° + R_m + 2 \cdot R_c}{R_c}\right) + 1 \right\} \times R_c \tag{5}$$

A function Int( ) is a function that returns the largest integer smaller than an argument. Since writing into the buffer is performed using the individual frame angle $R_c$ as one unit although 360°+$R_m$ is not necessarily a multiple of the individual frame angle $R_c$, it is desirable that such a quantizing operation is applied.

The writing control unit 365 writes image data of the t-th individual frame from the writing position $\Theta_{write,t}$ determined by Expression (6) below into the frame buffer 370.

[Math. 6]

$$\Theta_{write,t} = (\Theta_{init} + t \times R_c) \bmod R_{TOTAL} \tag{6}$$

Note that the capitalized theta ($\Theta$) means that the variable indicates an in-buffer phase having a range more than or equal to zero and less than $R_{TOTAL}$. $\Theta_{init}$ represents the writing position of the initial individual frame, and mod represents a modulo operation. Expression (6) expresses that the writing position of an individual frame is cyclically determined using the total angular width $R_{TOTAL}$ as a divisor.

(3) Reproduction Control Unit

The reproduction control unit 380 controls reproduction of omnidirectional video based on M captured images sequentially captured in a plurality of fields of view that revolve while partially overlapping one another. As described above, reproduction of omnidirectional video is performed by reproducing a reproduction image corresponding to a reproduction field of view which is a part of the entire field of view of 360°. The entire field of view of 360° of omnidirectional video is covered by the first to the M-th, M imaging fields of view with the reference direction serving as the starting point.

When reproduction of omnidirectional video is requested, the reproduction control unit 380 causes the image acquisition unit 360 to start acquisition of a series of captured images. Each of the acquired captured images are buffered by the frame buffer 370 as individual frames after the overlapping portions are trimmed, for example. Then, the reproduction control unit 380 generates a reproduction image corresponding to the reproduction field of view determined by the field-of-view determination unit 275. In the present example, the reproduction image corresponding to the reproduction field of view may be generated by reading out image data of an appropriate buffer region from the frame buffer 370.

As an example, in the case where reproduction in a reproduction field of view that straddles the reference direction D0 is requested, the reproduction control unit 380 reads out image data of a range that straddles an in-buffer phase corresponding to the reference direction D0 to generate a reproduction image corresponding to that reproduction field of view. Using the in-buffer phase corresponding to the reference direction D0 as the boundary, an individual frame corresponding to the M-th imaging field of view is stored on the smaller phase side, and an individual frame corresponding to the first imaging field of view is stored on the larger phase side. Since these two individual frames are images captured consecutively (or with an imaging timing difference which is significantly shorter than the imaging timing difference between the both ends of a single omnidirectional frame), a great failure does not occur in the reproduction image generated in this manner.

The reproduction control unit 280 may await until one or more reproduction start conditions which will be described next are met after reproduction start is instructed, and may start display of a reproduction image only after those reproduction start conditions are met. Assuming that the initial (at the start of reproduction) reproduction direction (the starting point of the reproduction field of view) is $\theta_v$, and the imaging direction (the starting point of the imaging field of view) of the newest individual frame already buffered is $\theta_c$, a first reproduction start condition is expressed by the following expression, for example. Note that the small-letter theta ($\theta$) means that the variable indicates a direction having a range of more than or equal to zero and less than 360°.

[Math. 7]

$$\theta_0 + R_v + + R_c \le \theta_c + R_c \quad (7)$$

As understood from the above expression, in the case where the first reproduction start condition is met, the terminal end $(\theta_c + R_c)$ of the imaging field of view of an individual frame already buffered precedes the terminal end $(\theta_v + R_v)$ of the initial reproduction field of view with a margin for one individual frame $(R_c)$. The reproduction control unit 280 can derive the imaging direction $\theta_c$ and the individual frame angle $R_c$ of each individual frame from imaging control information input from the image acquisition unit 360. The reproduction direction $\theta_v$ and the reproduction viewing angle $R_v$ are determined by the field-of-view determination unit 275.

A second reproduction start condition is expressed by the following expression, for example.

[Math. 8]

$$\theta_v - \theta_{init} \ge (\theta_{init} + 360° + R_v + R_c) - (\theta_c' + R_c) \quad (8)$$

Here, $\theta_{init}$ represents the starting point of an imaging field of view of an individual frame buffered first. $\theta_c'$ represents the imaging direction of the newest individual frame already buffered, and shall increase without returning to zero even when exceeding 360° unlike $\theta_c$. The left side of Expression (8) is equivalent to a phase difference between the starting point ($\theta_v$) of the initial reproduction field of view and the boundary ($\theta_{init}$) of a phase having no image data in the reverse direction. The inside of the first bracket on the right side is obtained by adding a margin for one individual frame ($R_c$) to the terminal end $(\theta_{init} + 360° + R_v)$ of a reproduction field of view whose starting point is located 360° ahead of the boundary of a phase having no image data. The inside of the second bracket on the right side represents the terminal end $(\theta_c' + R_c)$ of the imaging field of view of an individual frame already buffered. That is, the second reproduction start condition means whether, even if the user immediately moves the reproduction field of view from the initial reproduction field of view in the reverse direction, preparation for an individual frame after one omnidirectional frame of the reproduction field of view after the movement is in time. In the case where the second reproduction start condition is satisfied, even if the reproduction field of view is immediately moved after the start of reproduction, a reproduction image may be generated appropriately since the reproduction image corresponding to the reproduction field of view after the movement has been already stored in the frame buffer 370. Note that, in the case where it is assumed that the user does not rapidly move the reproduction field of view, the second reproduction start condition may be omitted.

In the case where the desired reproduction direction $\theta_v$, the imaging direction $\theta_c$ of the newest individual frame already buffered, and the writing position $\Theta_{write,t}$ of an individual frame during writing are given, a readout position $\Theta_{read}(\theta_v, \theta_c, \Theta_{write,t})$ when reading out a reproduction image from the frame buffer 370 may be derived as in the following expression.

[Math. 9]

$$\Theta_{read}(\theta_v, \theta_c, \Theta_{write,t}) = \qquad (9)$$
$$\begin{cases} \Theta_{write,t} - (\theta_c + R_c) - 360° + \theta_v & ((\theta_c + 2 \cdot R_c) \bmod 360° \le \theta_v) \\ \Theta_{write,t} - (\theta_c + R_c) + \theta_v & \text{otherwise} \end{cases}$$

Figure 31:
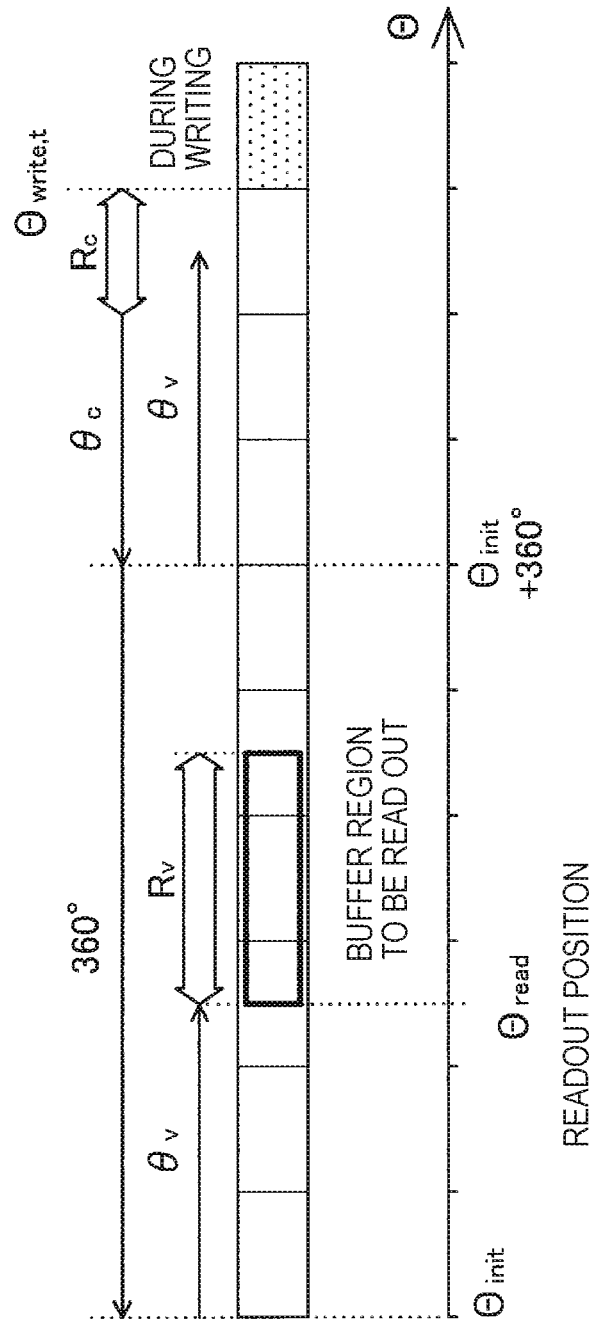
FIG. 31 is an explanatory diagram for describing a readout position of a reproduction image corresponding to a desired reproduction field of view in the frame buffer shown in FIG. 29.

That is, in the case where the imaging field of view of an individual frame during writing overlaps the reproduction direction $((\theta_c + 2 \cdot R_c) \bmod 360° \le \theta_v)$, the readout position $\Theta_{read}$ is calculated as a buffer position having a phase lead of 360° with respect to that reproduction direction, and otherwise, subtraction of the phase of 360° is not necessary. FIG. 31 shows a manner in which a buffer position $(\Theta_{write,t} - (\theta_c + R_c) - 360° + \theta_v)$ having a phase lead of 360° is calculated as the readout position $\Theta_{read}$ of the reproduction image since the imaging field of view of the individual frame during writing overlaps the reproduction field of view.

The reproduction control unit 280 reads out image data of an individual frame corresponding to one imaging field of view or two or more imaging fields of view imaged consecutively from the frame buffer 370 in accordance with the readout position calculated in this manner, and generates a reproduction image on the basis of the image data having been read out. Then, the reproduction control unit 280 causes the generated reproduction image to be displayed on the screen of the display unit 290.

[2-4-3. Examples of Flow of Processing]

In the present section, an example of a flow of processing that may be executed by each device in the second example will be described using several flowcharts. Note that a plurality of processing steps are described in the flowcharts, and those processing steps are not necessarily executed in the order shown in the flowcharts. Several processing steps may be executed in parallel. In addition, additional processing steps may be employed, and some processing steps may be omitted.

(1) Imaging Control Processing

Figure 32:
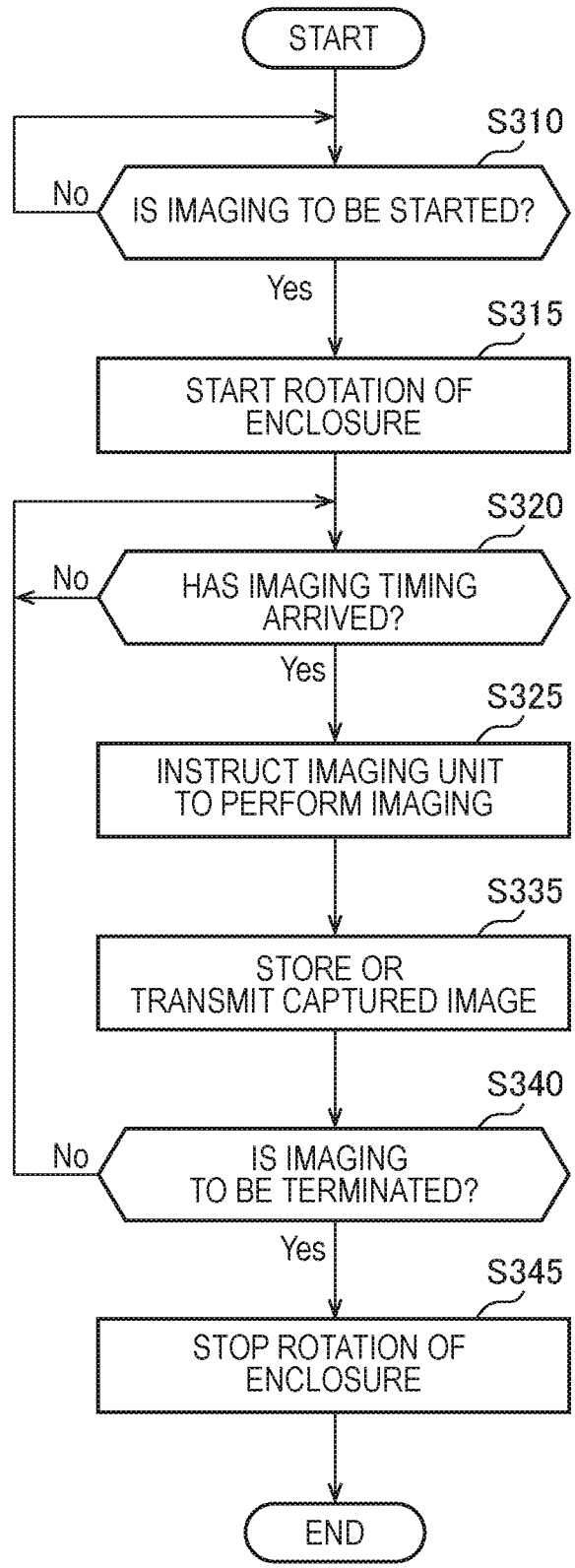
FIG. 32 is a flowchart showing an example of a flow of imaging control processing according to the second example of the second embodiment.

FIG. 32 is a flowchart showing an example of a flow of imaging control processing that may be executed by the imaging control unit 320 according to the second example.

First, with reference to FIG. 32, the imaging control unit 320 awaits a trigger for starting imaging (step S310). For example, when a user input that instructs the start of imaging is detected via a user interface, or a control command that instructs the start of imaging is detected via a communication interface, the imaging control processing proceeds into step S315.

In step S315, the imaging control unit 320 causes the rotation of the enclosure of the imaging device 300 to be started. Thereafter, when imaging timing arrives (step S320), the imaging control unit 320 instructs imaging by supplying the imaging start instruction signal to the imaging unit 310 (step S325).

The imaging control unit 320 repeats an imaging instruction M times while the enclosure makes a rotation, for example. Each time a captured image is generated by the imaging unit 310, the imaging control unit 320 causes the information multiplexing unit 330 to store the captured image in the frame memory 335, or causes the captured image to be transmitted to a server or a display terminal (step S335). Imaging control information is multiplexed on a series of stored or transmitted captured images.

When a user input or a control command that instructs the termination of imaging is detected (step S340), the imaging control unit 320 stops the rotation of the enclosure (step S345), and terminates the imaging control processing.

(2) Reproduction Control Processing

Figure 33:
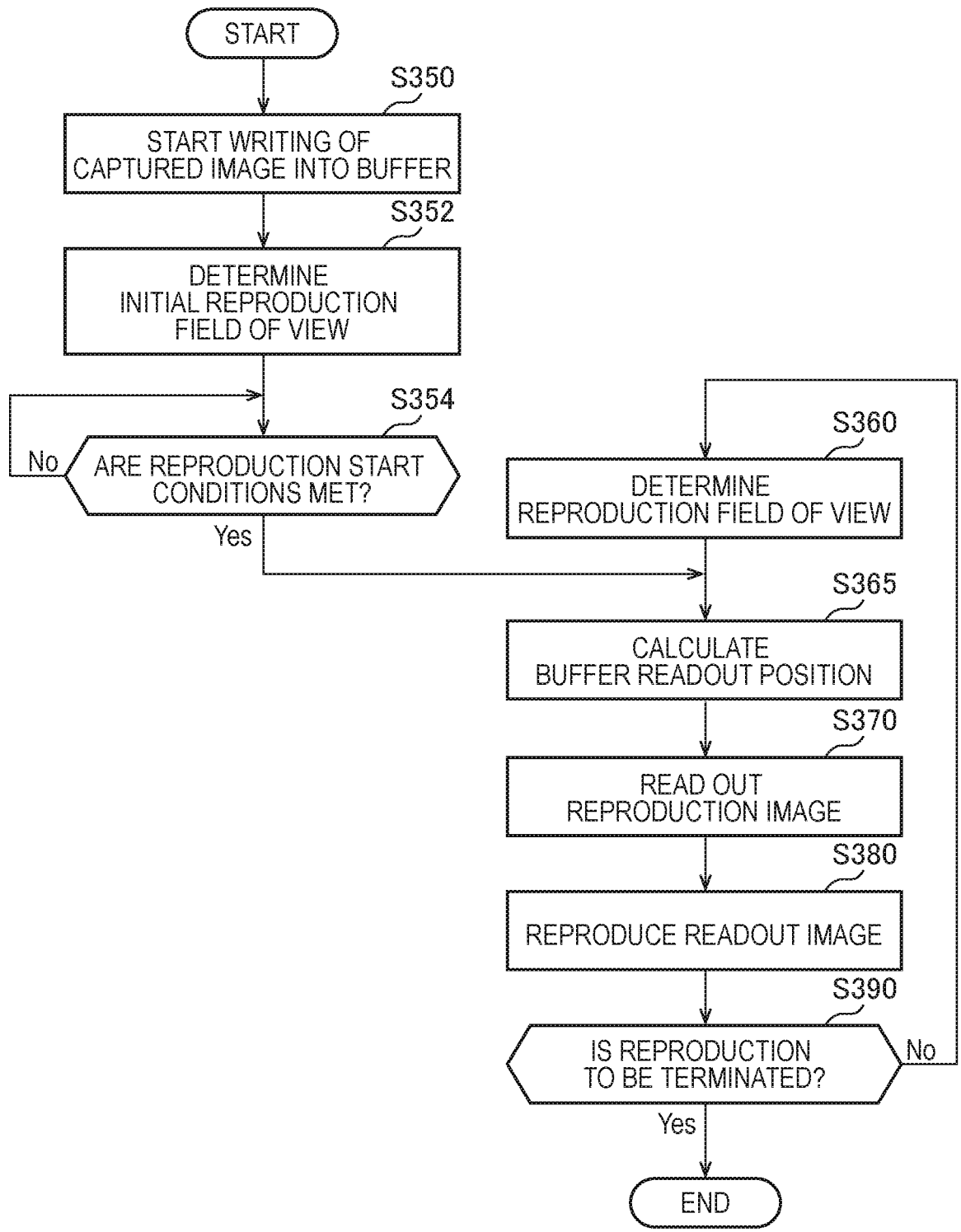
FIG. 33 is a flowchart showing an example of a flow of reproduction control processing according to the second example of the second embodiment.

FIG. 33 is a flowchart showing an example of a flow of reproduction control processing that may be executed by the display terminal 350 according to the second example.

When reproduction of omnidirectional video is requested, the writing control unit 365 of the display terminal 350 starts writing of a captured image acquired by the image acquisition unit 360 (and decoded according to necessity) into the frame buffer 370 (step S350). The reproduction control unit 380 causes the field-of-view determination unit 275 to determine an initial reproduction field of view (step S352) on the basis of an instruction from the user or a result of measuring the attitude of the terminal. Thereafter, the reproduction control unit 380 awaits until one or more reproduction start conditions are met (step S354).

When the reproduction start conditions are met, the reproduction control unit 380 calculates the readout position in the frame buffer 370 corresponding to a desired reproduction field of view in accordance with Expression (9) (step S365). Then, the reproduction control unit 380 reads out, from the frame buffer 370, image data of one reproduction viewing angle using the calculated readout position as the starting point to generate a reproduction image (step S370).

Then, the reproduction control unit 380 causes the generated reproduction image to be displayed on the display unit 290 (step S380). Generation and display of such a reproduction image is repeated until the termination of reproduction is instructed (step S390). In each repetition, a determination of the reproduction field of view is also executed again, and the reproduction field of view moves in accordance with a user's request (step S360).

[2-4-4. Example of Transition of Buffer State]

Figure 34:
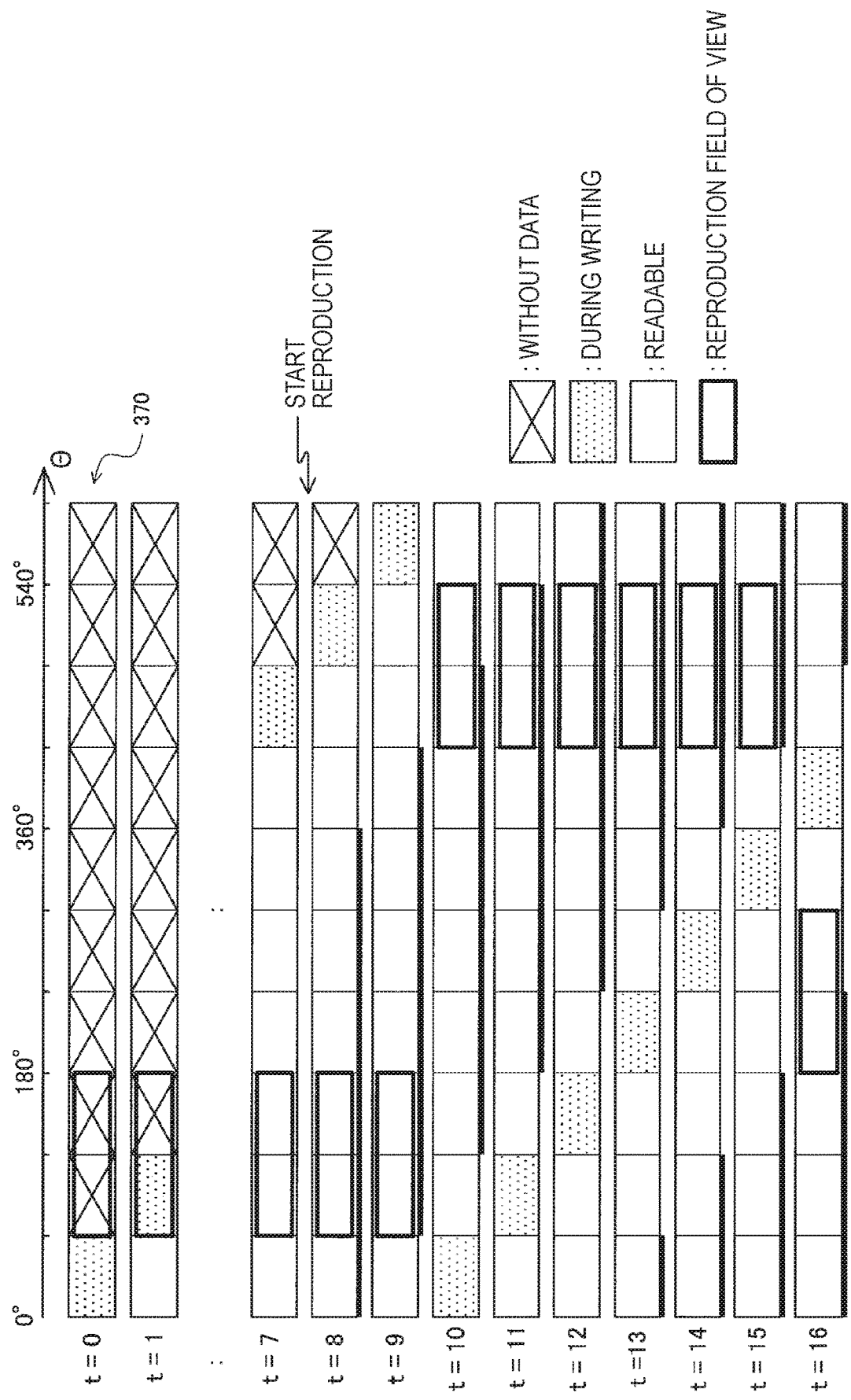
FIG. 34 is an explanatory diagram showing an example of transition of a buffer state of the frame buffer in a first scenario.

In the present section, some examples of transition of the buffer state of the frame buffer 370 utilized cyclically will be described. FIG. 34 to FIG. 36 show examples of transition of the buffer state of the frame buffer in three scenarios, respectively.

(1) First Scenario

In a first scenario shown in FIG. 34, the individual frame angle $R_c$ is 600, and the reproduction viewing angle $R_v$ is 120°. The reproduction direction $\theta_v$ shall be $\theta_0+60°$ and shall not move. The total angular width $R_{TOTAL}$ of the frame buffer 370 is 600° in accordance with Expression (4) and Expression (5), and this is equivalent to ten individual frames. The writing position $\Theta_{init}$ of the zero-th individual frame shall be equal to 00.

In each of the drawings, a region in which data is being written is hatched by dots. The symbol x is shown in a region having no data. A region in which data that can be read out exists is white. A readout region corresponding to the reproduction field of view is indicated by a thick frame. The black bars added under blocks representing in-buffer regions represent accessible ranges in the reproduction direction.

With reference to FIG. 34, first, at the time t=0 when acquisition of a captured image is started, writing into a buffer region [0°, 60°] of the first individual frame is started. At this time point, the reproduction image corresponding to the reproduction field of view has not been written into the frame buffer 370. When one individual frame time elapses, and the time t=1 arrives, writing into a buffer region [60°, 120°] of the second individual frame is started. Also at this time point, the reproduction start conditions are not met, and reproduction of omnidirectional video is not started. When the time t=8 arrives, writing into a buffer region [480°, 540°] of the ninth individual frame is started. At this time point, the two reproduction start conditions are met, and reproduction of omnidirectional video is started. A buffer region [0°, 360°] is accessible as the reproduction direction. When the time t=10 arrives, writing into the frame buffer 370 circulates, and writing into the buffer region [0°, 60°] of the individual frame is started again. The readout region of the reproduction image advances 360° from the previous buffer region [60°, 120°] to be a buffer region [420°, 540°]. When the time further elapses, and the time t=16 arrives, the readout region of the reproduction image advances 360° from the previous buffer region [420°, 540°] and circulates to be a buffer region [180°, 300°].

(2) Second Scenario

Also in a second scenario shown in FIG. 35, the individual frame angle $R_c$ is 60°, and the reproduction viewing angle $R_v$ is 120°. The reproduction direction $\theta_v$ is initially $\theta_0+240°$, and after reproduction is started, moves 60° per individual frame time in the forward direction.

With reference to FIG. 35, first, at the time t=0 when acquisition of a captured image is started, writing into the buffer region [0°, 60°] of the first individual frame is started. At this time point, the reproduction image corresponding to the reproduction field of view has not been written into the frame buffer 370. When the time t=7 arrives, writing into a buffer region [420°, 480°] of the eighth individual frame is started. At this time point, the two reproduction start conditions are met, and reproduction of omnidirectional video is started. The buffer region [0°, 360°] is accessible as the reproduction direction, and a reproduction image is read out from a buffer region [240°, 360°]. When the time t=8 arrives, the readout position moves 60° in the forward direction in accordance with the movement of the reproduction field of view, and a reproduction image is read out from a buffer region [300°, 420°]. When the time t=9 arrives, the readout position moves 60° in the forward direction in accordance with the movement of the reproduction field of view, and a reproduction image is read out from a buffer region [360°, 480°]. Thereafter, when the time t=12 arrives, and the readout region of the reproduction image reaches the terminal end of the frame buffer 370, the readout region also circulates to the beginning of the frame buffer 370.

(3) Third Scenario

Also in a third scenario shown in FIG. 36, the individual frame angle $R_c$ is 60°, and the reproduction viewing angle $R_v$ is 120°. The reproduction direction $\theta_v$ is initially $\theta_0+60°$, and after reproduction is started, moves 60° per individual frame time in the reverse direction.

With reference to FIG. 36, first, at the time t=0 when acquisition of a captured image is started, writing into the buffer region [0°, 60°] of the first individual frame is started. At this time point, the reproduction image corresponding to the reproduction field of view has not been written into the frame buffer 370. When the time t=8 arrives, writing into a buffer region [480°, 540°] of the ninth individual frame is started. At this time point, the two reproduction start conditions are met, and reproduction of omnidirectional video is started. The buffer region [0°, 360°] is accessible as the reproduction direction, and a reproduction image is read out from a buffer region [60°, 180°]. When the time t=9 arrives, the readout position moves 60° in the reverse direction in accordance with the movement of the reproduction field of view, but the readout position displaces 360° because of deviation from the accessible buffer region, and a reproduction image is read out from the buffer region [360°, 480°]. When the time t=10 arrives, the readout position moves 60° in the reverse direction in accordance with the movement of the reproduction field of view, and a reproduction image is read out from the buffer region [300°, 420°].

2-5. Summary of Second Embodiment

The second embodiment of the technology according to the present disclosure has been described in detail so far using FIGS. 17, 18, 19, 20, 21, 22, 23A, 23B, 23C, 24A, 24B, 24C, 24D, 25, 26, 27, 28, 29, 30, 31, 32, 33, 34, 35, and 36. According to the second embodiment, in the case where reproduction in a reproduction field of view that straddles the reference direction is requested when controlling reproduction of omnidirectional video based on a plurality of captured images sequentially captured in a plurality of fields of view that revolve while partially overlapping one another, a reproduction image based on the first captured image corresponding to the first field of view and the second captured image corresponding to the M-th field of view captured earlier than the first captured image is displayed. Therefore, since the imaging timing difference between partial images included in the reproduction image becomes significantly smaller than the imaging timing difference between the both ends of a single omnidirectional frame, it is possible to prevent a great failure from occurring in an integrally generated reproduction image.

In addition, according to the above-described second embodiment, reproduction of omnidirectional video is performed by reproducing a reproduction image corresponding to a reproduction field of view which is a part of the entire field of view of 360°. In this case, although the user may move the reproduction field of view straddling the reference direction equivalent to the starting point of the omnidirectional frame, a failure in the reproduction image is also prevented in such a case, and thus, a user's sense of immersion into the omnidirectional video will not be impaired.

In addition, according to a certain example, in addition to M captured images corresponding to M imaging fields of view captured during a certain omnidirectional frame period, at least one captured image corresponding to at least one imaging field of view captured during another omnidirectional frame period subsequent to that omnidirectional frame period is buffered for reproduction of omnidirectional video. Therefore, in whichever direction in 360° the user directs the reproduction field of view, a natural reproduction image can be generated and displayed. In the case where a ring buffer is utilized for the buffering, a reproduction image without a failure can be generated promptly with a simple mechanism of cyclic writing of frames into the ring buffer and readout of a reproduction image from an appropriate readout region corresponding to the reproduction direction. For example, in an application of reproducing omnidirectional video in real time, video that is reproduced with a small delay can also be provided for the user.

In addition, according to a certain example, display of a reproduction image is started on the condition that, in the case where the reproduction field of view is moved immediately after the start of reproduction, the reproduction image corresponding to the reproduction field of view after the movement can be generated. Therefore, it is possible to avoid an interruption of reproduction due to absence of necessary image data as a result that the user moves the reproduction field of view after reproduction is started once.

In addition, according to a certain example, in the case where an omnidirectional frame is generated in advance by stitching M captured images corresponding to M imaging fields of view, and reproduction in a reproduction field of view that straddles the reference direction is requested in reproduction of omnidirectional video, a reproduction image is integrally generated on the basis of the first partial image corresponding to the first imaging field of view in the first omnidirectional frame and the second partial image corresponding to the M-th imaging field of view in the second omnidirectional frame captured earlier. Also in this case, it is possible to prevent a failure in the reproduction image, and to avoid a user's sense of immersion into the omnidirectional video being impaired.

In addition, according to the above-described second embodiment, captured images generated by sequentially imaging a plurality of imaging fields of view while rotating the imaging direction around the rotation axis are used for reproduction of omnidirectional video. Therefore, there is no need to utilize an omnidirectional camera including a plurality of camera modules, and a camera system that provides omnidirectional video can be constructed at lower cost. As a configuration of the imaging side of the camera system, a rotary mechanism should only be added to a general digital video camera.

3. CONCLUSION

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Note that the control processing of each of the apparatuses described in the present specification may be realized using any combination of software, hardware, and software and hardware. Programs configuring software are stored in, for example, storage media (non-transitory media) provided inside or outside each of the apparatuses in advance. Therefore, each of the programs is read by, for example, a random access memory (RAM) at the time of execution and executed by a processor such as a central processing unit (CPU).

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, an aspect of the present technology may also be configured as below.

(1)

An image processing device including:

a reproduction control unit configured to control reproduction of omnidirectional video based on a plurality of captured images sequentially captured in a plurality of fields of view that revolve while partially overlapping one another, in which the omnidirectional video is covered by M fields of view from a first field of view to an M-th (M>1) field of view with a reference direction serving as a starting point, and in a case where reproduction in a reproduction field of view that straddles the reference direction is requested, the reproduction control unit causes a display unit to display a reproduction image based on a first captured image corresponding to the first field of view and a second captured image corresponding to the M-th field of view captured earlier than the first captured image.

(2)

The image processing device according to (1), in which the reproduction control unit causes the omnidirectional video to be reproduced by reproducing the reproduction image corresponding to the reproduction field of view which is a part of an entire field of view of 360°.

(3)

The image processing device according to (1) or (2), further including:

a buffer configured to store M captured images corresponding to the M fields of view captured in a first period and at least one captured image corresponding to at least one field of view captured in a second period subsequent to the first period.

(4)

The image processing device according to (3), in which the buffer is a ring buffer configured to cyclically store the M captured images and the at least one captured image.

(5)

The image processing device according to (3) or (4), in which the reproduction control unit causes the display unit to display the reproduction image read out from the buffer, the reproduction image being based on an image corresponding to one field of view or two or more fields of view imaged consecutively.

(6)

The image processing device according to any one of (3) to (5), in which on a condition that, in a case where a reproduction field of view is moved immediately after reproduction is started, a reproduction image corresponding to the reproduction field of view after movement can be generated, the reproduction control unit starts display of the reproduction image.

(7)

The image processing device according to any one of (3) to (6), further including: a decoding unit configured to decode each of a series of captured images encoded using inter-frame prediction, using every M+1-th reference frame with the captured image serving as a reference.

(8)

The image processing device according to (1), further including:

an image acquisition unit configured to acquire an omnidirectional image generated by stitching M captured images corresponding to the M fields of view, in which in a case where reproduction in a reproduction field of view that straddles the reference direction is requested, the reproduction control unit causes the display unit to display the reproduction image on a basis of a first partial image corresponding to the first field of view in a first omnidirectional image and a second partial image corresponding to the M-th field of view in a second omnidirectional image captured earlier than the first omnidirectional image.

(9)

The image processing device according to any one of (1) to (8), further including:

a determination unit configured to determine the reproduction field of view requested, in which the reproduction control unit causes the display unit to display the reproduction image corresponding to the reproduction field of view determined by the determination unit.

(10)

The image processing device according to any one of (1) to (9), in which the plurality of captured images are images generated by sequentially imaging the M fields of view with an imaging device while rotating an imaging direction around a rotation axis.

(11)

A display device including the image processing device and the display unit according to any one of (1) to (10).

(12)

A reproduction control method of controlling reproduction of omnidirectional video based on a plurality of captured images sequentially captured in a plurality of fields of view that revolve while partially overlapping one another, in which the omnidirectional video is covered by M fields of view from a first field of view to an M-th (M>1) field of view with a reference direction serving as a starting point, the reproduction control method including:

generating, by an image processing device, a reproduction image based on a first captured image corresponding to the first field of view and a second captured image corresponding to the M-th field of view captured earlier than the first captured image, in a case where reproduction in a reproduction field of view that straddles the reference direction is requested; and causing a display unit to display the generated reproduction image.

(13)

An image processing system including:

an imaging device configured to generate a plurality of captured images by sequentially performing imaging in a plurality of fields of view that revolve while partially overlapping one another; and an image processing device that includes a reproduction control unit configured to control reproduction of omnidirectional video based on the plurality of captured images, in which the omnidirectional video is covered by M fields of view from a first field of view to an M-th (M>1) field of view with a reference direction serving as a starting point, and in a case where reproduction in a reproduction field of view that straddles the reference direction is requested, the reproduction control unit causes a display unit to display a reproduction image based on a first captured image corresponding to the first field of view and a second captured image corresponding to the M-th field of view captured earlier than the first captured image.

Additionally, another aspect of the present technology may also be configured as below.

(1)
An imaging control device including:
a control unit configured to control imaging timing of at least one of a first image signal generated by imaging a first field of view in a first imaging unit and a second image signal generated by imaging a second field of view that partially overlaps the first field of view in a second imaging unit such that a phase of the first image signal and a phase of the second image signal that correspond to an overlapping portion of the first field of view and the second field of view agree.

(2)
The imaging control device according to (1), in which the first image signal indicates a pixel value read out in a sequential readout system from an image sensor of the first imaging unit, and
the second image signal indicates a pixel value read out in the sequential readout system from an image sensor of the second imaging unit.

(3)
The imaging control device according to (2), in which the first field of view precedes the second field of view in the pixel readout direction, and
the control unit delays readout of the pixel value of a pixel at the beginning in the second imaging unit by a time until a readout pixel position in the first imaging unit reaches the overlapping portion from the pixel at the beginning.

(4)
The imaging control device according to (3), in which the entire field of view of 360° is covered by fields of view of a plurality of imaging units including the first imaging unit and the second imaging unit, and
a delay time of readout of the pixel value in the second imaging unit with respect to the first imaging unit is equal to a quotient obtained by dividing a required frame time by the number of the plurality of imaging units.

(5)
The imaging control device according to (3) or (4), in which the control unit controls the pixel readout speed in the first imaging unit such that pixel values in a range from the beginning of a frame to reach the overlapping portion are read out during a delay time of readout of the pixel value in the second imaging unit with respect to the first imaging unit.

(6)
The imaging control device according to (4), in which imaging timing of the first imaging unit is the earliest among the plurality of imaging units,
imaging timing of a third imaging unit among the plurality of imaging units is the latest among the plurality of imaging units, and
an image of an i-th (i is an integer) frame in the first field of view imaged by the first imaging unit is integrally processed with an image of an i−1-th frame in a third field of view imaged by the third imaging unit.

(7)
The imaging control device according to any of (1) to (6), in which
the first field of view and the second field of view neighbor in the azimuth angle direction, and
the first imaging unit and the second imaging unit read out pixel values per vertical line.

(8)
The imaging control device according to any of (1) to (6), in which
the first field of view and the second field of view neighbor in the azimuth angle direction, and
the first imaging unit and the second imaging unit read out pixel values per horizontal line.

(9)
The imaging control device according to any of (1) to (3), in which
the first field of view and the second field of view neighbor in the attack and depression angle direction, and
the first imaging unit and the second imaging unit read out pixel values per vertical line.

(10)
The imaging control device according to any of (1) to (3), in which
the first field of view and the second field of view neighbor in the attack and depression angle direction, and
the first imaging unit and the second imaging unit read out pixel values per horizontal line.

(11)
The imaging control device according to any of (1) to (10), further including:
an image processing unit that stitches an image represented by the first image signal and an image represented by the second image signal.

(12)
The imaging control device according to any of (1) to (11), further including:
an image processing unit that executes stereo matching using an image represented by the first image signal and an image represented by the second image signal.

(13)
The imaging control device according to any of (3) to (6), further including:
a memory that stores control information that defines in advance the delay time of imaging timing of the second image signal with respect to the first image signal, in which
the control unit delays readout of the pixel value of the pixel at the beginning in the second imaging unit by the delay time defined by the control information.

(14)
The imaging control device according to any of (3) to (6), in which
the control unit dynamically determines the delay time of imaging timing of the second image signal with respect to the first image signal depending on setting of a frame time or a frame rate, and delays readout of the pixel value of the pixel at the beginning in the second imaging unit by the dynamically determined delay time.

(15)
An imaging device including:
the first imaging unit;
the second imaging unit; and
the imaging control device according to any of (1) to (14).

(16)
An imaging control method of controlling an imaging device including a first imaging unit that images a first field of view to generate a first image signal and a second imaging unit that images a second field of view that partially overlaps the first field of view to generate a second image signal, including:

controlling imaging timing of at least one of the first image signal and the second image signal such that a phase of the first image signal and a phase of the second image signal that correspond to an overlapping portion of the first field of view and the second field of view agree.

REFERENCE SIGNS LIST 1 camera system
10a, 10b omnidirectional camera
100 imaging device
112a-112n imaging unit (camera module)
120 imaging control unit (imaging control device)
130 image processing unit
170 display terminal
180 reproduction control unit
190 display unit
τ1, τ2, τ3, τ4 delay time
5 camera system
50 rotating camera
200, 300 imaging device
210, 310 imaging unit
220, 320 imaging control unit
230 omnidirectional frame generation unit
330 information multiplexing unit
250, 350 display terminal
260, 360 image acquisition unit
365 writing control unit
265, 370 frame buffer
275 field-of-view determination unit
280, 380 reproduction control unit
290 display unit

The invention claimed is:

1. An image processing device, comprising:
a reproduction control unit configured to control reproduction of omnidirectional video based on a plurality of captured images sequentially captured in a plurality of fields of view that revolve while partially overlapping one another, wherein
the omnidirectional video is covered by M fields of view from a first field of view to an M-th field of view with a reference direction serving as a starting point, where M>1, and
in a case where reproduction in a reproduction field of view that straddles the reference direction is requested, the reproduction control unit causes a display unit to display a reproduction image based on a first captured image corresponding to the first field of view and a second captured image corresponding to the M-th field of view captured earlier than the first captured image.

2. The image processing device according to claim 1, wherein
the reproduction control unit causes the omnidirectional video to be reproduced by reproducing the reproduction image corresponding to the reproduction field of view which is a part of an entire field of view of 360°.

3. The image processing device according to claim 1, further comprising a buffer configured to store M captured images corresponding to the M fields of view captured in a first period and at least one captured image corresponding to at least one field of view captured in a second period subsequent to the first period.

4. The image processing device according to claim 3, wherein the buffer is a ring buffer configured to cyclically store the M captured images and the at least one captured image.

5. The image processing device according to claim 3, wherein
the reproduction control unit causes the display unit to display the reproduction image read out from the buffer, the reproduction image being based on an image corresponding to one field of view or two or more fields of view imaged consecutively.

6. The image processing device according to claim 3, wherein
on a condition that, in a case where a reproduction field of view is moved immediately after reproduction is started, a reproduction image corresponding to the reproduction field of view after movement can be generated, the reproduction control unit starts display of the reproduction image.

7. The image processing device according to claim 3, further comprising a decoding unit configured to decode each of a series of captured images encoded using interframe prediction, using every M+1-th reference frame with the captured image serving as a reference.

8. The image processing device according to claim 1, further comprising an image acquisition unit configured to acquire an omnidirectional image generated by stitching M captured images corresponding to the M fields of view, wherein
in a case where reproduction in a reproduction field of view that straddles the reference direction is requested, the reproduction control unit causes the display unit to display the reproduction image on a basis of a first partial image corresponding to the first field of view in a first omnidirectional image and a second partial image corresponding to the M-th field of view in a second omnidirectional image captured earlier than the first omnidirectional image.

9. The image processing device according to claim 1, further comprising
a determination unit configured to determine the reproduction field of view requested, wherein
the reproduction control unit causes the display unit to display the reproduction image corresponding to the reproduction field of view determined by the determination unit.

10. The image processing device according to claim 1, wherein
the plurality of captured images are images generated by sequentially imaging the M fields of view with an imaging device while rotating an imaging direction around a rotation axis.

11. A display device comprising
the image processing device and the display unit according to claim 1.

12. A reproduction control method of controlling reproduction of omnidirectional video based on a plurality of captured images sequentially captured in a plurality of fields of view that revolve while partially overlapping one another, wherein
the omnidirectional video is covered by M fields of view from a first field of view to an M-th field of view with a reference direction serving as a starting point, where M>1,
the reproduction control method comprising:
generating, by an image processing device, a reproduction image based on a first captured image corresponding to the first field of view and a second captured image corresponding to the M-th field of view captured earlier than the first captured image, in a case where reproduction in a reproduction field of view that straddles the reference direction is requested; and causing a display unit to display the generated reproduction image.

13. An image processing system, comprising:

an imaging device configured to generate a plurality of captured images by sequentially performing imaging in a plurality of fields of view that revolve while partially overlapping one another; and an image processing device that includes a reproduction control unit configured to control reproduction of omnidirectional video based on the plurality of captured images, wherein the omnidirectional video is covered by M fields of view from a first field of view to an M-th field of view with a reference direction serving as a starting point, where $M>1$, and in a case where reproduction in a reproduction field of view that straddles the reference direction is requested, the reproduction control unit causes a display unit to display a reproduction image based on a first captured image corresponding to the first field of view and a second captured image corresponding to the M-th field of view captured earlier than the first captured image.

* * * * *